(12) United States Patent
Marsh et al.

(10) Patent No.: US 12,400,413 B2
(45) Date of Patent: Aug. 26, 2025

(54) THREE DIMENSIONAL DATA VISUALIZATION FOR PROVIDING AN IMMERSIVE EXPERIENCE FOR A CONSUMER OF THE DATA

(71) Applicant: FLOW IMMERSIVE, INC., Auburn, CA (US)

(72) Inventors: Jason Marsh, Auburn, CA (US); Michael DiBenigno, Los Altos Hills, CA (US); Vitaly Nikolaev, Moscow (RU); Aleksei Karpov, Orenburg (RU)

(73) Assignee: Flow Immersive, Inc., Auburn, CA (US)

( * ) Notice: Subject to any disclaimer, the term of this patent is extended or adjusted under 35 U.S.C. 154(b) by 64 days.

(21) Appl. No.: 18/158,841

(22) Filed: Jan. 24, 2023

(65) Prior Publication Data

US 2023/0316687 A1     Oct. 5, 2023

Related U.S. Application Data

(60) Provisional application No. 63/302,493, filed on Jan. 24, 2022.

(51) Int. Cl.
*G06T 19/20*       (2011.01)

(52) U.S. Cl.
CPC ........ *G06T 19/20* (2013.01); *G06T 2219/024* (2013.01); *G06T 2219/2004* (2013.01)

(58) Field of Classification Search
CPC ..................................................... G06T 19/20
See application file for complete search history.

(56) References Cited

U.S. PATENT DOCUMENTS

| | | | | |
|---|---|---|---|---|
| 12,182,907 | B1* | 12/2024 | Zhao | G06T 11/001 |
| 2017/0148222 | A1* | 5/2017 | Holzer | H04N 23/698 |
| 2017/0228130 | A1* | 8/2017 | Palmaro | G06F 3/0482 |
| 2018/0061138 | A1* | 3/2018 | Neeter | G06V 20/20 |
| 2019/0139314 | A1* | 5/2019 | Marsh | G06T 19/006 |

* cited by examiner

*Primary Examiner* — Shivang I Patel
(74) *Attorney, Agent, or Firm* — Ahmann Kloke LLP

(57) ABSTRACT

A system is disclosed that includes a three dimensional data visualization and storytelling (3DDV) object creation engine for converting real world data into one or more 3DDV objects; a 3DDV object enhancement engine for enhancing a 3DDV object of the one or more 3DDV objects to include at least one of processed data visualization and multiuser controls; a 3DDV media authoring engine for positioning the enhanced 3DDV object in a virtual space-time; a 3DDV multiuser access engine for making available, as 3DDV media, a scene tree including the virtual space-time. A method is disclosed that includes converting real world data into one or more 3DDV objects; enhancing a 3DDV object of the one or more 3DDV objects to include at least one of processed data visualization and multiuser controls; positioning the enhanced 3DDV object in a virtual space-time; making available, as 3DDV media, a scene tree including the virtual space-time.

20 Claims, 50 Drawing Sheets

THREE DIMENSIONAL DATA VISUALIZATION FOR PROVIDING AN IMMERSIVE EXPERIENCE FOR A CONSUMER OF THE DATA

CROSS REFERENCE TO RELATED APPLICATION

The present application claims priority to U.S. Provisional Application No. 63/302,493, filed Jan. 24, 2022, which is incorporated herein by reference.

DETAILED DESCRIPTION

Figure 1:
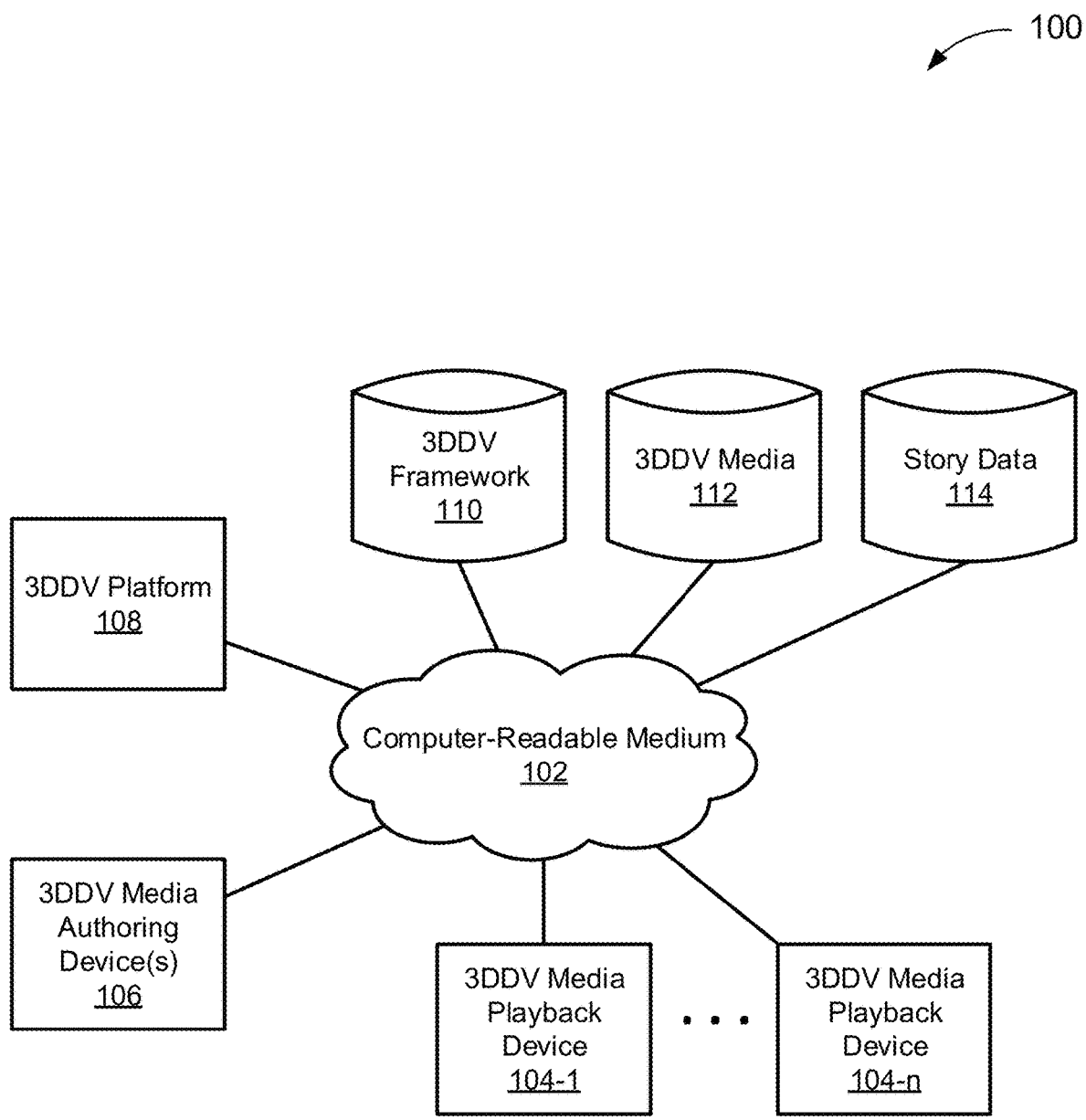
FIG. 1 depicts a diagram of an example of a three dimensional data visualization and storytelling (3DDV) system.

FIG. 1 depicts a diagram 100 of an example of a three dimensional data visualization and storytelling (3DDV) system. The diagram 100 includes a computer-readable medium (CRM) 102, one or more 3DDV media playback devices 104-1 to 104-n (referred to collectively as "3DDV media playback devices 104") coupled to the CRM 102, one or more 3DDV media authoring device(s) 106 coupled to the CRM 102, a 3DDV platform 108 coupled to the CRM 102, a 3DDV framework datastore 110 coupled to the CRM 102, and a 3DDV media datastore 112 coupled to the CRM 102.

The CRM 102 and other CRMs discussed in this paper are intended to include all mediums that are statutory (e.g., in the United States, under 35 U.S.C. 101), and to specifically exclude all mediums that are non-statutory in nature to the extent that the exclusion is necessary for a claim that includes the CRM to be valid. Known statutory CRMs include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Depending upon implementation-specific or other considerations, the CRM 102 can include wired communication interfaces and wireless communication interfaces for communicating over wired or wireless communication channels. Where a first component is located on a first device and a second component is located on a second (different) device, the CRM 102 can include a wireless or wired back-end network or LAN. The CRM 102 can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the CRM 102 can include a private cloud under the control of an enterprise or third party, or a public cloud.

The devices, systems, and CRMs described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a CRM for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical CRM on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the 3DDV media playback devices 104 are intended to represent devices with wired or wireless interfaces through which the 3DDV media playback devices 104 can send and receive data over the CRM 102. Examples of 3DDV media playback devices 104 are desktop computers, laptop computers, tablet computers, wireless devices (such as cellular phones, smartphones, or the like), or wearable devices, to name several. The 3DDV media playback devices 104 can include a browser and a headset, but techniques for transforming a smartphone into a 3D viewer are known (e.g., using Google Cardboard), which enables a person to enjoy 3DDV media playback with a single assembled device. In a specific implementation, 3DDV media can be rendered for a display that does not have 3DDV media playback, such as a flat laptop screen, which may be useful for debugging, including audience members who lack optimal tools in a presentation, or other purposes; the full impact of the 3DDV experience currently requires some type of head (and/or eye) tracking mechanism, though neural interfaces could conceivably replace physical head (and/or eye) movement tracking. A multimedia experience entails the use of both video and audio, so the 3DDV media playback devices 104 may also be equipped with headphones, earbuds, speakers, or other device for providing audio to a person enjoying a 3DDV media playback experience. In a specific implementation, at least one of the 3DDV media playback devices 104 has an application installed for enabling a 3DDV mode.

In a specific implementation, the 3DDV media playback devices 104 include unique identifiers which can be used in the transmission of data through a network. Unique identifiers of the 3DDV media playback devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the 3DDV media playback devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the 3DDV media playback devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the 3DDV media playback devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

A human agent authoring 3DDV media need not be tied to a single device and can make use of different devices at different times (e.g., a desktop at home, a laptop at work, a smartphone on the train, different workstations, etc.). The one or more 3DDV media authoring device(s) 106 illustrated in diagram 100 are intended to represent any and all such devices for illustrative convenience. In a specific implementation, one or more of the 3DDV media authoring device(s) 106 can also function as 3DDV media playback devices, as well, either by implementation or configuration.

In a specific implementation, the 3DDV media authoring devices 106 are used by human or artificial agents of a "storyteller" to create a flow in association with a data set through which a participant can use one or more of the 3DDV media playback devices to navigate through the data set in real time as the participant is walked through a story of steps using a variety of intellectual visualizations to tell the story. For example, the 3DDV media authoring devices 106 can be used to provide live navigation through big data where data is fundamentally a series of steps that tell a story.

A scene with one or more 3DDV objects is placed in a timeline, where each step of the timeline contains either a new 3DDV object or a different arrangement of dots that correspond to data points in 3D space. The dots animate from arrangement to arrangement to highlight that the underlying data is consistent, but the visualization of the data changes to provide a different "perspective" of the data. Sometimes this is a filtering of the data so it is a drill-down into the data, sometimes it uses a different property of the data to alter the X, Y, and Z positions, sometimes it alters the color or sizes of the dots, sometimes it alters the shape of the dots. As the user progresses through the steps, the possible interactions on the data also can change.

The scene can include audio elements, such as a voiceover and/or music, such that it communicates a "story". In a specific implementation, a scene includes an avatar story, defined as an avatar that is a 'recording' of the motions and audio of a content creator presenting the story resulting in the ability to "play back" the avatar movements and voice captured. The avatar capture and playback includes a pointer laser, highlighter, or other visual indication of selection of aspects of the data in the 3DDV object, for manipulation of the data, which can include causing filtering or highlighting of certain aspects of the data to occur. Advantageously, a viewer can move around the 3D space while the avatar is performing and the 3DDV objects remain available for interaction. It is as though a live remote presenter is controlling the avatar, but there is no live presenter at this time, merely a capture of a past performance. In this specific implementation, the system includes an avatar story CRUD engine and an avatar story sharing engine (not shown in the figures).

The 3DDV platform 108 illustrated in diagram 100 is intended to represent a platform that facilitates the authoring of 3DDV media and the distribution of the 3DDV media for playback. 3DDV enables an author to capture the advantages of immersion, which is best in virtual reality (VR), with the advantages of collaboration, which is best in augmented reality (AR). Mechanisms to invest an audience in an experience include appealing to emotion through the use of 360° videos (enabling an audience to visualize another person's experience), appealing to intellect (through the use of processed data visualization, described later), providing a sense of mastery and control (through interactivity and subjective coordinates, described later), providing personalization (through on-the-fly timeliness and per-audience-member customization, described later), improving collaboration (through improved multiuser control and sharing, described later), and providing surprise (also known as "the reveal"). Appealing to emotion and intellect is enabled by the discovery 3DDV symbol objects are processed through the hippocampus to provide an emotional impact much like physical, VR objects, or 3DDV media objects are processed through the hippocampus, causing humans to naturally link emotion and intellect in a 3DDV environment that includes both 3DDV symbol and 3DDV media objects, which are described in more detail later. The combination of interactivity, personalization, and improved collaboration results in the most sharable VR platform on the planet, which is explored in greater detail later. As discussed further below, 3DDV works well in a mixed reality context, which entails transitioning from 3DDV to AR or from AR to 3DDV. Although conventional mixed reality may be associated with transitioning between AR and VR, transitioning between AR and VR is not explicitly explored in this paper, but techniques described in this paper may be used to improve conventional mixed reality. In a specific implementation, the 3DDV platform 108 is implemented using a software-as-a-service (SAAS) model with tools accessible via a web browser.

The 3DDV platform 108 can support a flow ecosystem that includes micropayments. In a specific implementation, the 3DDV platform 108 determines how much compensation a contributing entity deserves, including a first entity that provides a template that is later modified to include all new data by one or more second entities. Blockchain, tangle, and similar technologies can provide a proof of provenance for such a system. It is possible to go back to an original or any version from the original to date to identify changes and attribute the changes to relevant entities. The ownership proportion can be characterized with a token (e.g., a FLOWKEN™) or using reputation (e.g., Karma) that allows upvoting to improve reputation. Instead or in addition, downvotes can decrease reputation (or increase reputation using the theory any interest is good interest). Alternatively or in addition, time spent in a flow can improve reputation. In a specific implementation, there are different karmic tracks for functionality (e.g., structure), information (e.g., news), and/or creative expression (e.g., art). In some implementations, it may be desirable to include some form of conceptual (or physical) centralization, such as to keep blockchain addresses in a database that can be used to extinguish bad blockchains (e.g., child pornography) or only allow encrypted content to be unencrypted if requirements are met. An advantage of blockchain is proof of provenance cannot be altered, though some implementations are unwieldy (e.g., Ethereum provides proof of provenance, but it is too expensive to use microtransactions with Ethereum). In a specific implementation, Plasma is used to group microtransactions and perform group microtransactions in batch mode. Additional detail regarding 3DDV platforms is provided later.

The 3DDV framework datastore 110 illustrated in diagram 100 is intended to represent tools for the authoring of 3DDV media. The 3DDV framework datastore 110 may or may not be under the control of the same entity as the 3DDV platform 108. For example, a third party could make the 3DDV framework datastore 110 accessible to the 3DDV platform 108, in whole or in part. In a specific implementation, the 3DDV framework datastore 110 includes data structures in a JSON format. Additional detail regarding the 3DDV framework datastore 110 is provided later.

The 3DDV media datastore 112 illustrated in diagram 100 is intended to represent a store of authored 3DDV media. The 3DDV media datastore 112 may or may not be under the control of the same entity as the 3DDV platform 108. For example, 3DDV media could be stored, in whole or in part, on a third party 3DDV media datastore 112 or under the control of the same entity as one or more of the 3DDV media authoring device(s) 106 (potentially including storage local to one of the 3DDV media authoring device(s) 106). In a specific implementation, the 3DDV media datastore 112 is accessed by the 3DDV media playback devices 104 for playback on the devices.

An example of a 3DDV media data structure is a text sculpture. A text sculpture can comprise a relatively large number of characters (e.g., up to 250,000 characters and likely up to 450,000 characters with a working prototype that can run on a smart phone). The text sculpture can be characterized as big data with text instead of dots, where bigger text, font, color, or the like provides meaning. An underlying (anti-aliasing) shader removes text that is "far away" relatively quickly to make the text sculpture more readable. In a specific implementation, each letter is four points (x, y, z)×4 and each block is a combination of characters that can be added into a single, e.g., 3D geometry. A geometry includes an array of all of the vertices in which each character can be moved independently. Additional detail regarding the 3DDV media is provided later.

In an example of operation, a system such as is illustrated in FIG. 1 operates as follows. The 3DDV media authoring device(s) 106 are used by an author, which can include one or more human or artificial agents, to access the 3DDV platform 108 to interact with 3DDV media. Interaction with 3DDV media can entail creation, reading, updating, or deleting (CRUD) of new or existing 3DDV media, including merging non-collaborative and/or non-VR media components with 3DDV media components. The 3DDV platform 108 provides access to 3DDV framework data structures of the 3DDV framework datastore 110 for use by the 3DDV media authoring device(s) 106 to CRUD 3DDV media. Additional tools, not shown in diagram 100, can include tools that enable a human to more readily CRUD 3DDV media. The 3DDV platform 108 enables the 3DDV media authoring device(s) 106 to store CRUD 3DDV media in the 3DDV media datastore 112. For illustrative purposes, it is assumed the 3DDV media playback devices 104 are authorized to access 3DDV media from the 3DDV media datastore 112, which, in operation, they do, enabling playback on the 3DDV media playback devices 104.

Figure 2:
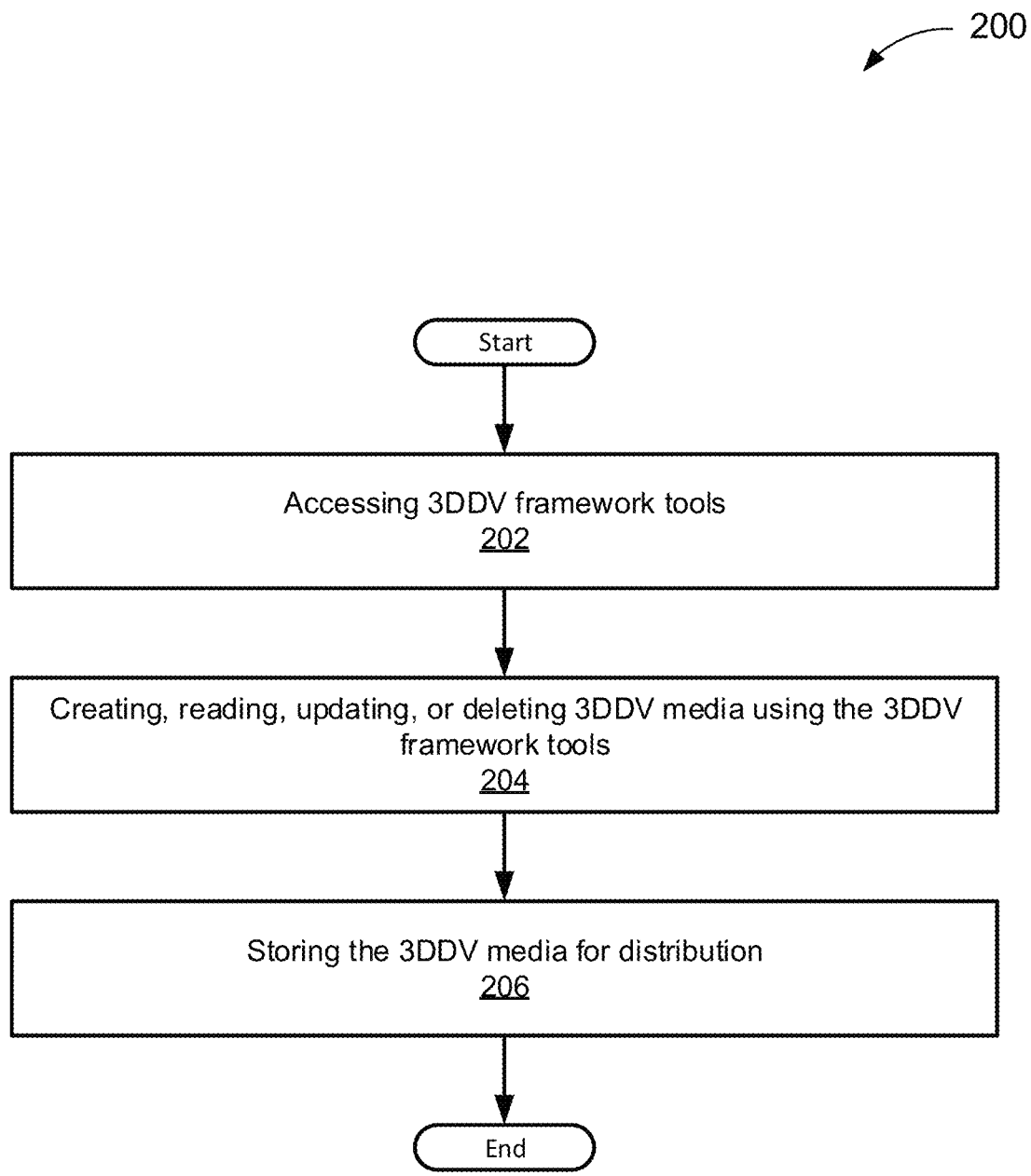
FIG. 2 depicts a flowchart of an example of a method for authoring and distributing 3DDV media.

FIG. 2 depicts a flowchart 200 of an example of a method for authoring and distributing 3DDV media. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. The flowchart 200 starts at module 202, with accessing 3DDV framework tools.

In the example of FIG. 2, the flowchart 200 continues to module 204 with CRUDing 3DDV media using the 3DDV framework tools. In a specific implementation, a human agent (typically the owner) of a 3DDV media authoring device inputs commands into the 3DDV media authoring device. Because artificial agents carry out the commands to CRUD 3DDV media, artificial agents actual perform the authoring operation, though colloquially the human agent would be characterized as the author. In some instances, however, a CRUD decision could be initiated and carried out entirely by artificial agents.

In the example of FIG. 2, the flowchart ends at module 206 with storing the 3DDV media for distribution.

Figure 3:
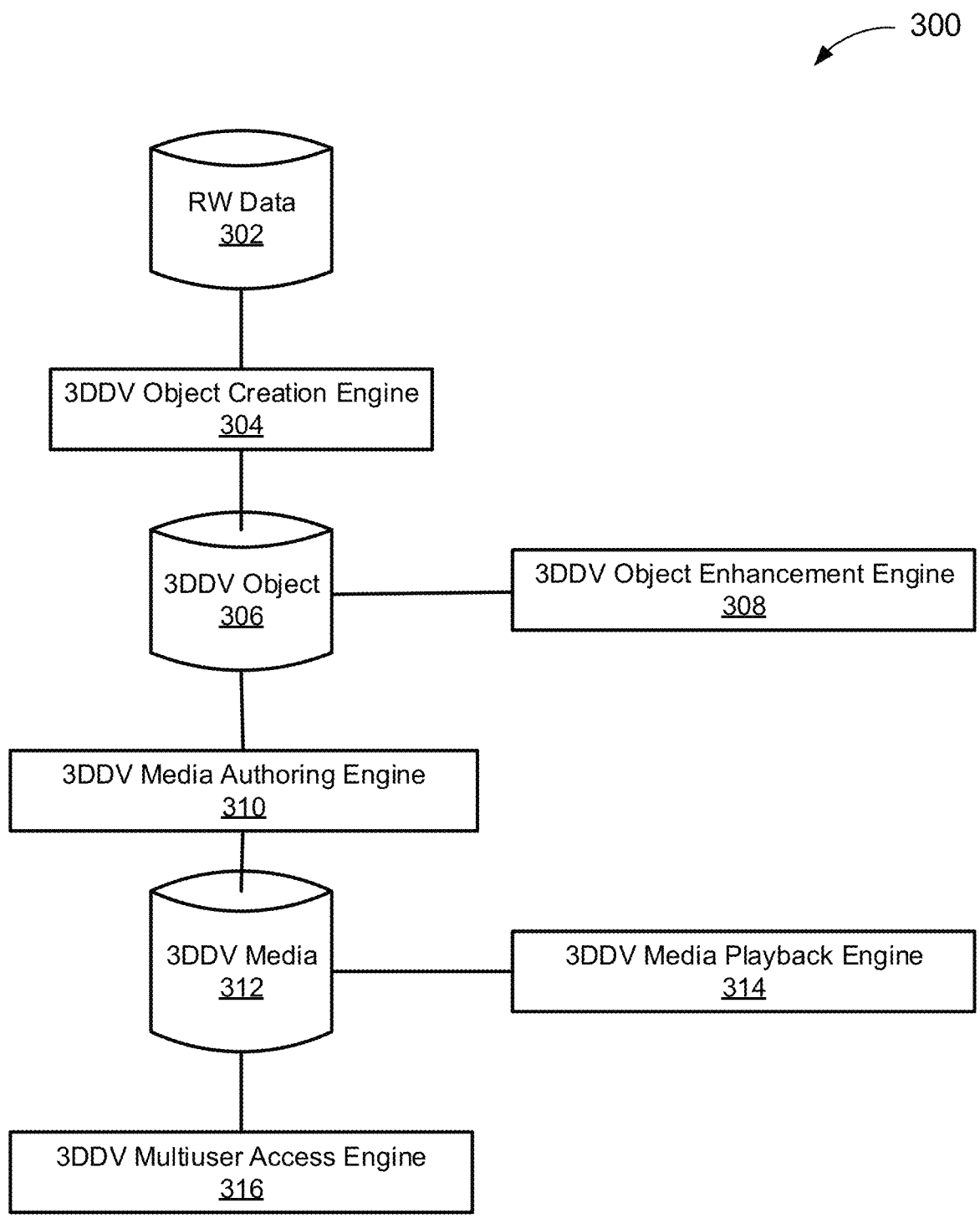
FIG. 3 depicts a diagram of an example of a 3DDV platform.

FIG. 3 depicts a diagram 300 of an example of a 3DDV platform. The diagram 300 includes a real world datastore 302, a 3DDV object creation engine 304, a 3DDV object datastore 306, a 3DDV object enhancement engine 308, a 3DDV media authoring engine 310, a 3DDV media datastore 312, a 3DDV media playback engine 314, and a 3DDV multiuser access engine 316. In the diagram 300, the real world datastore 302 is coupled to the 3DDV object creation engine 304; the 3DDV object datastore 306 is coupled to the 3DDV object creation engine 304, the 3DDV object enhancement engine 308, and the 3DDV media authoring engine 310; and the 3DDV media datastore 312 is coupled to the 3DDV media authoring engine 310, the 3DDV media playback engine 314, and the 3DDV multiuser access engine 316.

In the example of FIG. 3, the real world data datastore 302 is intended to represent data in any format that the 3DDV object creation engine 304 is capable of converting to a 3DDV compatible format. The formats in which the data can be represented include text files, word processing documents, spreadsheets, presentations, drawings, pictures, videos, and audio files to name several, but specific formats will be largely implementation-specific, depending upon what capabilities are provided to the 3DDV object creation engine 304 or other application capable of transforming data into a format the 3DDV object creation engine 304 can understand. The formats can include application-independent formats and application-dependent formats.

The real world data datastore 302 is intended to represent a potentially distributed datastore that can include, by way of example but not limitation, social feeds, news, websites, maps, or the like. In some instances, data can be geolocated and/or timestamped, or provide other metadata that can be exploited by the 3DDV object creation engine 304 (or other engines) if appropriately designed or configured to exploit some or all of the metadata associated with a particular data item. Capturing the metadata facilitates personalization of 3DDV media for individuals by geography (using geolocated data or mechanisms for determining an associated location) and timeliness (using timestamped or mechanisms for determining an associated time). If demographic, psychographic, or behavioristic characteristics of a 3DDV media audience can be determined or guessed, metadata can potentially be used to further improve the personalization of 3DDV media to the audience.

In the example of FIG. 3, the 3DDV object creation engine 304 is intended to represent specifically-purposed hardware that converts real world data from the real world data datastore 302 into 3DDV objects. In a specific implementation, the 3DDV object creation engine 304 models simplified objects in order to reduce delays during rendering, but complexity can be increased for systems capable of rendering objects with greater complexity. For illustrative convenience, it is assumed each 3DDV object includes a geometry and a material that, together define an object mesh. In a specific implementation, the geometry comprises triangles, but objects that are not 3D need not have a geometry, as defined here. Where a distinction is desired, objects can be referred to as 3DDV 3D objects and other 3DDV objects. In a specific implementation, the material comprises color, texture, and translucency components. Depending upon implementation- and/or configuration-specific factors, a material can be completely transparent, which can have an impact on the apparent location of other objects around the geometry of the transparent object and, if the object is interactive, provide an interactive element that is not a graphical element. An example of a 3DDV object modeling engine, such as the 3DDV object creation engine 304, is described in more detail later.

In the example of FIG. 3, the 3DDV object datastore 306 is intended to represent data structures output by the 3DDV object creation engine 304. The data structures can include 3DDV object components, which may or may not include all characteristics necessary to characterize a given data structure as a 3DDV object, but can be combined with other components, or otherwise used, to facilitate modeling of 3DDV objects. For illustrative purposes, it is assumed the 3DDV object creation engine 304 provides the data structures stored in the 3DDV object datastore 306, but it should be understood 3DDV object components can come from a variety of sources, including an initial library with a plurality of components and/or objects, from individuals or entities willing to share their data, or other sources.

In the example of FIG. 3, the 3DDV object enhancement engine 308 is intended to represent specifically-purposed hardware that facilitates enhancement of objects in the 3DDV object datastore 306 to create enhanced 3DDV objects. Enhancements can include adding 3DDV data visualization features, 3DDV interactivity, 3DDV dynamic personalization, animation features, and audio features, to name several. In a specific implementation, the 3DDV object enhancement engine 308 enhances 3DDV objects to improve one or more of emotional stimulation, intellectual stimulation, interactivity capabilities, personalization, multiuser collaboration capabilities, or surprise. An example of a 3DDV object enhancement engine, such as the 3DDV object enhancement engine 308, is described in more detail later.

In the example of FIG. 3, the 3DDV media authoring engine 310 is intended to represent a specifically-purposed hardware that enables positioning 3DDV objects in a 3DDV scene and configuring the environment and flow of 3DDV media. In a specific implementation, the 3DDV media authoring engine 310 includes tools that enable a 3DDV media author to modify virtual space-time characteristics, in addition to including tools to enable the 3DDV media author to position 3DDV objects within the space-time. Certain aspects of the virtual space-time or 3DDV objects can be left to a 3DDV media audience member to configure, depending upon implementation- and/or configuration-specific factors and/or the choices of the 3DDV media author. An example of a 3DDV media authoring engine, such as the 3DDV media authoring engine 310, is described in more detail later.

In this paper, a scene is intended to be a virtual (potentially time-sensitive) volume in which 3DDV objects can be positioned. It should be noted that a scene may be characterized as what amounts to a field of view (FOV) in contexts outside of this paper, but in this paper, a scene is not a FOV and a FOV is explicitly referred to as such. Accordingly, as used in this paper, a scene assumes unique (within the context of the scene) virtual space-time points to which a 3DDV object can be tied. Where it is desirable to distinguish between a first scene at a first time and a second scene at a second time, the first scene and the second scene can be referred to as "scene instances," and this terminology is used hereinafter. Where it is desirable to describe a time-varying scene, multiple time-adjacent scenes can be referred to as a "scene sequence," and this terminology is used hereinafter. Where it is desirable to describe every scene instance for a given virtual space-time, the collection of every scene instance can be referred to as a "scene tree," and this terminology is used hereinafter. It may be noted a scene tree can consist of a single scene instance if the scene does not vary over time, a single scene sequence if the scene has no conditional branches and unfolds in a linear fashion, or a collection of scene instances and/or scene sequences if conditional branching is enabled.

Figure 4:
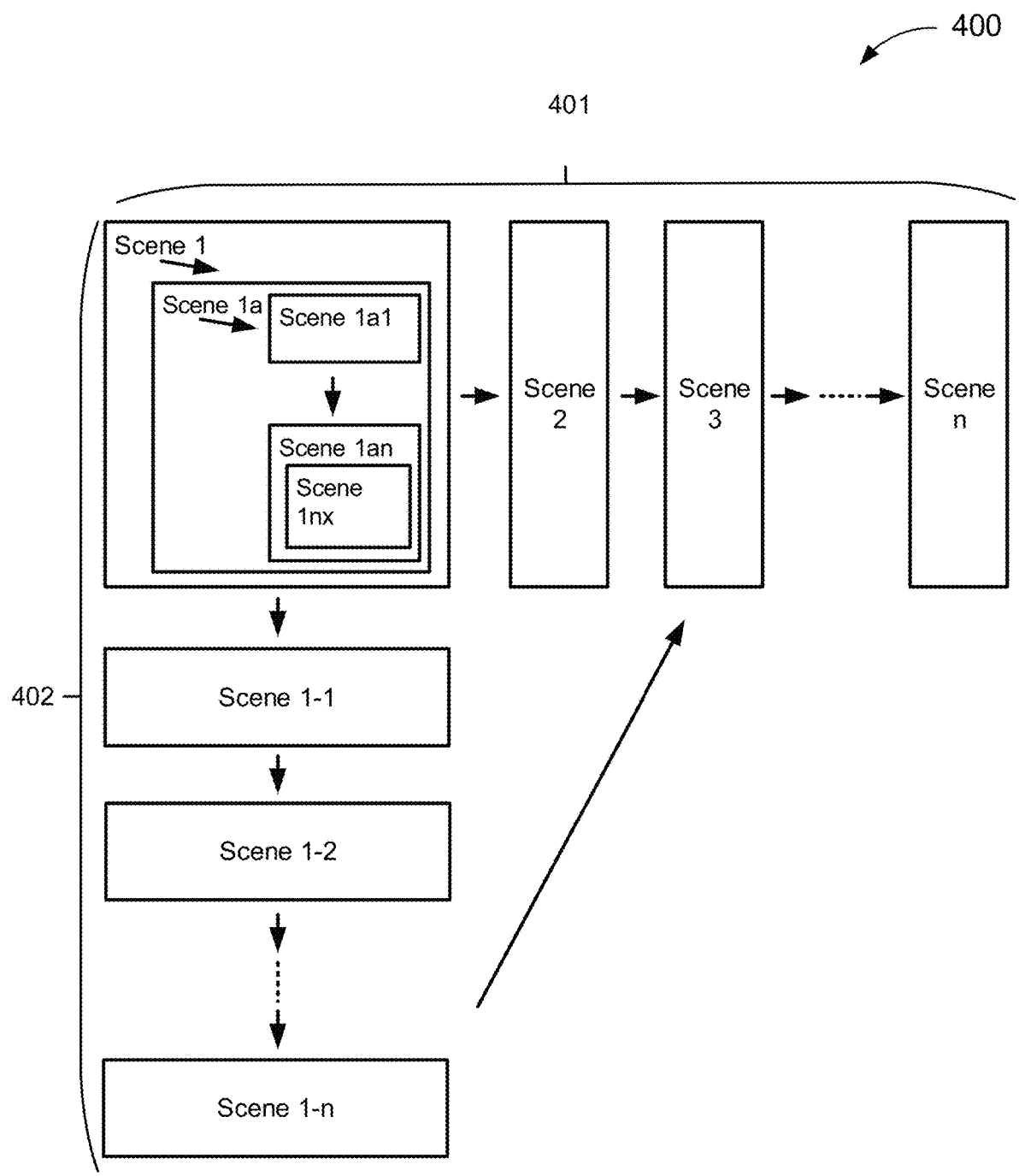
FIG. 4 depicts a diagram of an example of a scene tree.

FIG. 4 depicts a diagram 400 of an example of a scene tree. The diagram 400 includes a scene sequence 401 and a scene sequence 402. The scene sequence 401 includes a sequence of scenes 1 through n, and the scene sequence 402 includes a sequence of scenes 1 through 1-n. Further, the scene 1 includes a scene 1a, which includes a sequence of scenes 1a1 through 1an, and the scene 1an includes a scene 1nx.

In the example of FIG. 4, each scene can be shown in relation to each other either as a sequence, or as "zoom in" to greater level of detail, always enabling a 3DDV media author to understand the spatial relationships between each scene. For example, as shown by the scene 1 in the scene sequence 401, any scene, similar to a paragraph of information, can be organized in a linear fashion similar to a storyline, as a series of content topics in a straightforward sequence. For example, as shown by the scene 1 through the scene 1-n in the scene sequence 402, any scene can have their own story-line, so that any part of scenes can be the starting point its own story. More particularly, for instance, when the scene 1-n is a starting point, the scene 1-n is followed by the scene 3, without passing through the scene 2. For example, as shown by the scene 1a in the scene 1, a scene can embed additional scenes, so as to include information that makes cognitive sense as a drill down to deeper information. At the scene 1a, additional information at a similar level of detail can be shown in sequence, represented as the scene 1an. Because all informational concepts can contain more and more specific detail, there is no end to the number of detailed layers of drill down, so that any of the scenes can have any amount of deeper drill downs, as shown by scene 1nx.

In a specific implementation, a scene tree is designed to unfold within a spherical virtual space-time. One specific type of object that can be positioned in a spherical virtual space-time is a skyscape. A skyscape includes features that do not change size as an audience member moves toward a boundary of the spherical virtual space-time, which improves a sense of mastery over the virtual environment for audience members because of the similarity between the skyscape and the celestial map human beings see practically every day. In alternative implementations, the scene tree unfolds within a virtual space-time that is not spherical (e.g., cubic, rhombic, or some other volume). The scene tree can also unfold between a "ground" and a "sky" much like the space between the surface of the earth and some arbitrary ceiling, but of any desired shape, either wrapping around to form a contained space-time or unbounded along one or more axes. A space-time with no skyscape can be characterized as having no skyscape or as having a transparent skyscape. In this paper, whether the skyscape is transparent or does not exist depends upon whether a skyscape is optional given the particular implementation or configuration. Specifically, if a skyscape can be applied to the boundary of a space-time, a transparent skyscape is referred to as such, but if no skyscape can be applied to the boundary, then the space-time is referred to as having no skyscape. A scene tree may be part of a 3DDV media. For example, multiple space-times could be connected via links that would enable a 3DDV media audience member to navigate from a first scene tree to a second scene tree. As used in this paper, a 3DDV media is assumed to include one or more scene trees and, if there is more than one scene tree, the link between the multiple scene trees.

Referring once again to the example of FIG. 3, the 3DDV media datastore 312 is intended to represent data structures output by the 3DDV media authoring engine 310. The data structures can include portions of a 3DDV media that can be combined with other 3DDV media portions while in presentation mode (e.g., during runtime). For example, a 3DDV display object could include a feed from a 3DDV media component that varies depending upon time (e.g., a current events feed); the geographic, demographic, psychographic, or behavioristic features of an audience member; or on-the-fly commands (e.g., a URL entered during the presentation), to name a few alternatives. A 3DDV media can, depending upon implementation- and/or configuration-specific factors, include global environmental constants or global environmental variables that are set to a constant value for each of the one or more scene trees of the 3DDV media. A 3DDV media can also, depending upon implementation- and/or configuration-specific factors, include global environment variables that differ in value across first and second scene trees, first and second scene sequences, or even first and second scene instances.

In the example of FIG. 3, the 3DDV media playback engine 314 is intended to represent a specifically-purposed hardware that enables playback of a 3DDV media. The 3DDV media playback engine 314 is suitable for implementation on a 3DDV media device, such as is illustrated by way of example in FIG. 1. The 3DDV media playback engine 314 is also suitable for implementation on at least some 3DDV media authoring devices (either as a troubleshooting tool or because the 3DDV media authoring device is dual-purposed to also operate as a 3DDV media playback device), such as is illustrated by way of example in FIG. 1. The capabilities of the 3DDV media playback engine 314 can depend upon the capabilities of a device on which the engine is installed, the richness of features incorporated into a 3DDV media being presented by the engine, control granted to a user of the device, or other factors, but at a minimum the 3DDV media playback engine 314 enables playing 3DDV media as 3DDV media. An example of a 3DDV media playback engine, such as the 3DDV media playback engine 314, is described in more detail later.

In the example of FIG. 3, the 3DDV multiuser access engine 316 is intended to represent a specifically-purposed hardware that enables multiuser access to 3DDV media. Depending upon implementation- and/or configuration-specific factors, audience members can be slaved to a master (e.g., a presenter) in multiuser mode or audience members can be free to establish their own FOV within a given scene. In a specific implementation, the 3DDV multiuser access engine 316 uses subjective coordinates to place all audience members at a single location within a scene, though each audience member may be able to look around to see avatars of other audience members (each of which have an FOV from the single location and perceive other audience members to be at a different location). As used in this paper, audience members in a scene who are aware of other audience member avatars can be characterized as being in the same room. An example of a 3DDV multiuser access engine, such as the 3DDV multiuser access engine 316, is described in more detail later.

In an example of operation, a system such as is illustrated in FIG. 3 operates as follows. The real world data datastore 302 stores (or buffers) data received from one or more sources. The 3DDV creation engine 304 converts data into a 3DDV object. The 3DDV creation engine 304 can also convert non-collaborative and/or non-VR media into a 3DDV object. The 3DDV objects (or components thereof) are stored in the 3DDV object datastore 306. The 3DDV object enhancement engine 308 enhances the 3DDV objects by adding animation, interactivity, or the like. The 3DDV media authoring engine 310 acts in accordance with authoring agents to place a subset of the 3DDV objects in a virtual space-time. The 3DDV media authoring engine 310 may or may not also act in accordance with authoring agents to set global (relative to a set of virtual space-times) or local (for a given virtual space-time) parameters or otherwise set rules associated with multiple virtual space-times, including how certain 3DDV objects behave within the space-times; layout 3DDV objects in a plurality of virtual space-times; and link a plurality of space-times to form an extended scene tree. The 3DDV media generated by the 3DDV media authoring engine 310 is stored in the 3DDV media datastore 312. The 3DDV media playback engine 314 plays back one or more of the 3DDV media in the 3DDV media datastore 312. Depending upon implementation- and/or configuration-specific factors, playback can include on-the-fly conversion of real world data from the real world data datastore 302 for display within an object (e.g., displaying a feed within an appropriate 3DDV object that is updated after storing the 3DDV media in the 3DDV media datastore 312); personalization of one or more aspects in an audience member's FOV; and facilitating interaction with interactive 3DDV objects, to name a few options. The 3DDV multiuser access engine 316 provides multiuser access to a 3DDV media, which can include sharing, security, room selection, head tracking, and mixed reality transitions, to name several.

Figure 5:
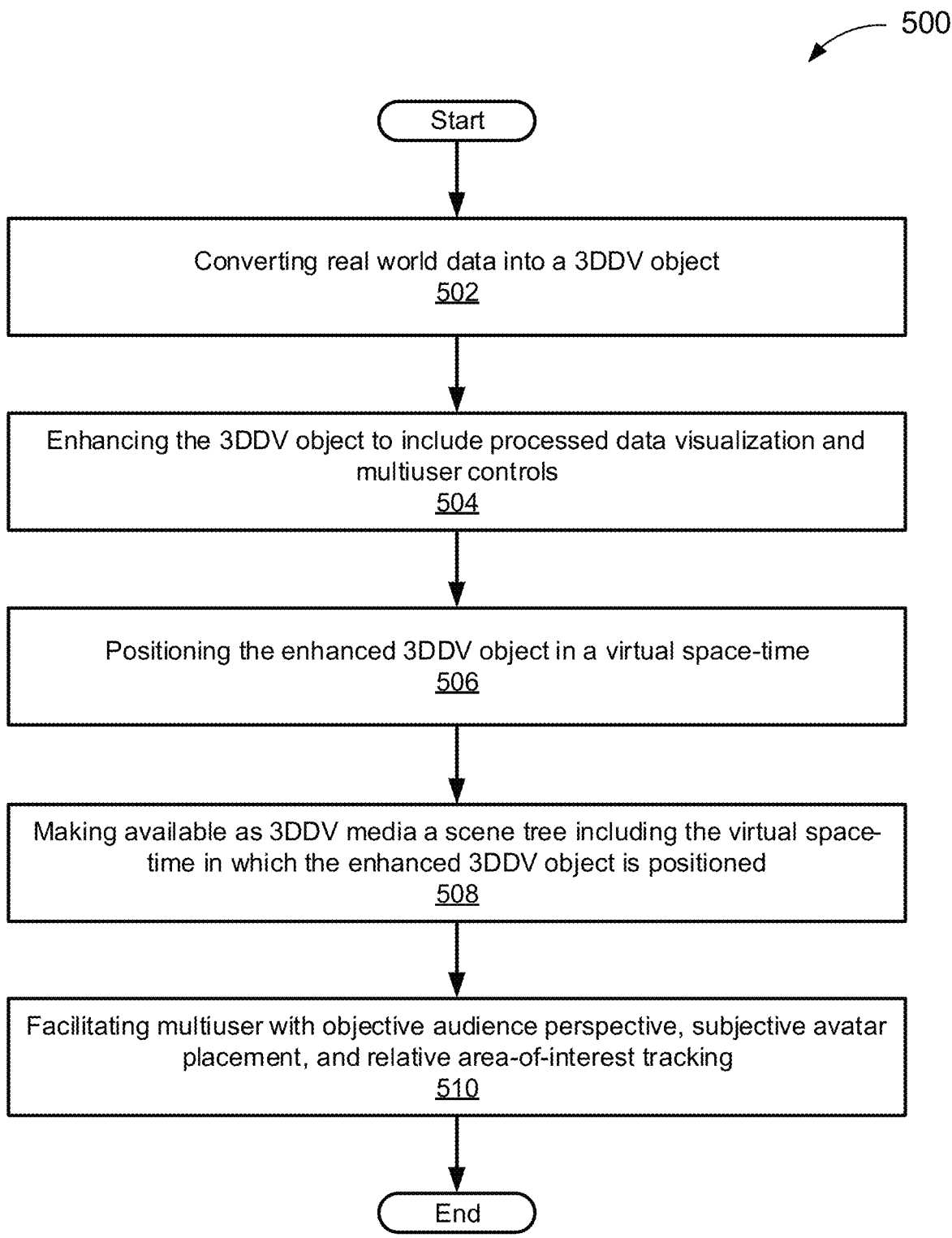
FIG. 5 depicts a flowchart of an example of a method for 3DDV media creation and consumption.

FIG. 5 depicts a flowchart 500 of an example of a method for 3DDV media creation and consumption. The flowchart 500 starts at module 502 with converting real world data into a 3DDV object. Where real world data is raw data ("unprocessed data") a preliminary step of cleaning may occur prior to conversion from real world data to a 3DDV object. Processed data can be presented in a chart, graph, or some other format that, because the presentation has traditionally been visual, is often referred to as a "data visualization" though data can be presented in an entirely audio or in a multimedia format. Hereinafter in this paper, if a distinction between raw data and processed data is desired, the terms raw data and processed data are used. The term "processed data visualization" is intended to refer to processed data that has been converted into a 3DDV object using techniques described in this paper. Similarly, "raw data visualization" is intended to refer to raw data that has been converted into a 3DDV object and specifically is not intended to refer to raw data that has been cleaned and processed for presentation in a conventional chart or graph. The relevant 3DDV objects (associated with raw data visualization or processed data visualization) can be referred to as 3DDV symbol objects to differentiate them from 3DDV media objects, where differentiation is desired.

In the example of FIG. 5, the flowchart 500 continues to module 504 with enhancing the 3DDV object to include processed data visualization and multiuser controls. In a specific implementation, depending upon the data format, enhancement includes expanding data items outside of a typical frame (beyond rectangles in space) as part of a process that is referred to in this paper as "data spatialization," which is discussed later in more detail. Processed data visualization is advantageous because it increases intellectual stimulation due to the way in which humans process information through the hippocampus and can augment the emotive capabilities of 3DDV media objects rendered in association with 3DDV symbol objects. In various embodiments, other enhancements, such as animation, audio, interactivity, and playback customization features are also possible. Processed data visualization, multiuser controls, and other enhancements are described in more detail later.

In the example of FIG. 5, the flowchart 500 continues to module 506 with positioning the enhanced 3DDV object in a virtual space-time. In this example, the 3DDV object has been enhanced with processed data visualization and may, therefore, be referred to as a 3DDV symbol object. It may be noted that other 3DDV objects will in most instances also be positioned within the virtual space-time to create a 3DDV media, but the 3DDV symbol object is explicitly presented in the flowchart for illustrative convenience. Advantageously, 3DDV symbol objects provide a sense of concreteness to the symbols (e.g., alphanumerics) the 3DDV symbol objects comprise. In part because an optimal FOV for an audience member can be controlled or suggested by the layout of the 3DDV symbol objects, audience members can be placed within symbols as if the symbols were a physical thing, thereby activating the hippocampus in the same way objects perceived in real space activate the hippocampus. Thus, audience members organize the processed data as if it were a perceived physical thing, which improves impact and retention.

In the example of FIG. 5, the flowchart 500 continues to module 508 with making a scene tree including the virtual space-time in which the enhanced 3DDV object is positioned as a component of 3DDV media. In a specific implementation, 3DDV media is provided as a collection of files stored in a local file directory on a 3DDV media playback device. In an alternative implementation, some or all of the files are provided from a relatively local server (e.g., a LAN server) or a relatively remote server (e.g., a website accessible via the Internet or public switched telephone network (PSTN)). Instead or in addition, 3DDV media resources can be provided from a repository (e.g., cloud storage) associated with an author, a presenter, an audience member, an entity associated with an author, presenter, or audience member, or a third party.

In the example of FIG. 5, the flowchart 500 ends at module 510 with facilitating multiuser with objective audience perspective, subjective avatar placement, and relative area-of-interest tracking. Objective audience perspective means a virtual sensor (i.e., a "sensor" for a field of view (potentially including audio) within a virtual space-time) for each audience member has a shared position within a scene. Advantageously, by providing objective audience perspective, 3DDV symbol objects can be brought to every audience member in the same way; the audience member need not move around to get an optimal FOV on an area of interest. It should be noted that common virtual sensor position does not necessitate common virtual sensor orientation. For example, depending upon implementation- and/or configuration-specific factors, a common virtual sensor can be locked to a common sensor orientation to provide each audience member a common FOV (ignoring for illustrative purposes personalization, subjective avatar placements, or the like) or audience members may be given the ability to make subjective changes in virtual sensor orientation (e.g., by looking around while wearing a VR headset). Subjective avatar placement means despite common virtual sensor positioning, FOV for audience members can be rendered so as to place avatars of other audience members at locations other than the common virtual sensor position. Advantageously, by providing subjective avatar placement, an audience member can keep track of other audience members (or, more precisely, avatars of the other audience members) in a manner that is natural to human beings (i.e., spatially). Relative area-of-interest tracking means keeping track of head movement, eye movement, and/or 3DDV object selection. Advantageously, by providing relative area-of-interest tracking, audience members can detect areas of interest of other audience members by having their avatars turn their heads, eyes, or point with hands in the direction of 3DDV objects at which the other audience members are directing their attention.

Figure 6:
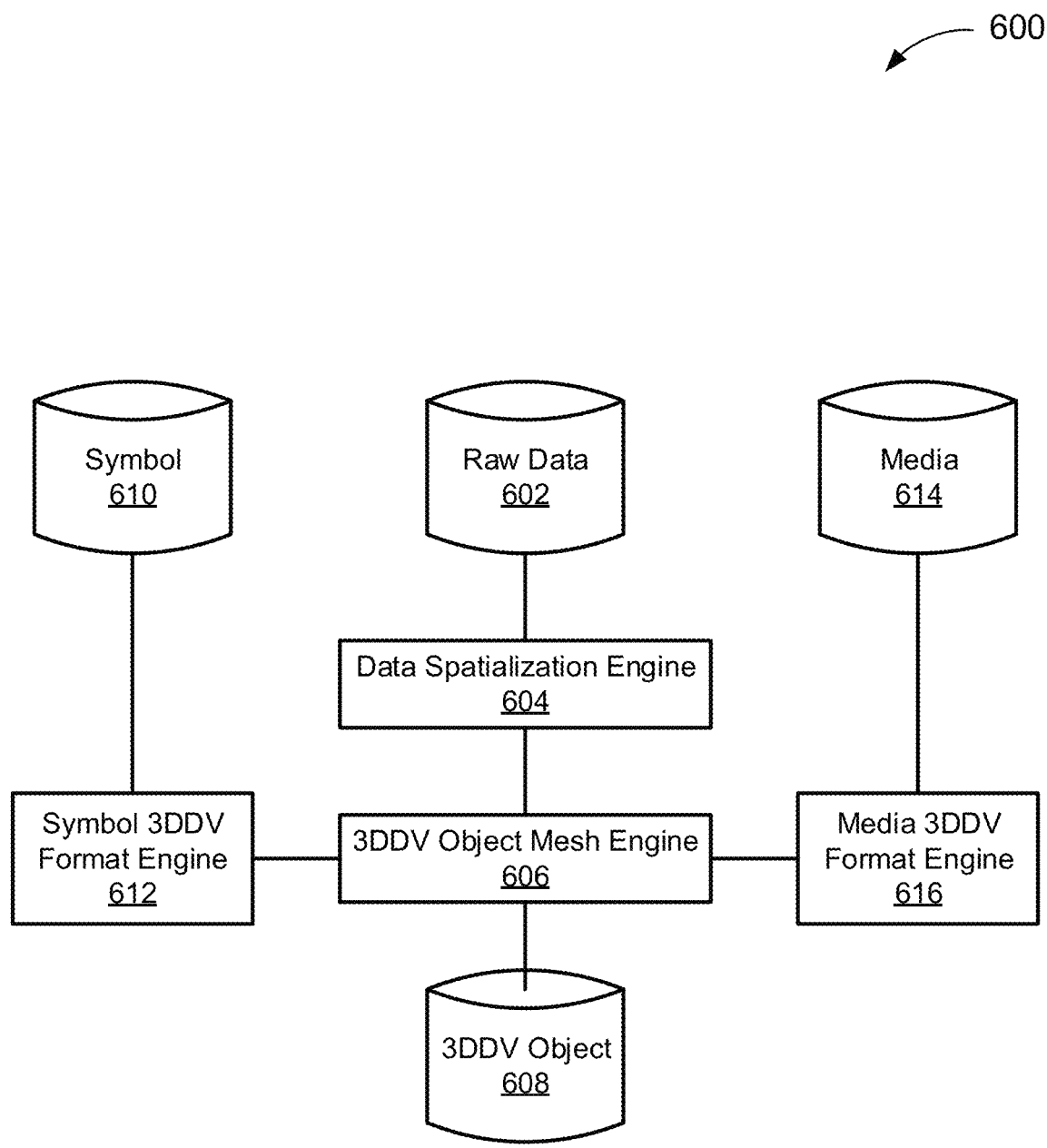
FIG. 6 depicts a diagram of an example of a 3DDV object creation system.

FIG. 6 depicts a diagram 600 of an example of a 3DDV object creation system. The diagram 600 includes a raw data datastore 602, a data spatialization engine 604, a 3DDV object mesh engine 606, a 3DDV object datastore 608, a symbol datastore 610, a symbol 3DDV format engine 612, a media datastore 614, and a media 3DDV format engine 616. In the diagram 600, the raw data datastore 602 is coupled to the data spatialization engine 604; the symbol datastore 610 is coupled to the symbol 3DDV format engine 612; the media datastore 614 is coupled to the media 3DDV format engine 616; and the data spatialization engine 604, the 3DDV object datastore 608, the symbol 3DDV format engine 612, and the media 3DDV format engine 616 are coupled to the 3DDV object mesh engine 606.

In the example of FIG. 6, the raw data datastore 602 is intended to represent discrete data items. Raw data can be provided in a plethora of data structures/formats, such as text files; signals from IoT devices; header or payload of frames or packets; spreadsheets; GPS, timestamp, or other metadata from media images; or numbers, charts, or graphs embedded within a document; to name several, but if only the data within the data structure is to be used in a 3DDV object, the data structure itself can be discarded (at least conceptually), leaving only the raw data. The raw data can either be raw in the conventional sense (as in, unprocessed) or picked from a data visualization format, such as a graph or chart, the data visualization object itself being handled by some other component of the 3DDV object creation system. Thus, the term "raw data" used in this paper is broader in the sense the data items can be selected from a data visualization object, but, obviously, narrower than simply "data."

In the example of FIG. 6, the data spatialization engine 604 is intended to represent specifically-purposed hardware that presents raw data in an unframed, spatial format. An appropriate tagline for this experience is "escaping the tyranny of the frame" in the sense the raw data is presented as 3DDV symbol objects outside of a frame, which can be anchored to a space-time location. To the extent alphanumeric characters are chosen, at least in part, for illustrating the raw data in a 3DDV symbol object, signed distance field fonts can be used to enable zooming in and out of the data while retaining readability. To the extent graphical forms are chosen, at least in part, for illustrating the raw data in a 3DDV symbol object, a 3DDV media object can be created, reused, or updated for that purpose. As used in this paper, a 3DDV object can be a composite object that includes both symbol objects and media objects, while a 3DDV symbol object includes at least a symbol object and may also include a media object, and while a 3DDV media object includes at least a media object and may also include a symbol object.

In the example of FIG. 6, the 3DDV object mesh engine 606 is intended to represent specifically-purposed hardware for creating a 3DDV object from non-3DDV data or data structures (such as raw data, text, or media). In a specific implementation, the 3DDV object mesh engine 606 makes use of a 3DDV framework tools datastore (not shown), which includes at least a 3DDV geometry datastore and a 3DDV materials datastore. As used in this paper, every 3DDV object has a geometry and a materials set. The geometry defines the metes and bounds of the 3DDV object. A practical limitation on the geometry framework is that the geometry facilitate scaling, which in some implementations can result in orders of magnitude differences in the size of a 3DDV object when rendered. The materials set defines surface features of a 3DDV object. A practical limitation of the materials framework is that the material cover be defined for all outer surfaces of a three-dimensional 3DDV object, though a failure to enforce this limitation need not necessarily "break" 3DDV media and may simply make the 3DDV media less aesthetically appealing. The materials set can include different materials for different surfaces or portions of surfaces of a 3DDV object and may or may not also include materials that are used at different times. In a specific implementation, material can include media, such as video, that covers at least a portion of a 3DDV object geometry. In a specific implementation, if the materials set is the null set for a 3DDV object, the 3DDV object is assumed to be completely transparent. Uses of transparent 3DDV objects include interactive objects that hover over other objects or objects that take up virtual space, but that are not visible (though they may be audible). In a specific implementation, the materials set cannot be empty (i.e., the materials set includes at least one material); in two alternatives of the specific implementation, transparent material may or may not be available as an element of the materials set. It should be noted that the term "transparency" is sometimes used to describe a degree of transparency, where only a material with 100% transparency would be considered truly transparent, materials with 0% transparency would be considered opaque, and materials with more than 0% and less than 100% transparency would be considered translucent.

In the example of FIG. 6, the 3DDV object datastore 608 is intended to represent 3DDV object data structures suitable for use in 3DDV media. In a specific implementation, the 3DDV object datastore 608 can also include 3DDV object components that are suitable for incorporation into 3DDV objects, but that are not suitable for use in 3DDV media without incorporation.

In the example of FIG. 6, the symbol datastore 610 is intended to represent a repository of symbols organized so as to convey meaning (e.g., letters organized as words and words and other symbols organized as sentences). While the order of symbols of text is relevant because the order of symbols is associated with a particular meaning, a data structure containing text may be considered irrelevant in certain contexts. For example, symbols from an unformatted text file, a text document, an instant text message, a scanned hand-written document, or a dialog box on a web page convey meaning associated with symbol order that does not depend upon the context in which the symbols are presented. To the extent a context other than meaning is considered relevant, such context can be captured for representation as was described above for raw data or as is discussed later for media. In a specific implementation, the symbol datastore 610 includes semantic and syntactic components, such as a string of symbols organized as, e.g., an English sentence. In a specific implementation, the symbol datastore 610 stores format and/or data structure in case it becomes relevant, but it should be understood all symbolic input could be converted to a standardized, proprietary, or universal data structure that omits the original format or data structure. To the extent symbols are extracted from a format, the data spatialization engine 604 can spatialize the symbols (thereby freeing them from a frame). As a practical matter, it is likely non-3DDV media with symbols visible in the media (e.g., an image of a person holding a book with a visible title) will be converted to a 3DDV media object, but a system could be designed or configured to extract symbols from images and treat the symbols as described here, while treating the rest of the image as described later, then overlaying the symbols on the relevant portion of the image during rendering.

In the example of FIG. 6, the symbol 3DDV format engine 612 is intended to represent specifically-purposed hardware for converting symbols, such as text, into a 3DDV symbol object format. A characteristic of 3DDV symbol objects is that the symbols are rendered as virtual objects. This characteristic requires that the 3DDV symbol objects have a geometry and materials, which are applied by the 3DDV object mesh engine 608 as described previously. Moreover, to avoid anti-immersion impact, the symbols should be scalable in size without pixelation or other visibly unappealing effects. To varying degrees depending upon technological quality and craftsmanship, signed distance field fonts can be used for symbols to provide the scaling capabilities, though other fonts that enable order of magnitude scaling of text without pixelation and that are suitable for use in a 3DDV context can be used.

In a specific implementation, the symbol 3DDV format engine 612 is configured to convert symbols, such as text, into a symbol sculpture (e.g., text sculpture). As opposed to a sculpture formed of dots, the symbol sculpture may contain some meaning by the included symbols. For example, a text sculpture formed in a shape of a map of the United States may contain some meaningful texts corresponding to each state in the corresponding location of each state. Symbols may be presented with corresponding font and/or colors to provide additional meaning. Depending upon implementation-specific or other considerations, the number of symbols (characters) to form a sculpture may contain 250,000 characters or 450,000 characters.

In a specific implementation, the symbol 3DDV format engine 612 is configured to cause at least part of symbols included in a symbol sculpture to be removed depending on a shading and/or an anti-alias demand in the presentation of the symbol sculpture. For example, some symbols located outside of a FOV or far away from a central view point of a viewer may be removed relatively quickly. Symbols included in a symbol sculpture presented may or may not move independently.

In the example of FIG. 6, the media datastore 614 is intended to represent a repository of images, videos, shapes, or the like. In a specific implementation, the media datastore 614 includes media in many different formats, though it should be recognized the various formats could be converted to a proprietary, standardized, or universal format prior to being stored in the media datastore 614. To the extent a context other than geometry and materials is considered relevant, such context can be captured for representation as was described above for raw data or symbols. Metadata can be interesting because it facilitates sharing and collaboration. For example, photos can have GPS and timestamp metadata that may or may not be displayed when a 3DDV object derived from the image is rendered, but is useful for determining timeliness and location. This can facilitate on-the-fly swapping of older for newer images, mapping media to a world grid, and remixing, to name a few. Metadata can also be used to personalize a 3DDV experience for an audience member.

In the example of FIG. 6, the media 3DDV format engine 616 is intended to represent specifically-purposed hardware for converting media, such as images, into a 3DDV media object format. In a specific implementation, the media 3DDV format engine 616 uses vector imaging to convert images into lines and triangles that can be rendered crisply regardless of zoom. Advantageously, in order to improve utility in a 3DDV context, scalable vector graphics (SVG) can be used for 3D object creation. This is advantageous because ubiquitous programs like Adobe Illustrator® use SVG, so making use of SVG in 3D increases the availability of media for conversion to a 3DDV-compatible format. The data spatialization engine 604 can, if applicable, spatialize elements (thereby freeing media from a frame). Some media may be placed on objects. For example, a video could play on the surface of a parallelepiped-shaped virtual object. In such instances, the media can be characterized, at least conceptually, as a material applied to a portion of a 3DDV object geometry. The 3DDV object mesh engine 508 can apply a geometry and materials set to any media that is fully transformed into (or made into an object component of) a 3DDV media object.

In an example of operation, a system such as is illustrated in FIG. 6 operates as follows. Raw data in the raw data datastore 602 is spatialized by the data spatialization engine 604 and converted into 3DDV objects by the 3DDV object mesh engine 606 for storage in the 3DDV object datastore 608. Symbols in the symbols datastore 610 are transformed into an appropriate format (if necessary) by the symbol 3DDV format engine 612, spatialized (if necessary) by the data spatialization engine 604, and converted into 3DDV objects by the 3DDV object mesh engine 606 for storage in the 3DDV object datastore. Media in the media datastore 614 is transformed into an appropriate format (if necessary) by the media 3DDV format engine 616, spatialized (if necessary) by the data spatialization engine 604, and converted into 3DDV objects by the 3DDV object mesh engine 506 for storage in the 3DDV object datastore.

Figure 7:
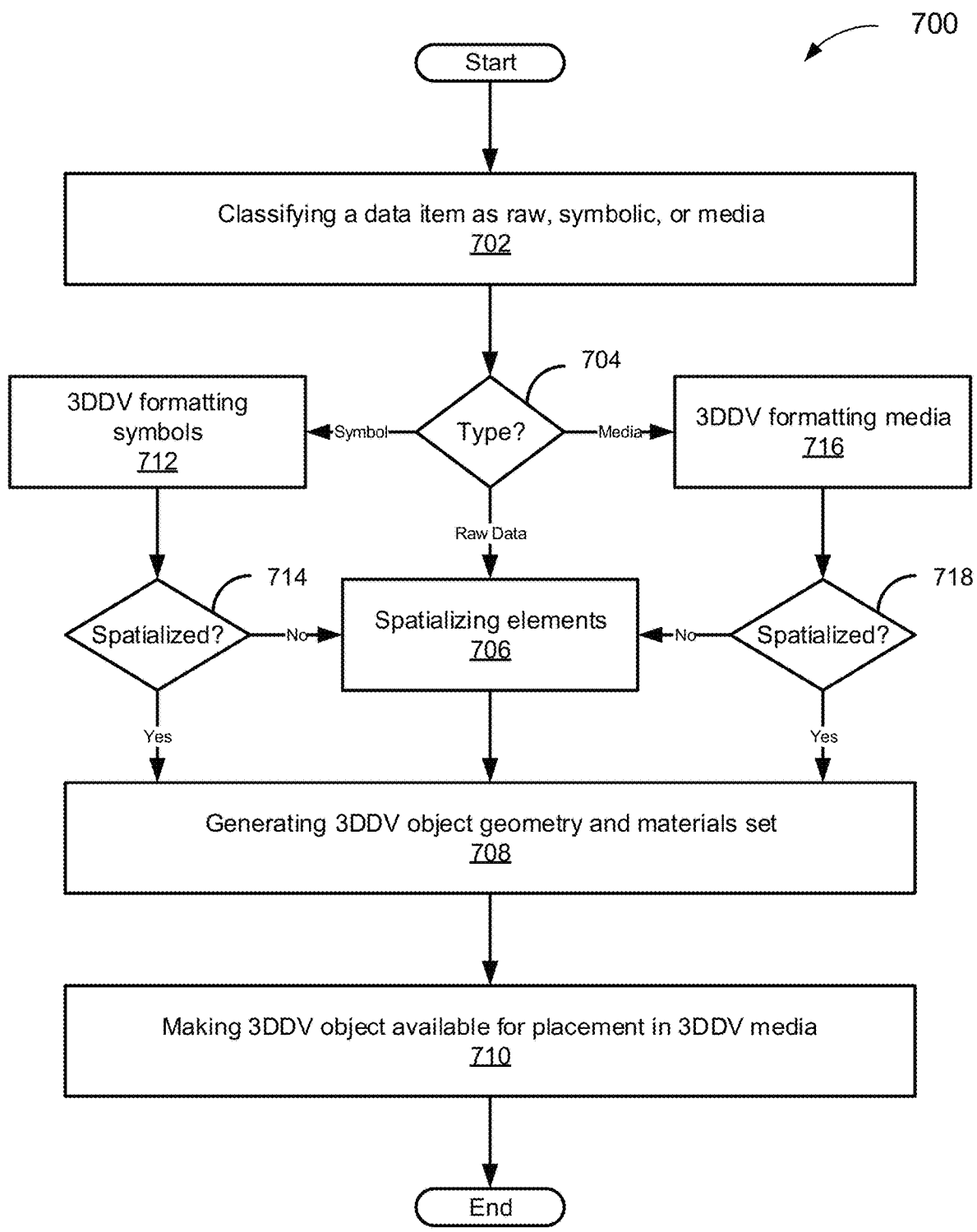
FIG. 7 depicts a flowchart of an example of a method for 3DDV object creation.

FIG. 7 depicts a flowchart 700 of an example of a method for 3DDV object creation. The flowchart 700 starts at module 702 with classifying a data item as raw, symbolic, or media. Raw data is data that has a meaning independent of its format. For example, raw data could have a format of a sequence of comma-delimited numbers in a flat (text) file, but the numeric values could be reorganized and presented in some other format without changing the information obtainable from the raw data. Symbolic data is data that has a meaning dependent upon order within a string of symbols. For example, a string of letters forms a word and a string of words and other characters forms a sentence. Symbolic data has semantic (meaning) and syntactic (form) components. Media data includes images, videos, and/or audio. Images include a varying number of pixels (the number of pixels dependent upon the resolution) with a variety of colors (the number of colors dependent upon the technology). Analog images do not have pixels, but, at least in some implementations, analog images are digitized prior to use, which confines the image to a predefined maximum number of pixels and colors. Video is much like images, but also includes an order. Video images are sometimes referred to as video frames, and the frames may or may not include a full image, depending upon (primarily) data compression techniques that are used. For example, I-frames are complete images, P-frames hold only changes in the image from a previous frame, and B-frames use differences between the current frame and both the preceding and following frames. Audio includes audio signals that are representative of sounds. Audio is similar to video in that the order of sounds is significant and there are no "image-like" audio data items because instantaneous sounds have little value in a consumer-oriented media (though "instantaneous" sounds could, of course be represented as having a given frequency, volume, etc. in some contexts).

In the example of FIG. 7, the flowchart 700 continues to decision point 704 where it is determined whether the data item is raw data, symbolic data, or media. If it is determined the data is raw data (704—Raw Data), then the flowchart 700 continues to module 706 with spatializing elements. Raw data can be sorted, grouped, ordered, and otherwise manipulated for data visualization purposes. In a 3DDV media context, the raw data must be spatialized within a virtual space-time to allow the raw data to be rendered. A system that facilitates the manipulation of raw data will also generally include data processing (e.g., data visualization) tools that enable an author or agent thereof to render processed data in a desired container (e.g., a chart, graph, or the like).

In the example of FIG. 7, the flowchart 700 continues to module 708 with generating 3DDV object geometry and materials set. Processed data and containers thereof have a geometry and materials set. Raw data, if it is desirable to render it as an object, also has a geometry and materials set.

In the example of FIG. 7, the flowchart 700 ends at module 710 with making 3DDV object available for placement in 3DDV media. The placement of 3DDV objects in a virtual space-time of a 3DDV media is described in more detail later.

Returning to decision point 704, if it is determined the data is symbolic data (704—Symbol), then the flowchart 700 continues to module 712 with 3DDV formatting symbols. 3DDV formatting of symbols can include, for example, converting the symbols to a signed distance field font. The flowchart 700 then continues to decision point 714 where it is determined whether the symbolic data is spatialized. If it is determined the symbolic data is not spatialized (714—No), the flowchart 700 continues to module 706 and continues from there as described previously. Symbolic data spatialization may include breaking the symbolic data out of constraining data structures (such as frames). Depending upon implementation- or configuration-specific factors, features of symbolic data other than semantics and syntax can be removed. A system that facilitates the manipulation of symbolic data will generally include symbol (word) processing tools (e.g., spell checkers, editors, translation tools, etc.) that enable an author or agent thereof to render processed symbolic data in an edited form or in a different language. If, on the other hand, it is determined the symbolic data is spatialized (714—Yes), the flowchart 700 continues to module 708 and continues from there as described previously.

Returning to decision point 704, if it is determined the data is media (704—Media), then the flowchart 700 continues to module 716 with 3DDV formatting media. 3DDV formatting of media can include, for example, using a vector imaging format such as SVG to convert images or frames of video to 3D. The flowchart 700 continues to decision point 718 where it is determined whether the media is spatialized. If it is determined the media is not spatialized (718—No), the flowchart 700 continues to module 706 and continues from there as described previously. Media spatialization may include breaking media out of constraining data structures (such as frames). Depending upon implementation- or configuration-specific factors, symbolic features can be removed from media (potentially for reapplication later after 3DDV objectification of the symbolic features). A system that facilitates the manipulation of media will generally include media editing tools that enable an author or agent thereof to render processed media in an edited form. If, on the other hand, it is determined the media is spatialized (718—Yes), the flowchart 700 continues to module 708 and continues from there as described previously.

Figure 8:
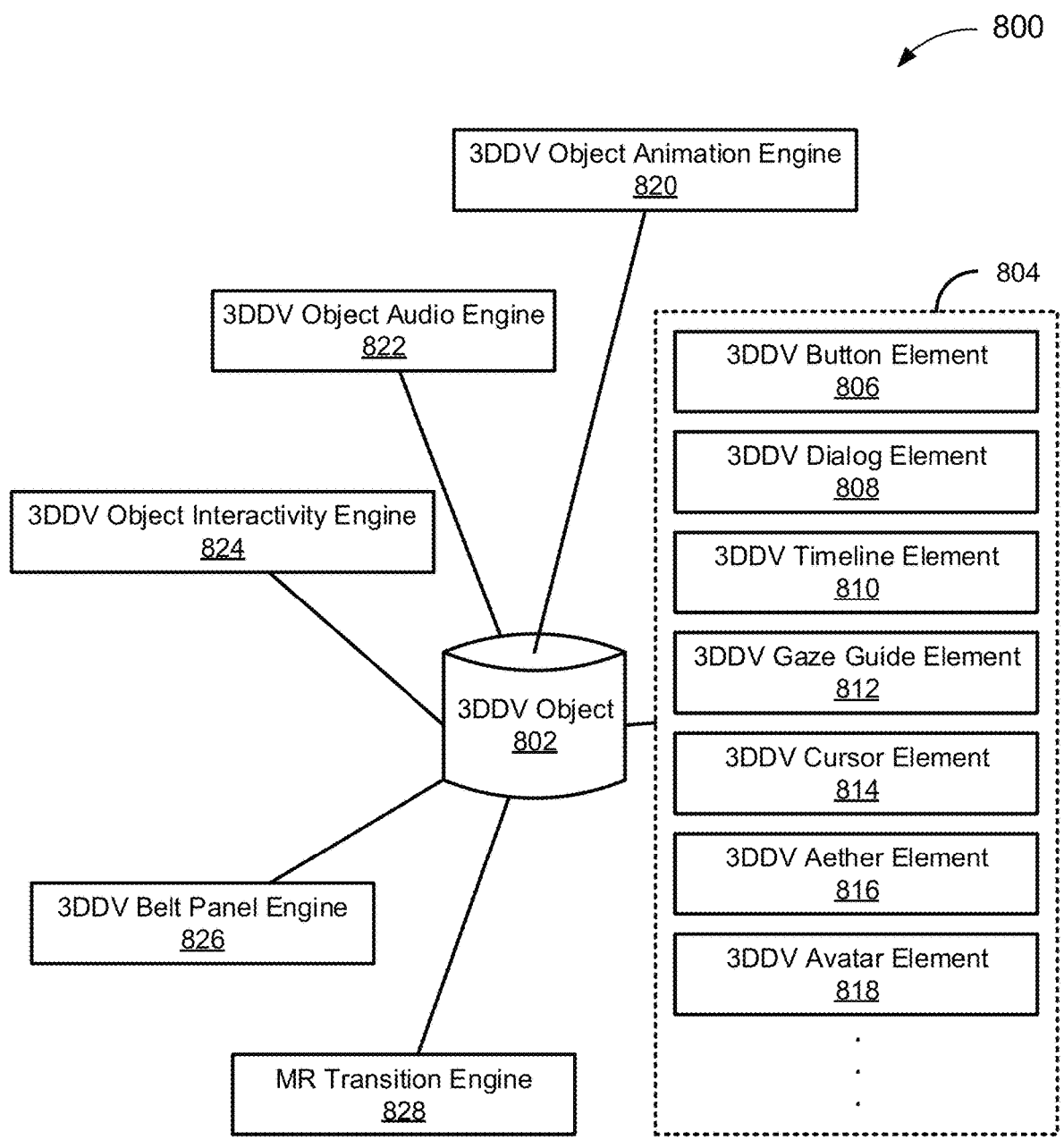
FIG. 8 depicts a flowchart of an example of a 3DDV object enhancement system.

FIG. 8 depicts a diagram 800 of an example of a 3DDV object enhancement system. The diagram 800 includes a 3DDV object datastore 802; a 3DDV element datastore 804, which includes a 3DDV button element 806, a 3DDV dialog element 808, a 3DDV timeline element 810, a 3DDV gaze guide element 812, a 3DDV cursor element 814, a 3DDV aether element 816, a 3DDV avatar element 818, and other elements; a 3DDV object animation engine 820, a 3DDV object audio engine 822, a 3DDV object interactivity engine 824, a 3DDV belt panel engine 826, and a mixed reality (MR) transition engine 828. The 3DDV element datastore 704, 3DDV animation engine 820, 3DDV audio engine 822, 3DDV object interactivity engine 824, 3DDV belt panel engine 826, and MR transition engine 828 are coupled to the 3DDV object datastore 802.

In the example of FIG. 8, the 3DDV object datastore 802 is intended to represent 3DDV object data structures suitable for use in 3DDV media. A 3DDV object CRUD engine is assumed (an example of a 3DDV object creation is illustrated with reference to FIG. 6; read access to the 3DDV object datastore is assumed throughout and should be considered part of a specific implementation; an example of 3DDV object updating is described with reference to FIG. 8 below; delete access to the 3DDV object datastore is not shown, but should be considered part of a specific implementation).

In the example of FIG. 8, the 3DDV element datastore 804 is intended to represent elements (components, templates, or the like) for use with 3DDV objects. The 3DDV button element 806 is intended to represent a template for an interactive control element that can be "clicked." It should be understood that "clicked" can include placing a pointer over a button and selecting the button using mechanisms other than a mouse click (e.g., it could include voice-command selection, hovering for a time, etc.). A preconfigured 3DDV button object may or may not be stored in the 3DDV object datastore 802.

The 3DDV dialog element 808 is intended to represent a template for an interactive graphical control element that communicates information to audience members and prompts them for a response. In a 3DDV context, the dialog element need not be represented as a dialog box because 3DDV objects are not constrained by frames. The 3DDV button element 806 may or may not be considered an element of the 3DDV dialog element 808, which can include a button. A preconfigured 3DDV dialog object may or may not be stored in the 3DDV object datastore 802.

The 3DDV timeline element 810 is intended to represent a template for a zoomable interactive timeline with elements that are tied to 3DDV objects. The 3DDV timeline is a powerful tool in a 3DDV media context because data on the timeline is presented as graphical elements, which improves retention of elements displayed on the timeline due to both the fact the data is presented as an object and due to the apparent distances between the objects on the timeline. A preconfigured 3DDV timeline object may or may not be stored in the 3DDV object datastore 802.

The 3DDV gaze guide element 812 is intended to represent a template for a gaze guide icon. A gaze guide is a mechanism for guiding an audience member in the direction of presentation flow. In a specific implementation, the gaze guide is an arrow that points in the direction of presentation flow when an audience member is not looking in a direction the author wishes. In alternatives, the gaze guide is some other 3DDV object that encourages an audience member to follow it including, potentially, audible instructions. A preconfigured 3DDV gaze guide object may or may not be stored in the 3DDV object datastore 802.

The 3DDV cursor element 814 is intended to represent a template for a cursor icon. A cursor is a mechanism for identifying a point of selection. On a flat-screen computer, for example, the cursor can look like a vertical line in a word processing application or a pointer in a CAD application. In a 3DDV media context, the cursor is rendered as an object. Depending upon implementation- or configuration-specific factors, the cursor may grow larger when close and smaller when far. A preconfigured 3DDV cursor object may or may not be stored in the 3DDV object datastore 802.

The 3DDV aether element 816 is intended to represent a template for an aether icon. Aether icons are located throughout a virtual space-time. In a specific implementation, the aether icons are organized in a 3D matrix, with closer aether icons appearing larger than those farther away. Advantageously, the aether icons do not change size with zoom, which gives audience members a feeling of grounding and reduces the probability of audience members experiencing motion sickness. Depending upon implementation- or configuration-specific factors, the aether icons can be increased in size for audience members who have a greater need for grounding or who are more prone to motion sickness. An author or agent thereof may also choose aether icons of varying sizes based upon aesthetics, the degree of grounding that may be called for in certain portions of a presentation, or audience safety. Depending upon implementation- or configuration-specific factors, the aether fills a virtual space-time, but can be dialed back to increase transparency at spaces farthest from grid intersections, and potentially dialed back to the point that even the grid intersections are completely transparent. In a specific implementation, the aether icons are visible as stars at grid intersections. A preconfigured 3DDV aether object may or may not be stored in the 3DDV object datastore 802.

The 3DDV avatar element 818 is intended to represent a template for an avatar that is rendered in multiuser mode. In a specific implementation, audience members can choose from a predetermined collection of avatars. In an alternative, audience members can provide an avatar object for rendering within a 3DDV media presentation. Depending upon implementation- or configuration-specific factors, avatar objects can "look" in a direction that corresponds to where an audience member is looking and "point" in a direction that corresponds to where an audience member places a cursor. A preconfigured 3DDV avatar object may or may not be stored in the 3DDV object datastore 802.

In the example of FIG. 8, the 3DDV object animation engine 820 is intended to represent specifically-purposed hardware that animates 3DDV objects. In a specific implementation, the animation options include "data visualization spin," which is a unique way of spinning an axis of a data visualization space, which includes information graphics, diagrams, and etc., defined by a plurality of axes, and present a different aspect of the data visualization space, which is generated based on different columns of data from a data store or a spreadsheet. In a specific implementation of the "data visualization spin," the "data visualization spin" may include switching between a two-dimensional presentation of the data visualization space and a three-dimensional presentation of the data visualization space, in either direction.

In the example of FIG. 8, the 3DDV object audio engine 822 is intended to represent specifically-purposed hardware that adds audio to objects. In a specific implementation, a 3DDV audio object can provide multi-channel ubiquitous audio. For example, the 3DDV audio object can provide narration and music. In a specific implementation, the 3DDV object audio engine 822 can provide spatial audio in 3D by incorporating audio into a 3DDV object. When close to a 3DDV object with spatial audio, the audio is louder; when farther from a 3DDV object with spatial audio, the audio is fainter.

In the example of FIG. 8, the 3DDV object interactivity engine 824 is intended to represent specifically-purposed hardware that adds interactivity to 3DDV objects. Interactive objects can be selected by audience members (or presenters) to cause an effect. The 3DDV button element 806, 3DDV dialog element 808, and 3DDV timeline element 810 described previously provide examples of interactivity.

In the example of FIG. 8, the 3DDV belt panel engine 826 is intended to represent specifically-purposed hardware that modifies a belt panel. A belt panel is an interface that is opened when an audience member performs a predefined action. In a specific implementation, looking down causes a belt panel to be displayed within a 3DDV media presentation. Various commands can be chosen from the belt panel, such as ending the presentation, sharing the presentation, rewind or fast forward, or the like. In a specific implementation, the belt panel cannot by modified by all authors or their agents.

In the example of FIG. 8, the MR transition engine 828 is intended to represent specifically-purposed hardware that adds MR transition functionality to an object or collection of objects. In a specific implementation, MR transition includes blurring out the real world to focus on processed data visualization within a 3DDV media. Alternatively, the real world could be "pushed back" to make room for chosen 3DDV content. When transitioning to the real world, 3DDV objects can be converted to lines as the 3DDV presentation ends (or shifts to AR). Alternatively, the real world could be "brought forward" to replace chosen 3DDV content. It may be noted that MR transitions could be accomplished without explicit MR elements in each 3DDV object.

In an example of operation, a system such as is illustrated in FIG. 8 operates as follows. The 3DDV object datastore 802 and 3DDV element datastore 804 store 3DDV objects and components that can be incorporated into 3DDV objects. The 3DDV object animation engine 820 incorporates animation into a 3DDV object, the 3DDV object audio engine 822 incorporates audio into a 3DDV object (or updates a universal audio object), the 3DDV object interactivity engine 824 turns a 3DDV object into an interactive object, the 3DDV belt panel engine 826 modifies the command options or appearance of a 3DDV belt panel, and the MR transition engine 828 incorporates MR transitions into objects or adjusts global MR transition parameters.

Figure 9:
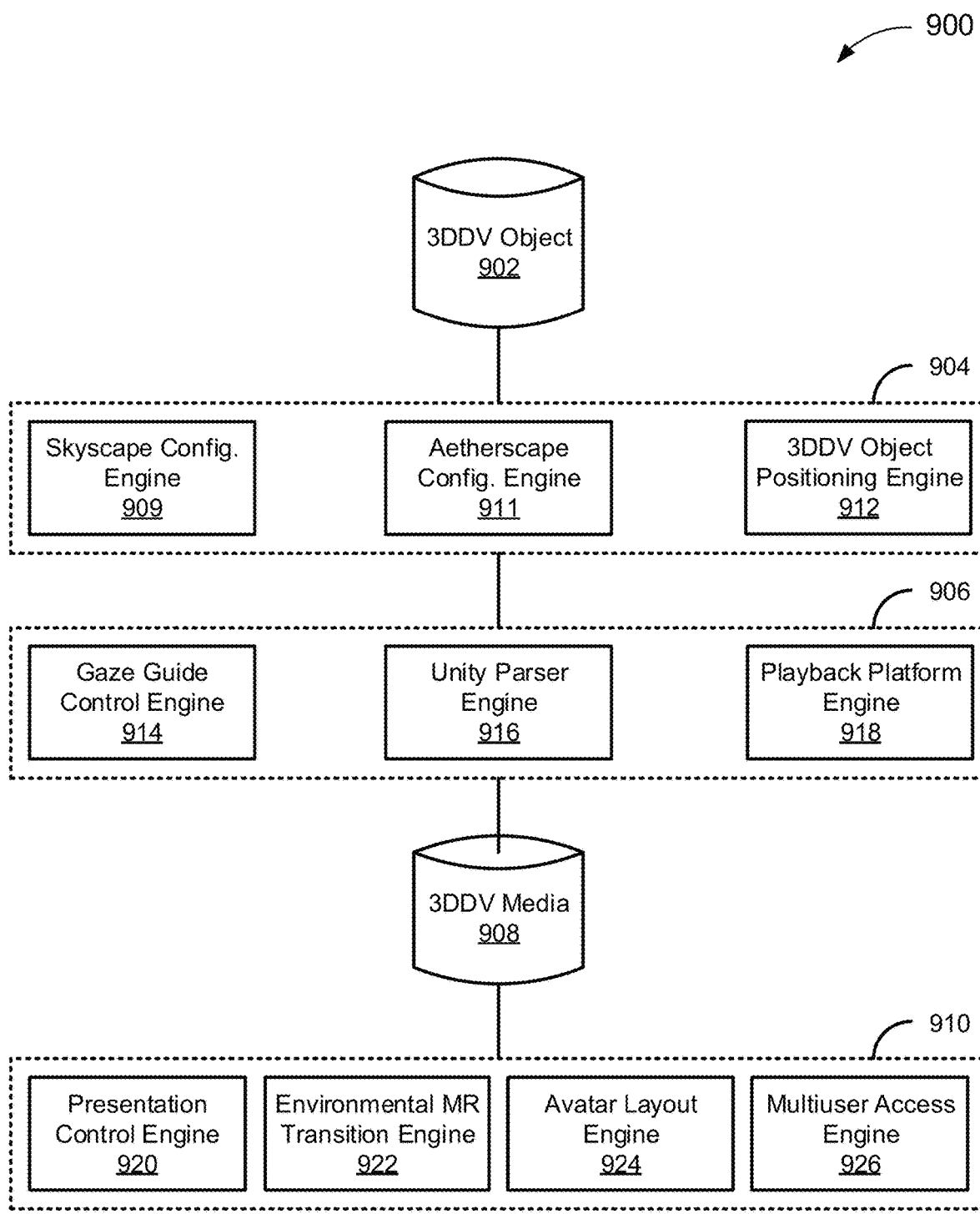
FIG. 9 depicts a diagram of an example of a 3DDV media authoring system.

FIG. 9 depicts a diagram 900 of an example of a 3DDV media authoring system. The diagram 900 includes a 3DDV object datastore 902, a 3DDV media layout subsystem 904, a 3DDV flow control subsystem 906, a 3DDV media datastore 908, and a multiuser control subsystem 910. The 3DDV object datastore 902 is coupled to the 3DDV media layout subsystem 904, the 3DDV flow control subsystem 906 is coupled to the 3DDV media layout subsystem 904 and the 3DDV media datastore 908, and the multiuser control subsystem 910 is coupled to the 3DDV media datastore 908. (It may be noted, FIG. 9 could also be organized to include a 3DDV actions datastore, but the 3DDV actions datastore is treated as part of the 3DDV flow control subsystem 906 in this example.)

In the example of FIG. 9, the 3DDV object datastore 902 is intended to represent 3DDV object data structures that are ready for use in 3DDV media. Obviously, an author with appropriate tools and authorization would be capable of switching back-and-forth between authoring 3DDV media and CRUDing 3DDV objects, but for illustrative purposes it is assumed the 3DDV object datastore 902 includes all 3DDV objects used in the description of the components of FIG. 9. It may be noted that 3DDV objects can have dynamic components that vary with playback. For example, a 3DDV object can include current camera footage displayed upon a display area of a rendered 3DDV object in real time.

In the example of FIG. 9, the 3DDV media layout subsystem 904 is intended to represent multiple engines used to place objects within a virtual space-time of a 3DDV media and to configure an environment thereof. In the diagram 900, the 3DDV media layout subsystem 904 includes a skyscape configuration engine 909, an aetherscape configuration engine 911, and a 3DDV object positioning engine 912.

In the example of FIG. 9, the skyscape configuration engine 909 is intended to represent specifically-purposed hardware that configures the boundaries of a virtual space-time. A characteristic of virtual space-time boundaries is that they cannot be passed; the boundaries define navigable virtual space-time. In a specific implementation, a virtual space-time is bounded on all sides with a consistently distant image. What is meant by consistently distant image is that the image is not impacted by zoom, much as viewing stars in the sky are not impacted by zooming in with a telescope (due to the distance of the stars). Advantageously, a consistently distant image on the boundaries can have the effect of grounding an audience member and reducing the risk of motion sickness. It may be noted the aether may be sufficient to ground audience members, which can free up the skyscape to alternative configurations. For example, navigable virtual space-time could enable approach to the skyscape. As used herein, the ability to approach a skyscape indicates the skyscape is impacted by zoom, much as the walls, floor, and ceiling of a room can be approached by walking toward them, stooping, or climbing a ladder. In a specific implementation, a blend of consistently distant skyscape images and approachable boundaries can be used. A natural example would be a navigable virtual space time on a surface of a sphere with a ground that is an approachable boundary and a sky that has a consistently distant image. In a specific implementation, there may be no boundaries in one or more directions, resulting in an infinite virtual space-time.

In the example of FIG. 9, the aetherscape configuration engine 911 is intended to represent specifically-purposed hardware that configures the space within the boundaries of a virtual space-time. A first characteristic of the aetherscape is aether objects have a regular (or periodic) arrangement. The simplest arrangement of aether objects is probably a grid embodying a 3D Cartesian coordinate system with aether objects centered on the intersections of axes of the grid. Multiple different aether objects can be alternated to create different aether objects in alteration, such as is seen in the microscopic structure of a halite crystal (where alternating sodium and chlorine ions are organized along the cubic axes). Other regular arrangements of aether objects, such as one of the 219 possible crystal symmetries (aka crystallographic space groups), a polycrystalline arrangement, or some other arrangement that provides at least a sense of regularity, can provide sufficient grounding as to be desirable for use in 3DDV media. A second characteristic of the aetherscape is aether objects have invariant zoom size. Invariant zoom size is intended to mean a size that does not change when an audience member zooms into or out of a scene. A third characteristic of the aetherscape is aether objects have relative-to-camera-distance size. Relative-to-camera-distance size is intended to mean a size that varies depending upon the distance from a virtual camera.

In a specific implementation, aether objects have a volume of one unit cell, but most of the unit cell is completely transparent (or at least translucent), while the center of each unit cell is opaque or translucent. For example, a small (relative to a unit cell size) star-shaped object could be rendered in the center of each unit cell, making the aetherscape visible as a grid of stars of diminishing size as the grid stretches away from a virtual camera location. An alternative provides aether objects of less than one unit cell of volume organized on a grid. For example, an actual or conceptual grid can have three axes passing through each unit cell such that the center of each unit cell is at an intersection of grid axes; in this alternative, the aether objects can be located at the intersection of axes.

In the example of FIG. 9, the 3DDV object positioning engine 912 is intended to represent specifically-purposed hardware that positions 3DDV objects within a virtual space-time of 3DDV media. It should be noted that skyscape and aetherscape (particularly aether objects) could, depending upon implementation- or configuration-specific factors, be characterized as 3DDV objects, but are treated differently in this example.

In a specific implementation, 3DDV objects include a subdivided cube, which allows for absolute and relative placement of objects within it. Each 3DDV object has a position, which is organized by point, plane, and alignment. Point specifies x-axis, y-axis, and 9 quadrants on a 2D plane (TopLeft, CenterLeft, BottomLeft, TopCenter, Center, BottomCenter, TopRight, CenterRight, BottomRight). Plane specifies z-axis (Front, Middle, Back). Alignment describes whether the object is drawn inside the parent, to the left/right of the parent, or to the top/bottom of the parent. Advantageously, alignment further facilitates extending beyond the tyranny of the frame. In this specific implementation, there are 9×3=27 possible internal locations and even more external locations at which an object can be aligned. 3DDV objects can include the methods 'add( )' to add the 3DDV object to a parent within a scene and 'addAligned( )' to add additional aligned objects as children.

Advantageously, the 3DDV object positioning engine 912 can take advantage of planes in 3D space. For example, planar axes can be revealed when it is useful to clarify data. In this way, pages (planes) of data can be interleaved with one another and presented so as to illustrate the existence of the pages.

In a specific implementation, the 3DDV object positioning engine 912 is configured to cause a plurality of 3DDV objects (e.g., a 3DDV parent object and one or more child 3DDV objects) to move synchronously and/or together when one of the 3DDV objects is moved during the positioning of the 3DDV objects. For example, when a 3DDV patent object is moved from an original position to a new position, the 3DDV object positioning engine 912 may cause one or more child 3DDV objects of the 3DDV patent object to move synchronously and/or together with the 3DDV patent object. As a result, a positional relationship among the plurality of 3DDV objects can be maintained even after move of the 3DDV patent object.

In a specific implementation, the 3DDV object positioning engine 912 is configured to cause a plurality of 3DDV objects positioned during the positioning to be presented as part of 3DDV media maintaining the relative positioning of the 3DDV objects. For example, when a 3DDV object included in a 3DDV media is moved during presentation of the 3DDV media, one or more other 3DDV objects associated with the moved 3DDV objects may be moved synchronously and/or together.

In the example of FIG. 9, the 3DDV flow control subsystem 906 is intended to represent multiple engines used to control the flow of a 3DDV media experience. In the diagram 900, the 3DDV flow control subsystem 906 includes a gaze guide control engine 914, a unity parser engine 816, and a playback platform engine 918.

In the example of FIG. 9, the gaze guide control engine 914 is intended to represent specifically-purposed hardware that implements rules for the placement 3DDV gaze guide objects at appropriate places in 3DDV media. For example, a 3DDV media author may determine a first 3DDV object must be viewed prior to playing audio associated with the first 3DDV object. To that end, a 3DDV gaze guide object may be rendered to direct an audience member's attention to the first 3DDV object. 3DDV gaze guide objects can be, for example, arrows that point in the direction of interest, thereby encouraging audience members to look in the indicated direction.

The modification of a 3DDV objects to control flow makes use of a flow document model. The document describes a 3D data story and media inclusions to be presented over time, including interactive querying to drill into data, that can be 'performed' via, for example, a web browser, a native implementation (e.g., unity parser engine), or an applicable presentation device. In a specific implementation, an authoring environment is provided to create the flow document model.

In the example of FIG. 9, the unity parser engine 916 is intended to represent specifically-purposed hardware that parses 3DDV data structures to render aspects or modules of a 3DDV media into a single experience. In a specific implementation, the unity parser engine 916 includes a declarative language, such as JSON, or markup language, such as HTML, that provides access to 3DDV objects and other applicable modules within the context of a single 3DDV media. In a specific implementation, the unity parser engine 916 includes an authoring tool for writing and editing the declarative language so end users need not see code, but rather can see a what-you-see-is-what-you-get (WSIWIG) interface. The declarative language used by the unity parser engine 916, along with media and data files, can be saved in a cloud-based datastore along with information describing 3DDV media (e.g., author, shared users, room definitions for multiuser, etc.) so that when a potential audience member selects 3DDV media from a server, all information is present that can load up and present scenes of the 3DDV media.

In a specific implementation, the unity parser engine 916 parses the elements of the declarative language creating objects and actions, with links to related media files, data files, conditional rules, or the like, to facilitate the creation of a complete 3DDV media experience in accordance with a flow document model. For example, where the 3DDV media is crafted from the sum total of all capabilities of a 3DDV media CRUD system (e.g., data visualizations, maps, diagrams, text, lines, iconography, photos, 360° photos, videos, 360° videos, buttons, layout systems, 3D models, narration, music, sound effects, and interaction control panels, to name several) the unity parser engine 916 has access to the language that is used to tie the various components together into one or a series of scenes. As such, a scene can be characterized as an "idea-space" that has enough information and interactivity to present a conceptual idea. Perhaps it is like a scene in a play: it gives the user a sense of a location and objects that exist in that location (just that the location is an idea-space instead of a reproduction of a real 3D space). In some implementations, the environment changes to alert audience members they have moved to another scene, and sometimes the objects rearrange so significantly that they can represent a new idea, and this would also be considered a scene.

In a specific embodiment, scenes are designed to last between 20 and 200 seconds, on average. The unity parser engine 916 has access to a 3DDV media comprising a list of scenes, within each of which is a list of 3DDV objects and action definitions. In a specific implementation, each 3DDV object and action is named to facilitate cross-referencing. For example, a button object will reference a named action definition and an action definition may act upon an object (e.g., start an animation, hide/show an object, etc.) and may also reference a named scene, so that it navigates to the new scene. Actions can also change FOV to zoom in or out of a 3DDV object or move through a potentially complex path through a scene.

As was discussed previously, a positioning system can be applied to 3DDV objects in scenes, which will dynamically lay out the 3DDV objects in position relative to other objects. Although the unity parser engine 916 could conceivably enter hard-coded positions, in a specific implementation, advantageously, objects are positioned relative to other objects without the need for an author or agent thereof to place objects with Cartesian (x,y,z) coordinates or by dragging objects into place in a graphical user interface (GUI).

In the example of FIG. 9, the playback platform engine 918 is intended to represent specifically-purposed hardware that enables configuration of 3DDV media in accordance with playback platform capabilities. It is often desirable to isolate an author (or users of computers in general) from lower layers, such as the physical layer. Accordingly, it is reasonably likely playback platform compliance will be addressed at some level using artificial agents. However, to the extent it is desirable, an author may have control over aspects of 3DDV media that depend upon the playback platform.

In the example of FIG. 9, the 3DDV media datastore 908 is intended to represent 3DDV media that is ready for playback. 3DDV media can be further modified to incorporate multiuser features, as is discussed next.

In the example of FIG. 9, the multiuser control subsystem 910 is intended to represent multiple engines used to add presentation, MR transition, and other multiuser functionality to 3DDV media. In the diagram 900, the multiuser control subsystem 910 includes a presentation control engine 920, an environmental MR transition engine 922, an avatar layout engine 924, and a multiuser access engine 926.

In the example of FIG. 9, the presentation control engine 920 is intended to represent specifically-purposed hardware that incorporates controls for a presenter in a multiuser context. Presentation controls can include the ability to slave audience members to a presenter. The degree of control a presenter has over audience member experience can include no-look-away, which prevents an audience member from turning their heads to render a new image; no-walk-away, which prevents an audience member from leaving a particular spot (but the audience member can still look around); and limited mobility, which forces an audience member to remain within a subset of a virtual space-time. No-walk-away and limited mobility may be accompanied by gaze guides, as discussed previously. Advantageously, audience members share a presenter's scene (or snap back to the presenter's scene if they wander away). Because all of the audience members are co-located, all of the audience members can share a preselected viewing location. The presenter may or may not share the same preselected viewing location. The presentation control engine 920 can also provide additional objects for a presenter in a belt panel, which was discussed previously.

In the example of FIG. 9, the environmental MR transition engine 922 is intended to represent specifically-purposed hardware that provides transitions between real world FOV and 3DDV FOV. Transitions can include blurring out a real world FOV to focus audience members on a 3DDV object, pushing a real world FOV back to make room for a 3DDV object, or some other mechanism for transitioning from a real world FOV to a 3DDV FOV. Transitions can also include blurring out a 3DDV FOV to focus audience members on a real world presentation, pushing a 3DDV FOV back to make room for a real world presentation, converting 3DDV objects to lines to signal transition to a real world FOV, or some other mechanism for transitioning from a real world FOV to a 3DDV FOV.

In the example of FIG. 9, the avatar layout engine 924 is intended to represent specifically-purposed hardware that provides rules for placement of avatars in a multiuser context. As has been mentioned, audience members can share a preselected primary viewing location. However, where audience members are aware of one another in a virtual context, it may be desirable to include avatars of audience members that are not co-located. To that end, without interfering with the subjective coordinate system that places each audience member at a preselected primary viewing location, the avatar layout engine 924 uses an objective coordinate system to place avatars associated with audience members (or to provide rules for placement at run-time). In a specific implementation, the avatars are placed in the same manner other 3DDV objects are placed within a scene. However, to the extent avatars have a head or other feature that enables an observer of the avatar to know in which direction the avatar is looking, the subjective viewing location of the audience member and the objective location of the avatar in the scene should be mathematically coordinated to orient the avatar's head (or analogous feature) in the direction of the audience member's camera FOV. A hand (or selector feature) should be similarly oriented.

In the example of FIG. 9, the multiuser access engine 926 is intended to represent a specifically-purposed hardware that controls multiuser access to 3DDV media. The subjective coordinate system provides a mechanism through which audience members can collaborate more effectively than when audience members have a different vantage point to a scene necessitated by objective coordinate systems in which audience members do not share a primary vantage point.

A 3DDV media author or agent thereof can generally create 3DDV media and playback the 3DDV media as desired. Such 3DDV media can be shared with individuals or agents thereof for playback in a similar manner. When 3DDV media is played back in this manner, it is typically a single-user experience. An alternative is to provide a room in which 3DDV media can unfold in virtual space-time for any audience members that are permitted access to the room. As such, as used in this paper, a room is a virtual space in which an audience member can experience a presentation by a presenter or master (a first type of multiuser) or audience members can share a 3DDV media experience without a presenter or master (a second type of multiuser). It may be noted a single-user experience can also unfold within a room, which can be useful for debugging of multiuser by an author or agent thereof, or a room may be necessitated by implementation- or configuration-specific factors.

3DDV media in the 3DDV media datastore 908 can be made accessible via a URL. When 3DDV media is selected a room is created in which to play self-contained 3DDV media. The room may or may not be password protected. In a specific implementation, a playback device can be given access to authored, shared, or other 3DDV media to which authorization has been granted such that the playback device can select a 3DDV media for playback in the room. It may be noted the multiuser access engine 826 may be available to an author to set multiuser access parameters or to a distributor that has obtained 3DDV media from authors and has the right to set multiuser access parameters (e.g., by enabling login to a web site with a username and password).

In a specific implementation, the multiuser access engine 926 has information about audience members, which can include demographic, geographic, psychographic, behavioristic, or other information. Certain 3DDV objects may be rendered for audience members with appropriate characteristics. For example, a 3DDV data object may be presented in English for a demographic that speaks English, a geographic that places the audience member in the U.S., a psychographic that indicates great interest in English learning, or a behavioristic that indicates the audience member has viewed websites in English; and may be presented in Chinese if determined to be appropriate for an audience member. (This functionality could also be implemented, in whole or in part, in a 3DDV object creation engine, such as the 3DDV object creation engine 304.) 3DDV data objects can also be dynamic in the sense that they render differently depending upon the demographic, geographic, psychographic, behavioristic, or other characteristics of audience members.

Figure 10:
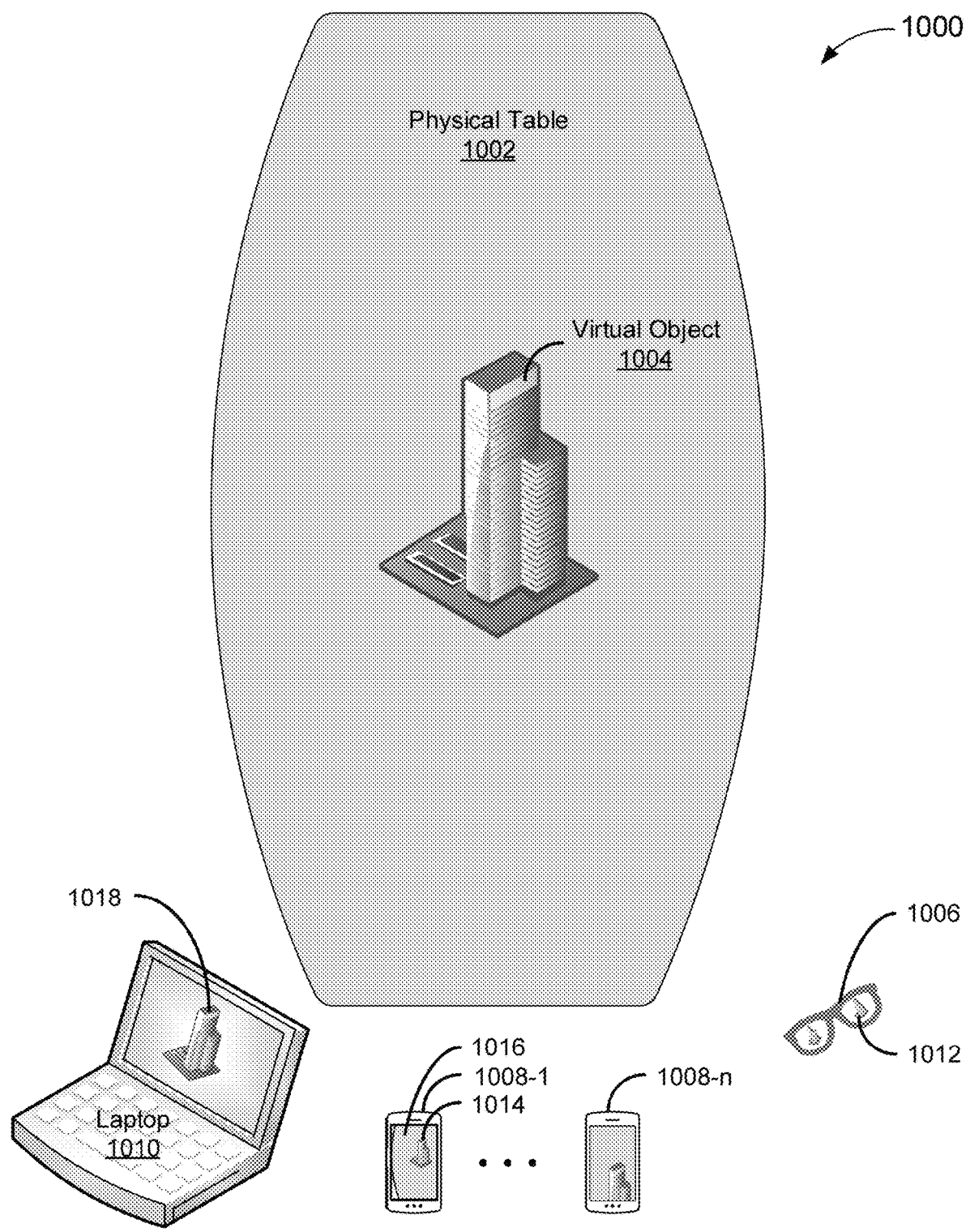
FIG. 10 depicts a diagram of an example of an augmented reality (AR) environment suitable for use with 3DDV.

FIG. 10 depicts a diagram 1000 of an example of an augmented reality (AR) environment suitable for use with 3DDV. The diagram 1000 includes a physical table 1002, a virtual object 1004, AR glasses 1006, a smartphone 1008-1 to a smartphone 1008-n (collectively, the smartphones 1008), and a laptop 1010. Pursuant to AR techniques, the virtual object 1004 is virtually placed on the physical table 1002 such that when the table is viewed using applicable technology, the virtual object 1004 appears to be on the physical table 1002.

The virtual object instance 1012, which is rendered on the AR glasses 1006, is intended to represent the virtual object appearing as an overlay of the real world. As such, a wearer of the AR glasses 1006 would have the virtual object instance 1012 in FOV when looking at the physical table 1002.

The virtual object instance 1014, which is rendered on the smartphones 1008, is intended to represent the virtual object 1004 appearing as an overlay over an image 1016 (of the physical table 1002). That is, the physical table 1002 is converted to an image using, e.g., a camera, and the virtual object instance 1014 is rendered to appear to be on top of the image of the physical table. Instead or in addition, one or more images of the physical table 1002 may be converted to a virtual object. It may be noted that the screens of the smartphones 1008 can display different images, depending upon perspective and viewing choices made by a user.

The virtual object instance 1018, which is rendered on the laptop 1010, is intended to represent the virtual object 1004 appearing on the laptop screen as desired by a user. In the example of FIG. 10, the virtual object instance 1018 is rendered without an image of the physical table 1002 (though that could be done instead, if desired). This type of view may be desirable for a presenter or author or for a participant who is not near the physical table 1002, such as a remote participant.

It should be noted that a simple virtual object was used for illustrative purposes only. In a specific implementation, 3DDV objects are rendered with awareness of nearby physical objects, with images of physical objects, or with virtual objects representative of physical objects, as described above with reference to the diagram 1000.

Figure 11:
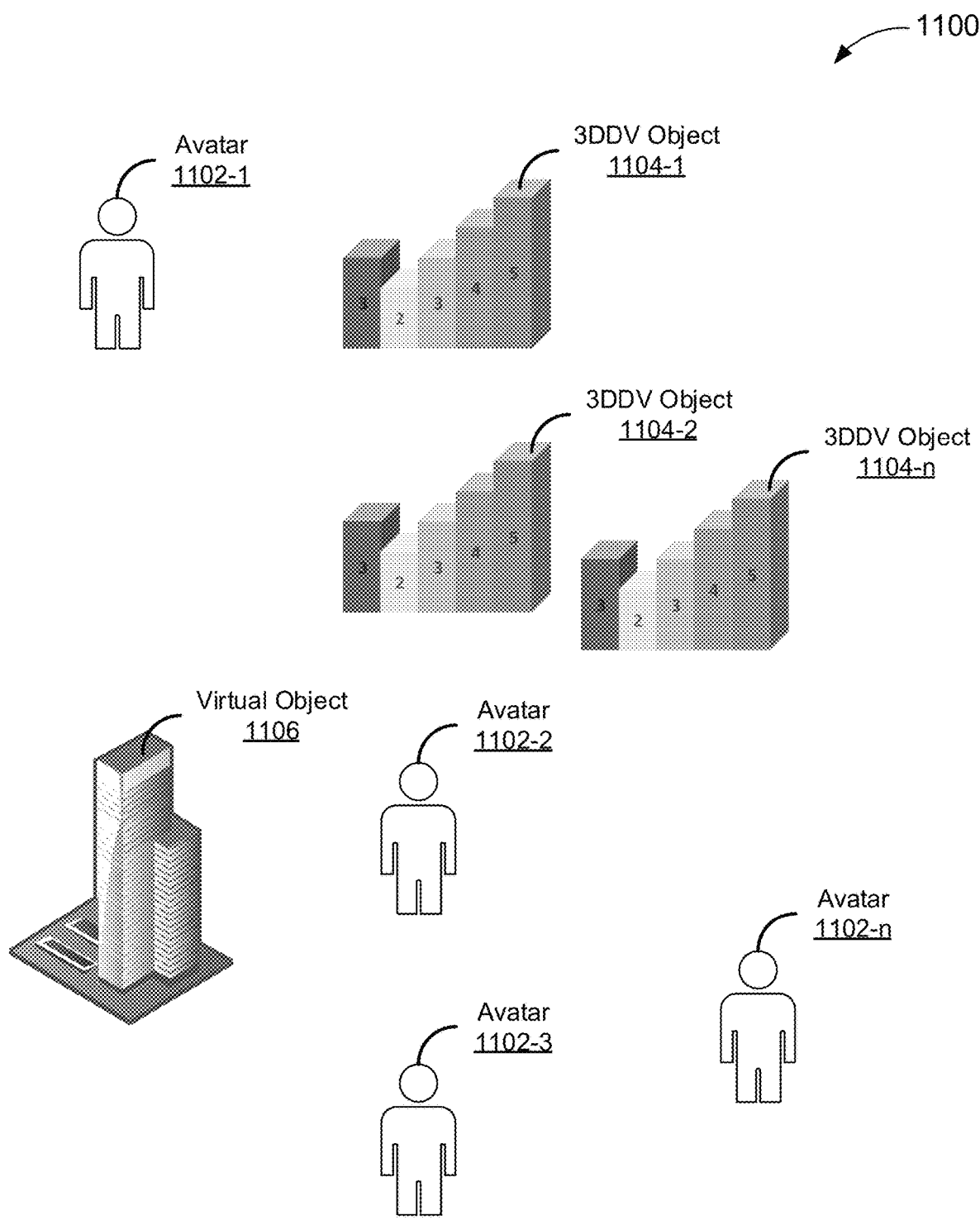
FIG. 11 depicts a diagram of an example of a social virtual reality (VR) environment suitable for use with 3DDV.

FIG. 11 depicts a diagram 1100 of an example of a social virtual reality (VR) environment suitable for use with 3DDV. The diagram 1100 includes avatar 1102-1 to avatar 1102-n (collectively, the avatars 1102), 3DDV object 1104-1 to 3DDV object 1104-n (collectively, the 3DDV objects 1104), and a virtual object 1106.

The avatars 1102 are intended to represent virtual instances of entities that are detectable to other entities in the social CR environment. In a specific implementation, the avatars 1102 represent humans. Depending upon implementation-, configuration-, and preference-specific factors, the avatars 1102 can provide information about the entities they represent, such as current FOV (determinable by where an avatar appears to be looking), emotion (if an expression-recognizing technology is used), physical position (if body position is detectable), superficial characteristics (if applicable image rendering technology is used), or the like. As used in this paper, the appearance, position, and actions of an avatar that convey some information about a corresponding entity or a relationship with another entity can be referred to as "avatar functionality." It is expected that in at least some implementations, humans will be given some control over avatar functionality for their own avatars, though in other implementations, such as an educational environment, it may be desirable to require some avatar functionality, such as facilitating identification of current FOV (to ensure a student is looking at what they are supposed to). An agent who creates a room on behalf of an entity may or may not be given the ability to customize the room to require or restrict certain avatar functionality.

The 3DDV objects 1104 are intended to represent a current iteration of a 3DDV story. As has been explained previously, FOV can be different for different participants, so while the 3DDV objects 1104 can be treated as the default scene of a 3DDV story, it should be understood that individual participants may not see the same things. In a specific implementation, the 3DDV objects 1104 have a set location within an aetherscape (or virtual room). For the purposes of illustration, the avatar 1102-1 has a clear FOV on the 3DDV object 1104-1, but the avatar 1102-2 does not because the 3DDV object 1104-2 is in front of the 3DDV object 1104-1 in the corresponding FOV. Whether an obscuring object can be rendered virtually transparent depends upon implementation, configuration, and/or preferences.

For the purposes of opacity, the avatars 1102 and the 3DDV objects 1104 may or may not be treated differently. For the purposes of illustration, the avatar 1102-2 has a clear FOV on the 3DDV object 1104-2, but the avatar 1102-3 does not because the avatar 1102-2 is in front of the avatar 1102-3 (between the avatar 1102-3 and the 3DDV object 1104-2). Whether an obscuring avatar can be rendered virtually transparent depends upon implementation, configuration, and/or preferences.

In order to ensure avatars never "get in the way" of one another, a 3DDV object can be provided with virtual seating. Virtual seating can be provided at set locations within an aetherscape or can be programmatically implemented with aetherscape offsets that depend upon visibility within an FOV to ensure maximum visibility. Alternatively or in addition, avatars can be reduced in size to reduce obstruction of a 3DDV object. It should be recognized that geospatial orientation is a desired effect when presenting a 3DDV story, so, ideally, 3DDV objects do not shift within the aetherscape in order to accommodate a participant, if possible. In a crowded environment, other techniques can also be used, such as blurring of distant avatars or at the outer edges of FOV.

The virtual object 1106 simply illustrates the fact that objects other than 3DDV objects can be rendered. The virtual object 1106 can serve as a point of orientation, perhaps as a tall tower with a variety of 3DDV stories located in a radius around it, a sidewalk for avatars, or as a road with 3DDV stories along it. In a specific implementation, the social VR environment is encompassed by a skyscape.

The concepts illustrated in the examples of FIG. 10 and FIG. 11 can be combined to provide a social AR environment with physical objects attached to points of the aetherscape, or with the aetherscape overlapping the physical world with physical objects (such as walls, floors, and ceilings) acting as a boundary for the aetherscape. In a specific implementation, a 3DDV story is placed on (or near) a physical object, with the physical object acting as a boundary of the aetherscape, within a social environment (e.g., a conference room). In an alternative, multiple 3DDV stories are placed along a physical object (such as a path) or in association with other physical objects (such as walls and floors) to provide an environment with multiple presenters, such as at a conference. A physical object may or may not act as a skyscape in that a 3DDV story takes place on a surface of a physical objects, such as a table, and does not penetrate the table; or a skyscape may hide a physical object, such as a ceiling.

Figure 12:
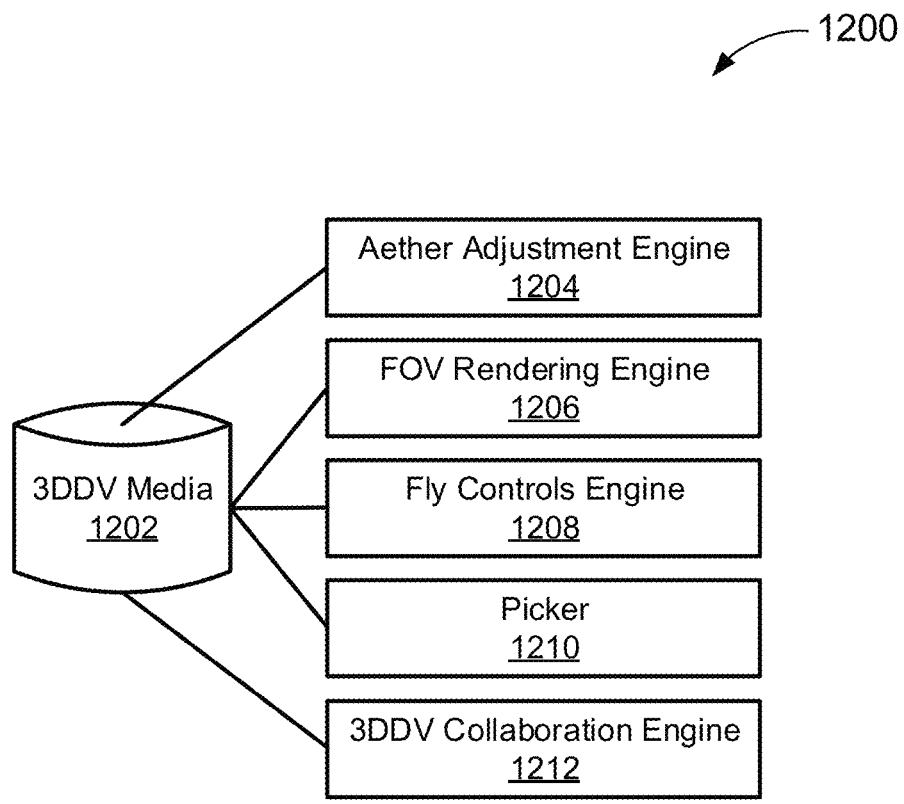
FIG. 12 depicts a diagram of an example of a 3DDV media playback system.

FIG. 12 depicts a diagram 1200 of an example of a 3DDV media playback system. The diagram 1200 includes a 3DDV media datastore 1202, an aether adjustment engine 1204, an FOV rendering engine 1206, a fly controls engine 1208, a picker 1210, and a 3DDV collaboration engine. The 3DDV media datastore 1202 is coupled to the aether adjustment engine 1204, the FOV rendering engine 1206, the fly controls engine 1208, the picker 1210, and the 3DDV collaboration engine 1212.

In the example of FIG. 12, the 3DDV media datastore 1202 is intended to represent 3DDV media that is ready for playback. 3DDV media can be further modified to incorporate multiuser features, as is discussed next.

In the example of FIG. 12, the aether adjustment engine 1204 is intended to represent specifically-purposed hardware that changes aether objects in accordance with audience member preferences. Advantageously, an audience member who feels the need for more grounding or who is more prone to motion sickness can adjust the size and/or unit distance between aether objects to a configuration that improves grounding and is less prone to cause motion sickness. Audience members who are less prone to motion sickness may choose to decrease aether object size and/or density or remove the aether objects from their FOV entirely.

In the example of FIG. 12, the FOV rendering engine 1206 is intended to represent specifically-purposed hardware that renders FOV of 3DDV media based upon a virtual camera position of an audience member. In a specific implementation, the FOV rendering engine 1206 is installed on a playback device. In an alternative, the FOV rendering engine 1206 is partially installed on a playback device. In yet another alternative, the FOV rendering engine 1206 is executed remotely from a playback device and the resultant FOV is provided to the playback device. (It may be noted, in the alternatives, the playback device could be characterized as two or more devices relatively remote to one another, but for illustrative purposes it is generally assumed in this paper that the playback device at least includes a 3DDV media playback component that is worn or otherwise placed in close proximity to an audience member.)

In the example of FIG. 12, the fly controls engine 1208 is intended to represent specifically-purposed hardware that provides fly controls for a playback device that is playing back 3DDV media. Fly controls enable an audience member positioned at a primary vantage point (in the "center" of, e.g., 3DDV data objects), with data potentially moving around the audience member, to move through the various, e.g., 3DDV data objects. The amount of fly control varies depending upon implementation- or configuration-specific factors, but can include an autopilot that forces an audience member along a predefined path, a linear path that the audience member can speed up or slow down, a linear path with options for an audience member to leave the path for a time, a nonlinear path that allows for detours or branching, or even a sandbox.

In the example of FIG. 12, the picker 1210 is intended to represent specifically-purposed hardware that targets and selects objects or locations within a virtual space-time. In a specific implementation, the targeted object or location is identified with a cursor or pointer icon that moves in a manner that is implementation- or configuration-specific. For example, an audience member could move a handheld device, mouse, or other input device to move the cursor within the virtual space-time. Alternatively or in addition, targeting could be for whatever location is in the center of a FOV such that when an audience member turns to look at an object or location, that object or location is automatically targeted. It may be noted that a 3D environment may or may not make a 3D targeting mechanism desirable, such as a mouse that targets any portion of an FOV and a wheel that sets distances. In a specific implementation, the targeted object or location is selectable with an event. The event can include a click of a physical button, a verbal command, an amount of time passing with the same object or location targeted, or the like. When an object or location is picked, an action takes place that can depend upon rules associated with the object or in accordance with object-independent rules for picking objects or locations.

In the example of FIG. 12, the 3DDV collaboration engine 1212 is intended to represent specifically-purposed hardware that facilitates collaboration. In a specific implementation, the 3DDV collaboration engine 1212 stores objects, scenes, or scene trees for sharing or remixing. Depending upon implementation- or configuration-specific factors, the 3DDV collaboration engine 1212 may also CRUD editable objects within a 3DDV media (and control CRUD rights, if applicable), which other audience members can edit if they have the appropriate rights. Advantageously, collaboration can be organized using object metadata (timestamp, GPS, etc.) to locate objects in an appropriate virtual space-time. In addition, objects can have virtual metadata associated with a virtual space-time that gives additional organizational control, thereby improving collaboration.

Figure 13:
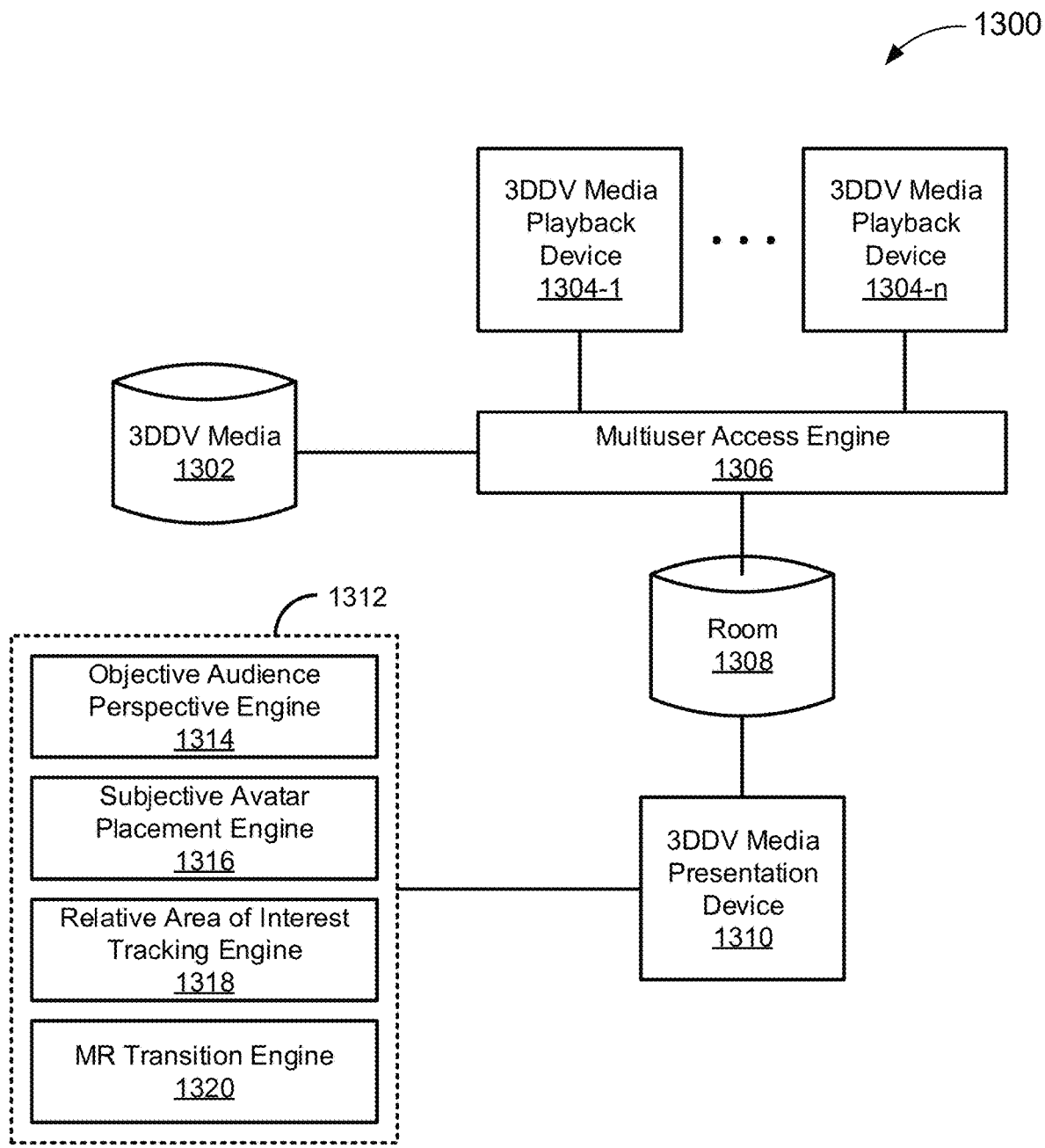
FIG. 13 depicts a diagram of an example of a 3DDV multiuser access system.
Figure 14A:
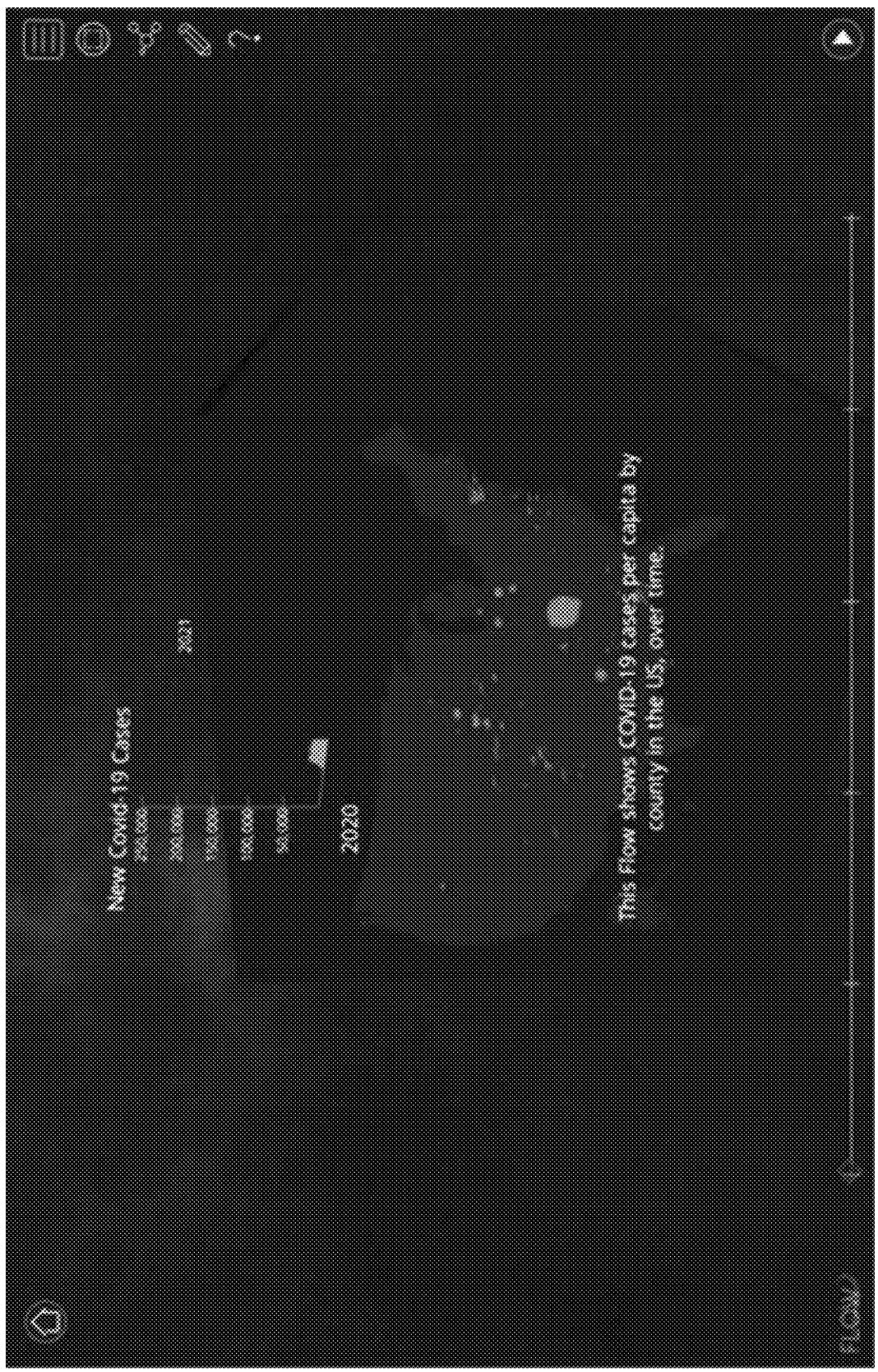
FIGS. 14A-14E depict a geospatial, time-series, thematic map with a threshold using six illustrative screenshots.
Figure 14B:
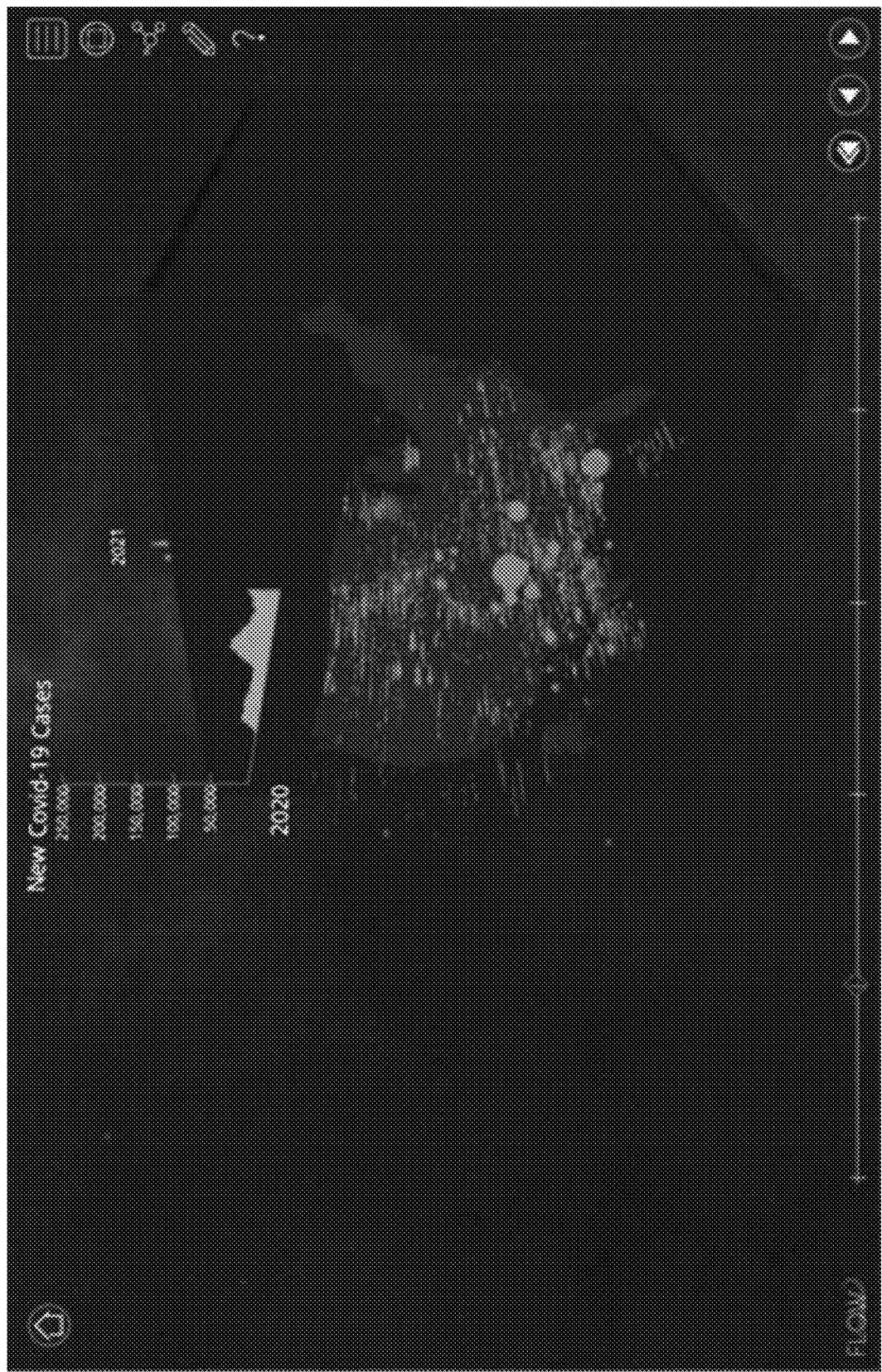
Figure 14C:
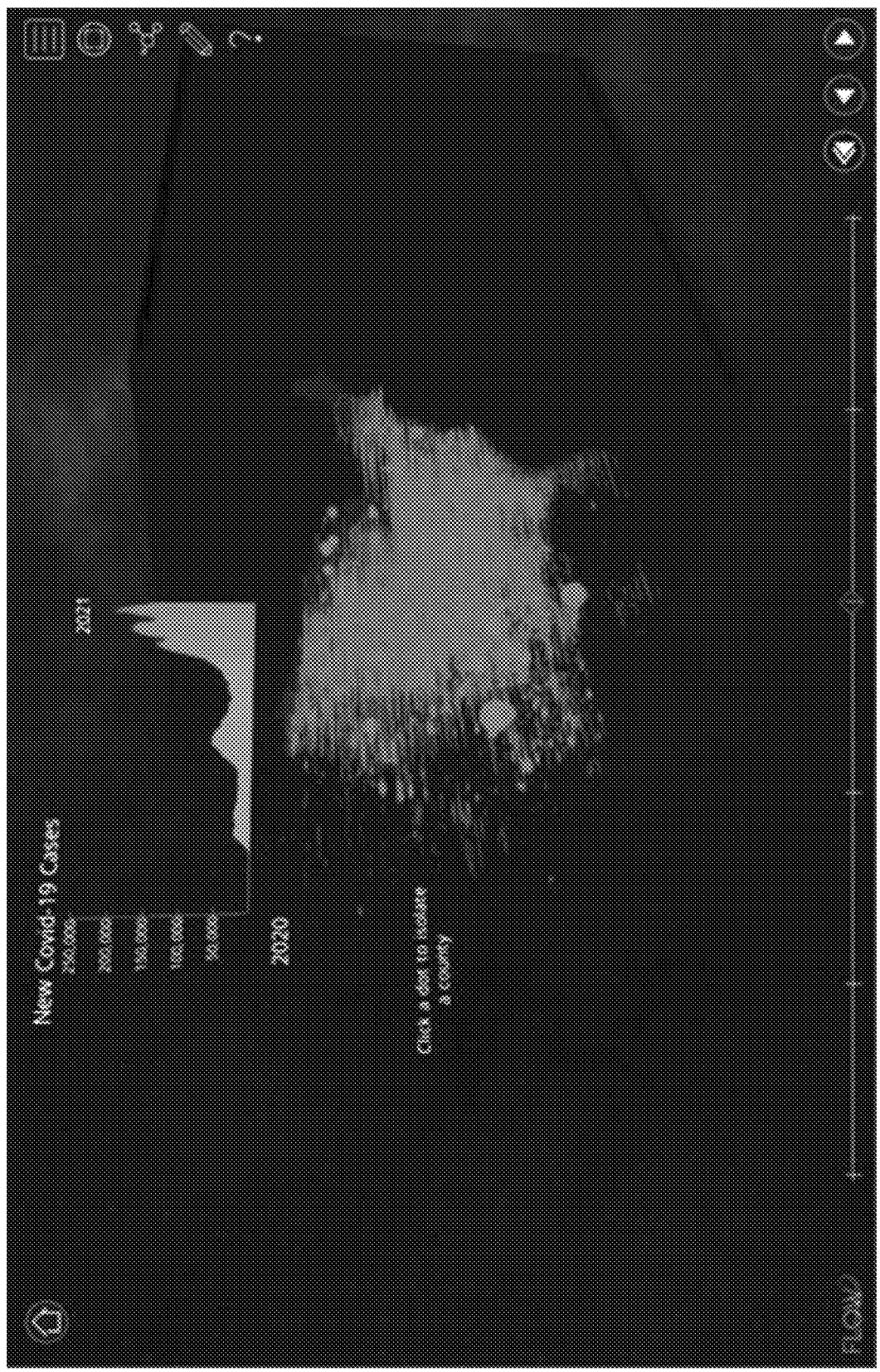
Figure 14D:
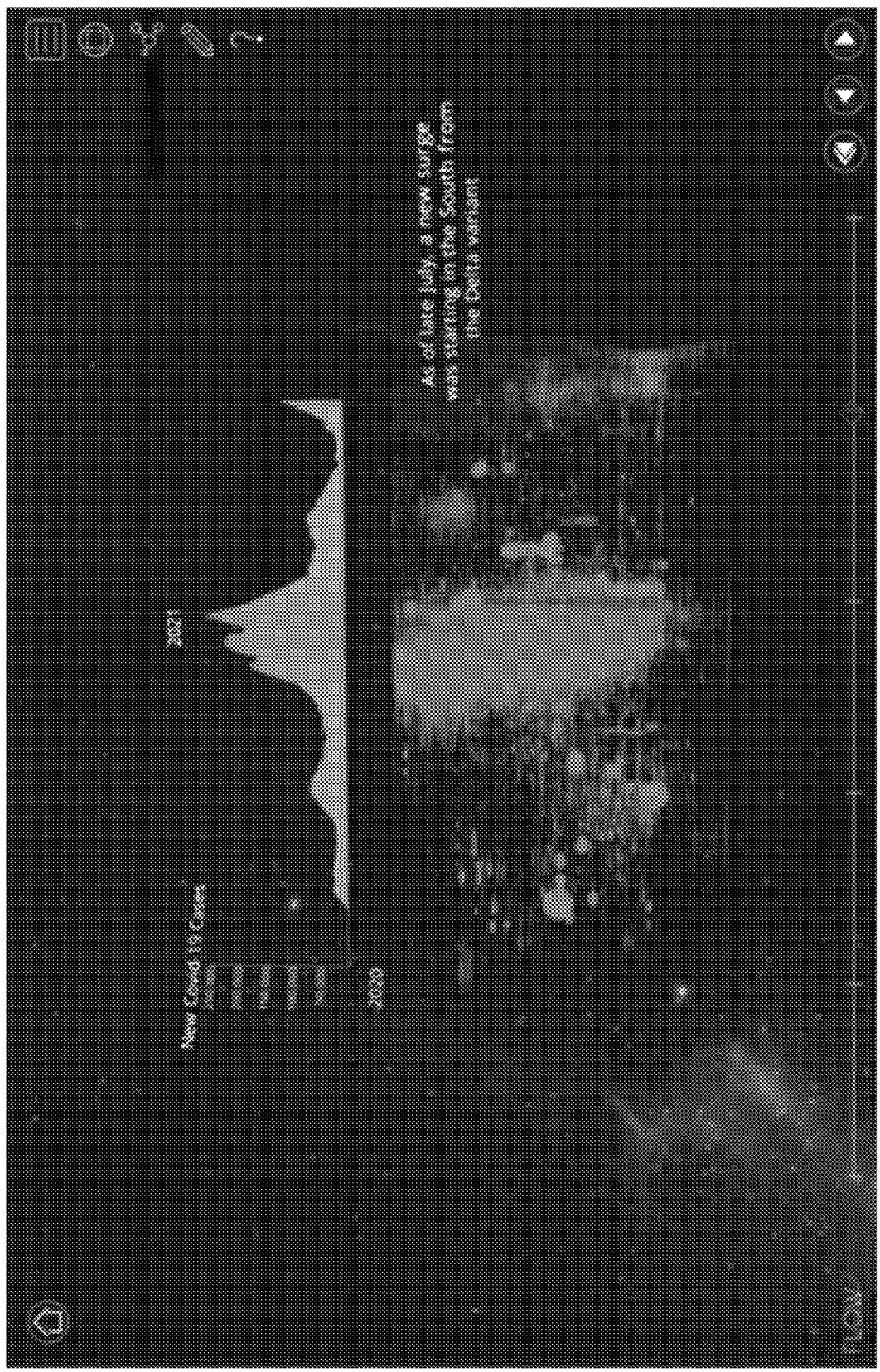
Figure 14E:
Figure 15A:
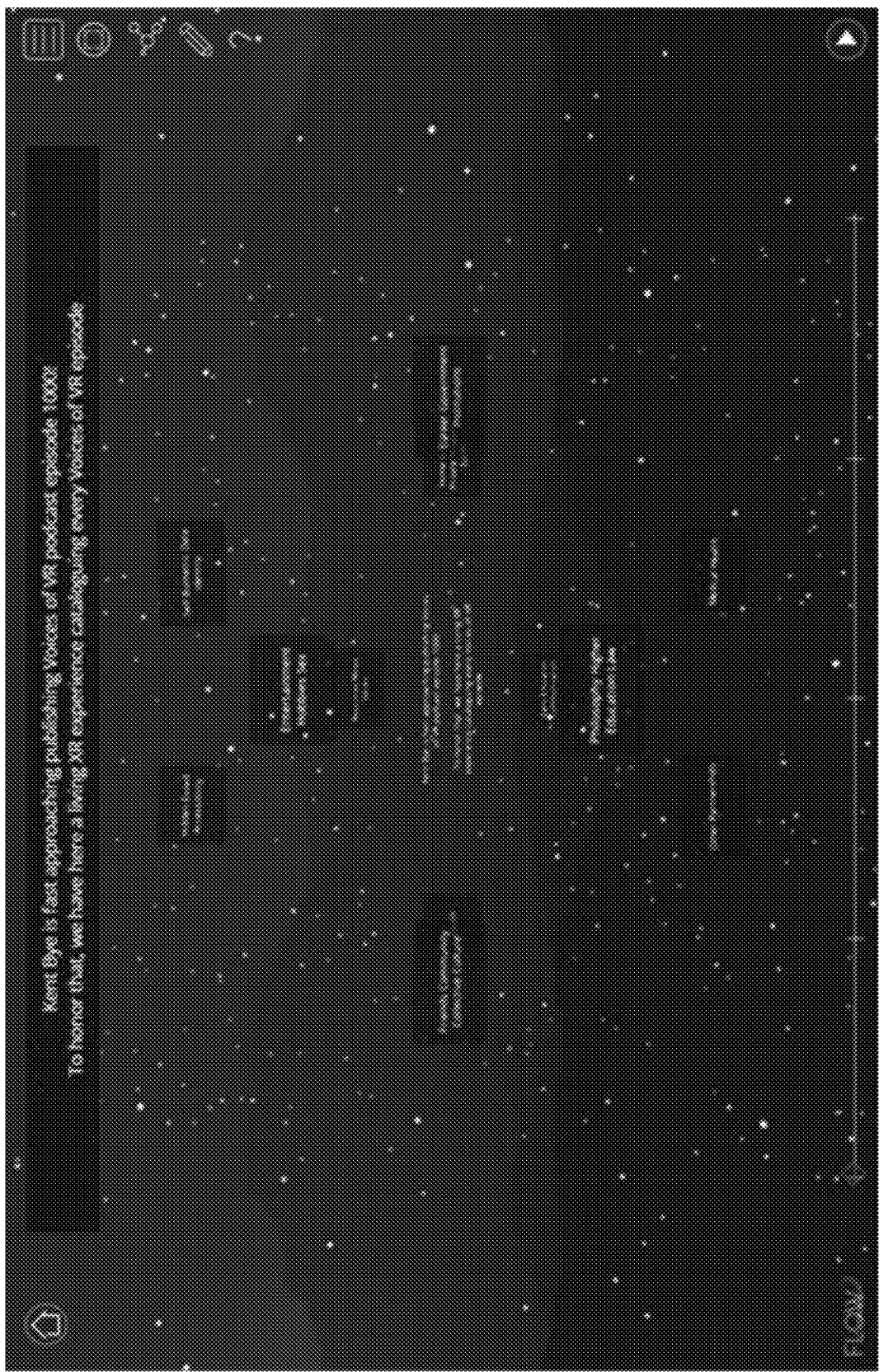
FIGS. 15A-15E depict attractive polyhedron vertex clustering using five illustrative screenshots.
Figure 15B:
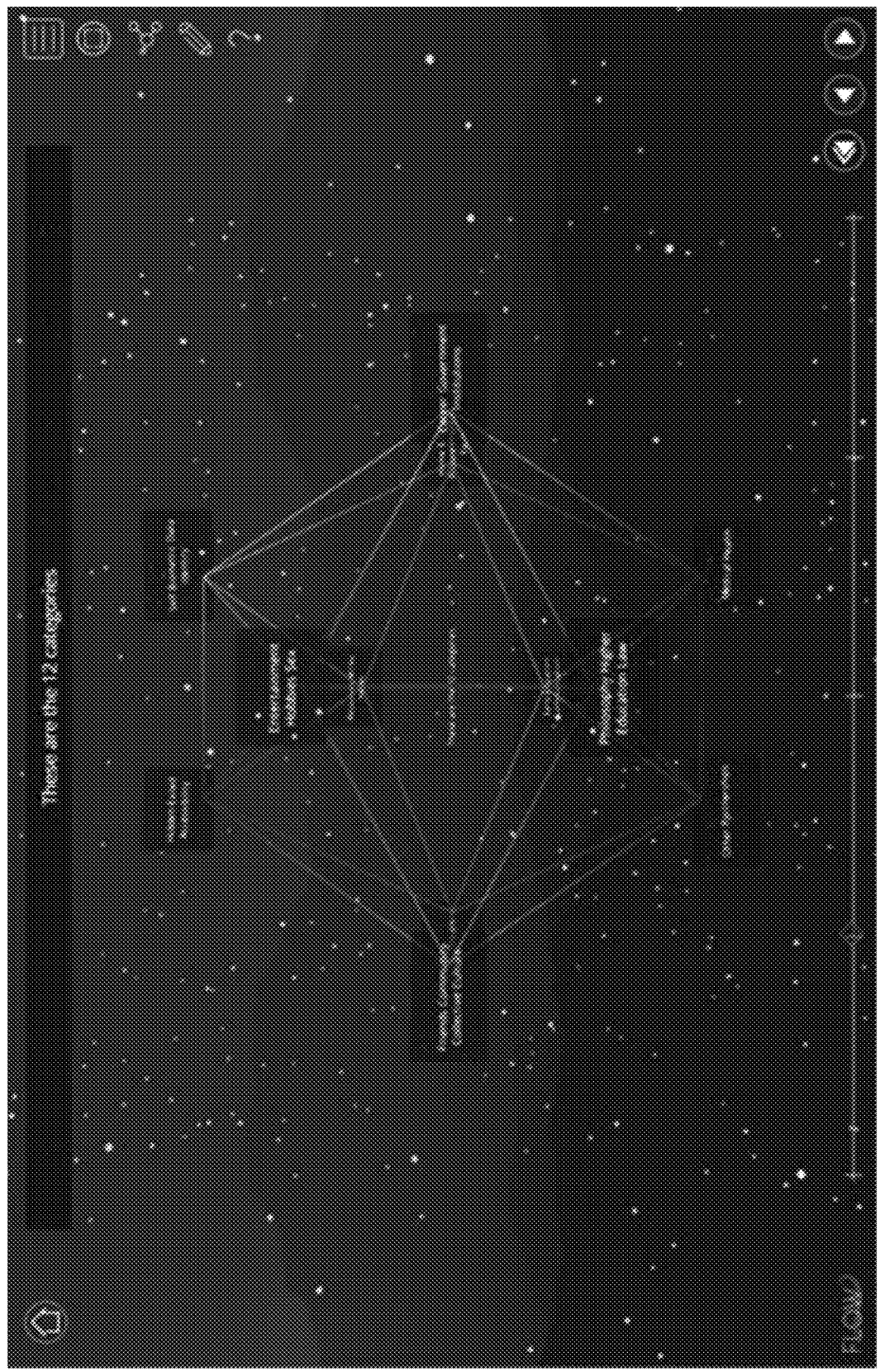
Figure 15C:
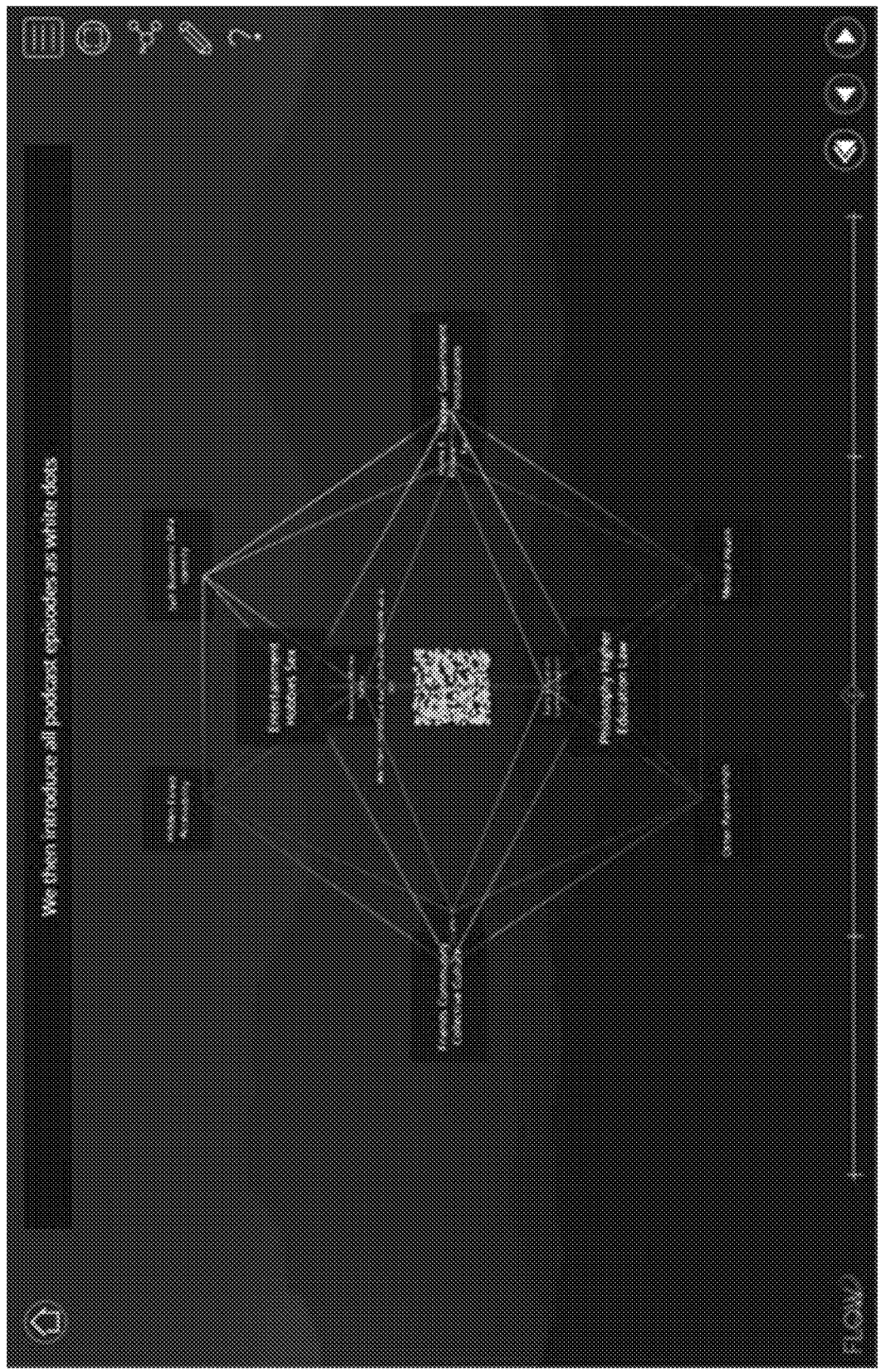
Figure 15D:
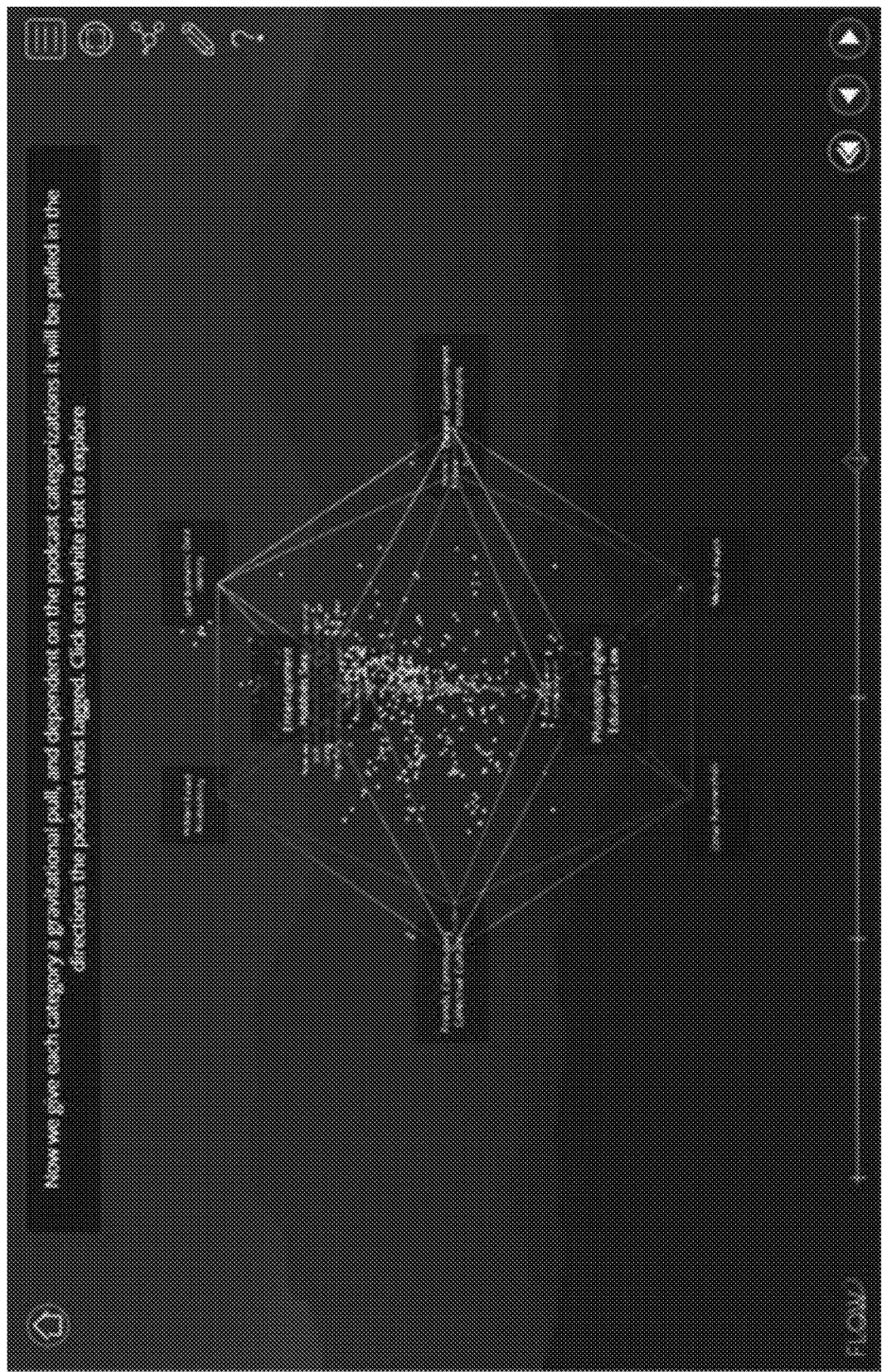
Figure 15E:
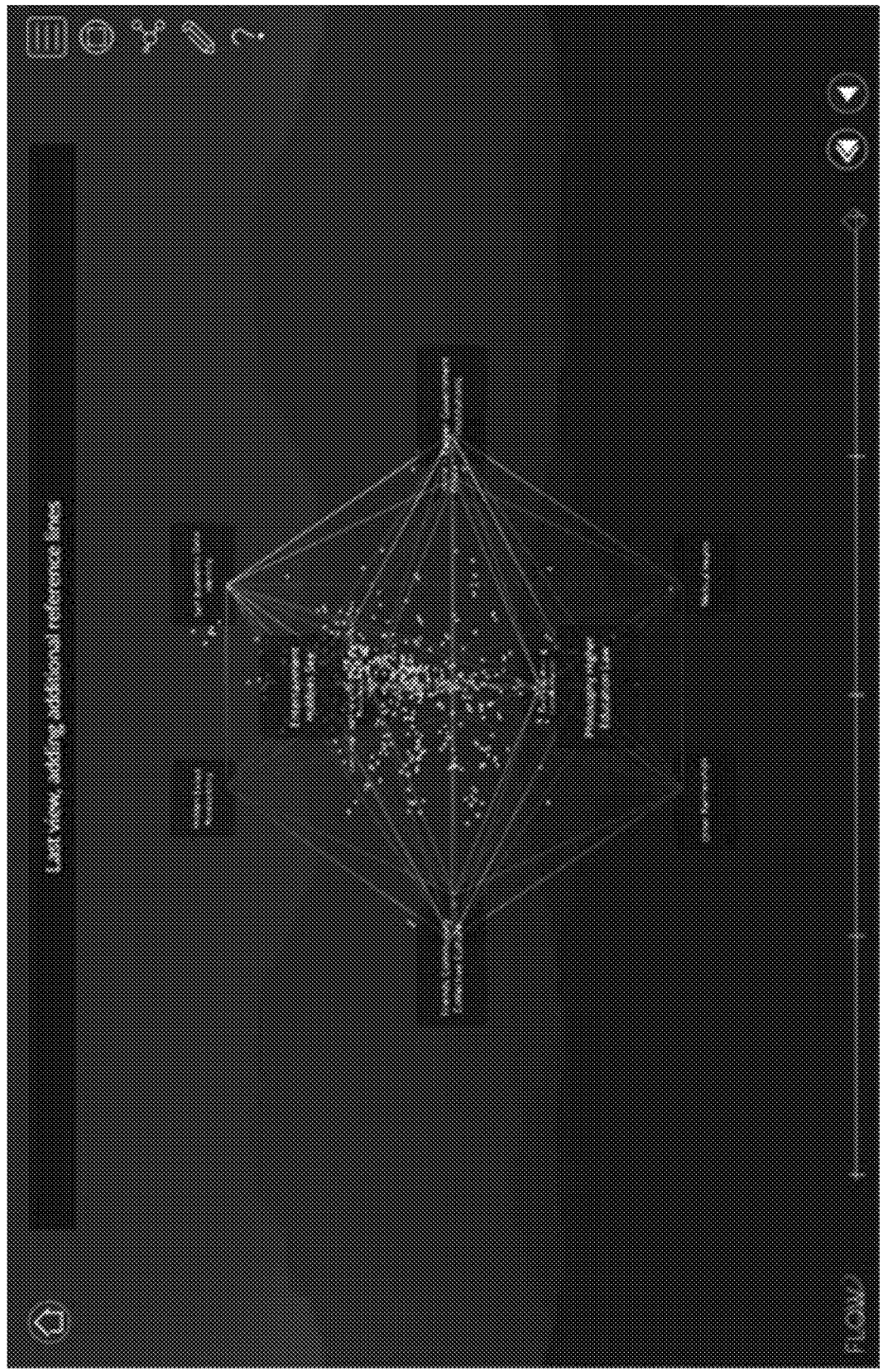
Figure 16A:
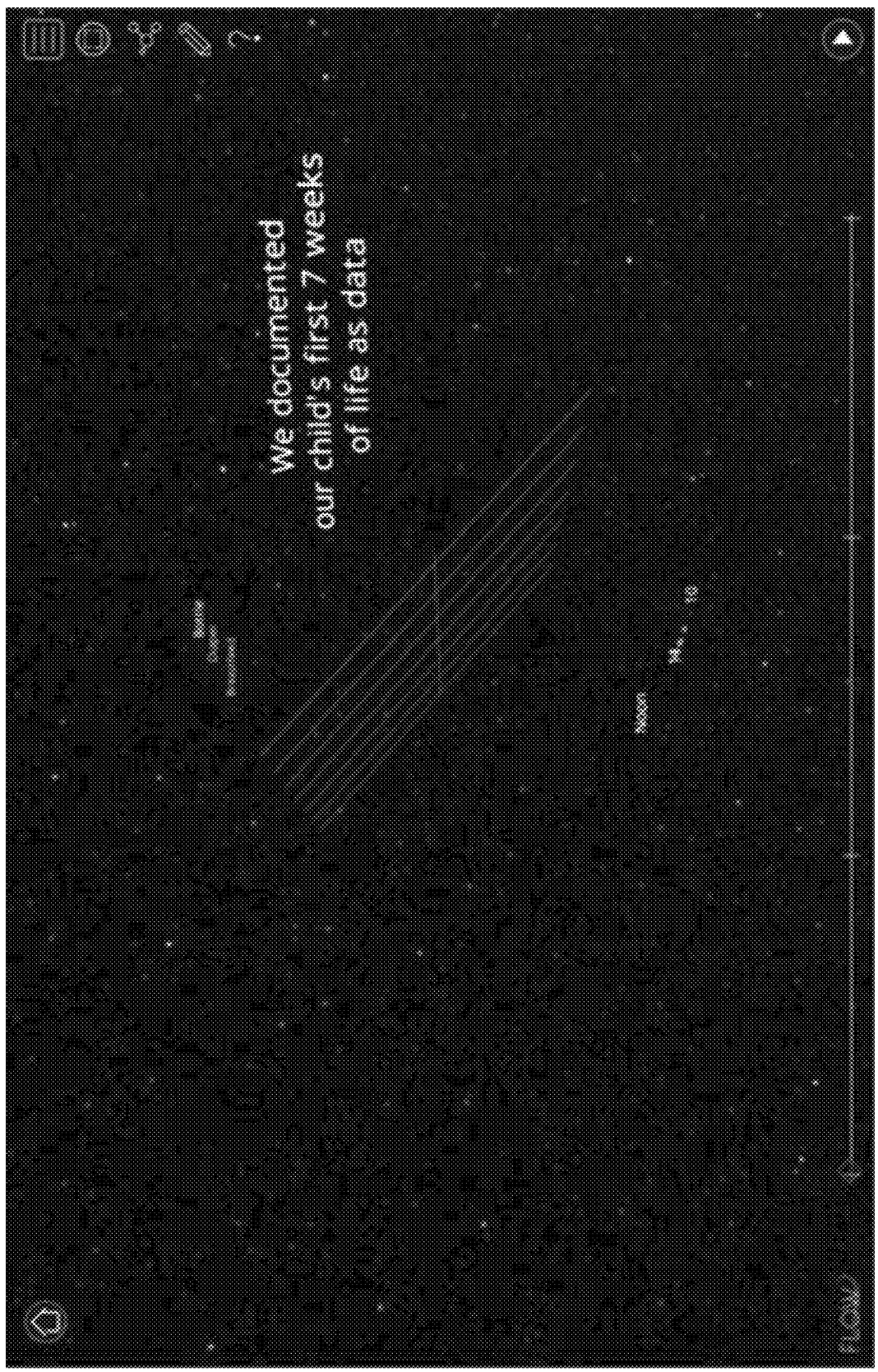
FIGS. 16A-16D depict a cylinder time series using four illustrative screenshots.
Figure 16B:
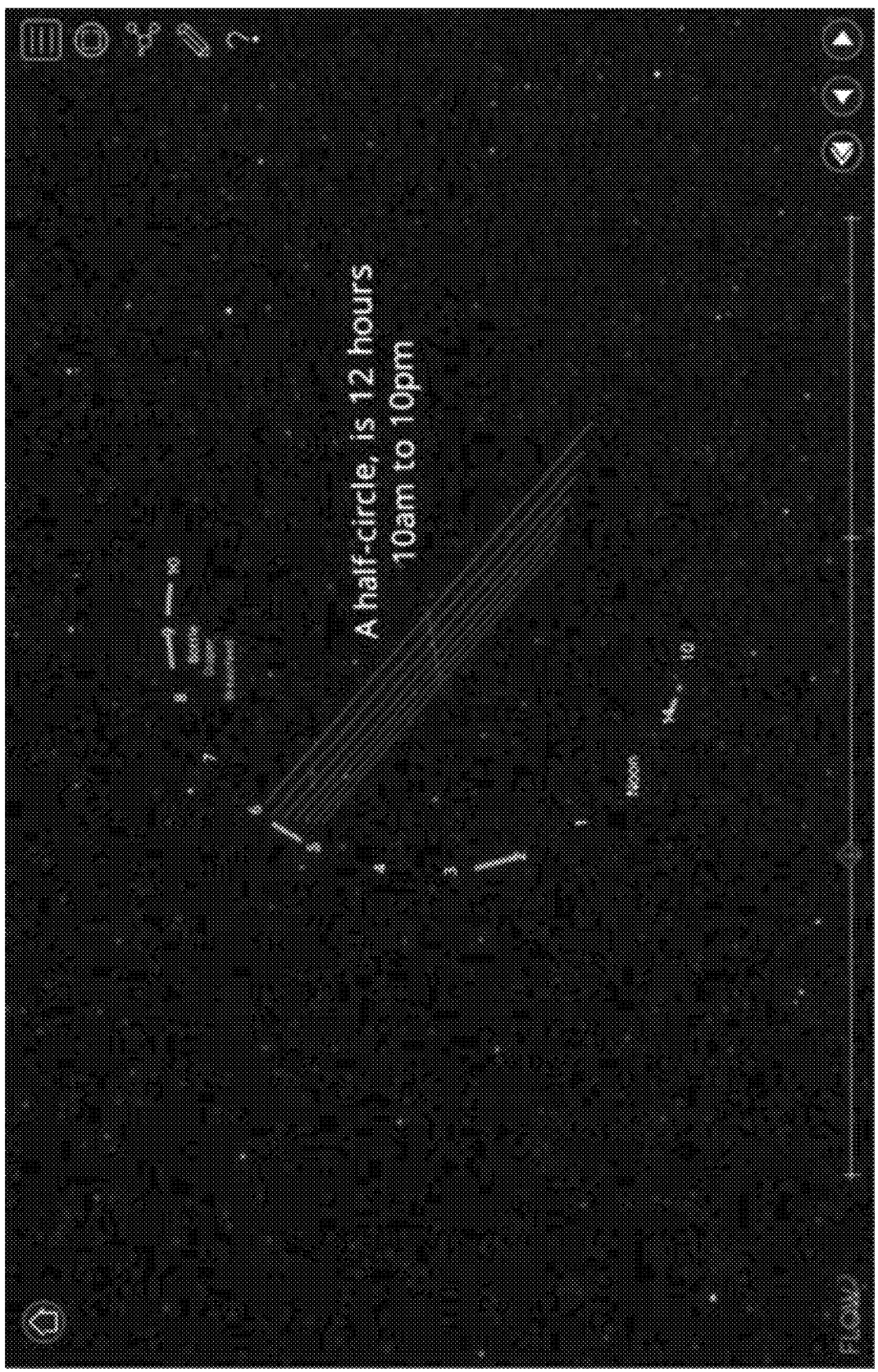
Figure 16C:
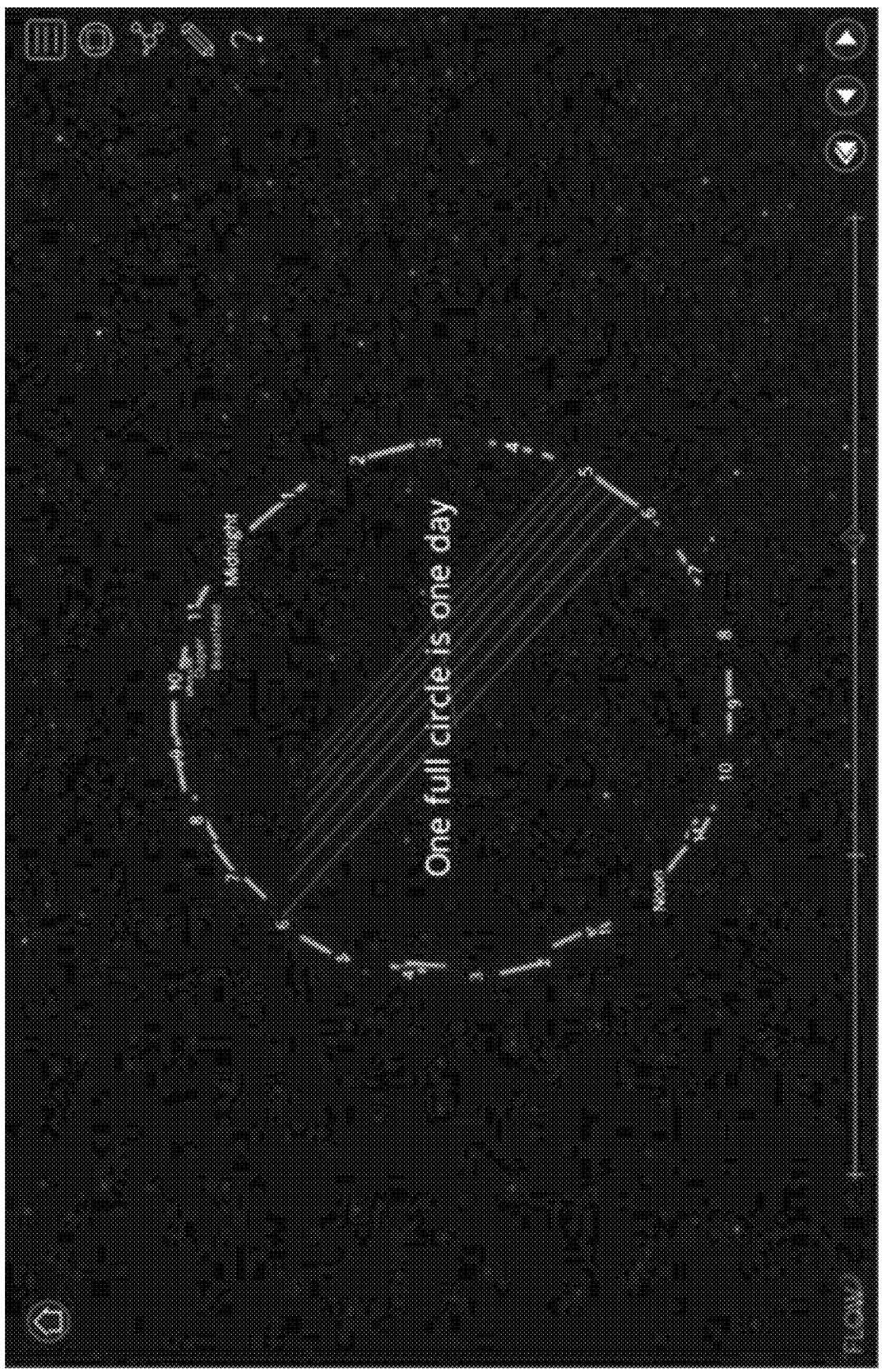
Figure 16D:
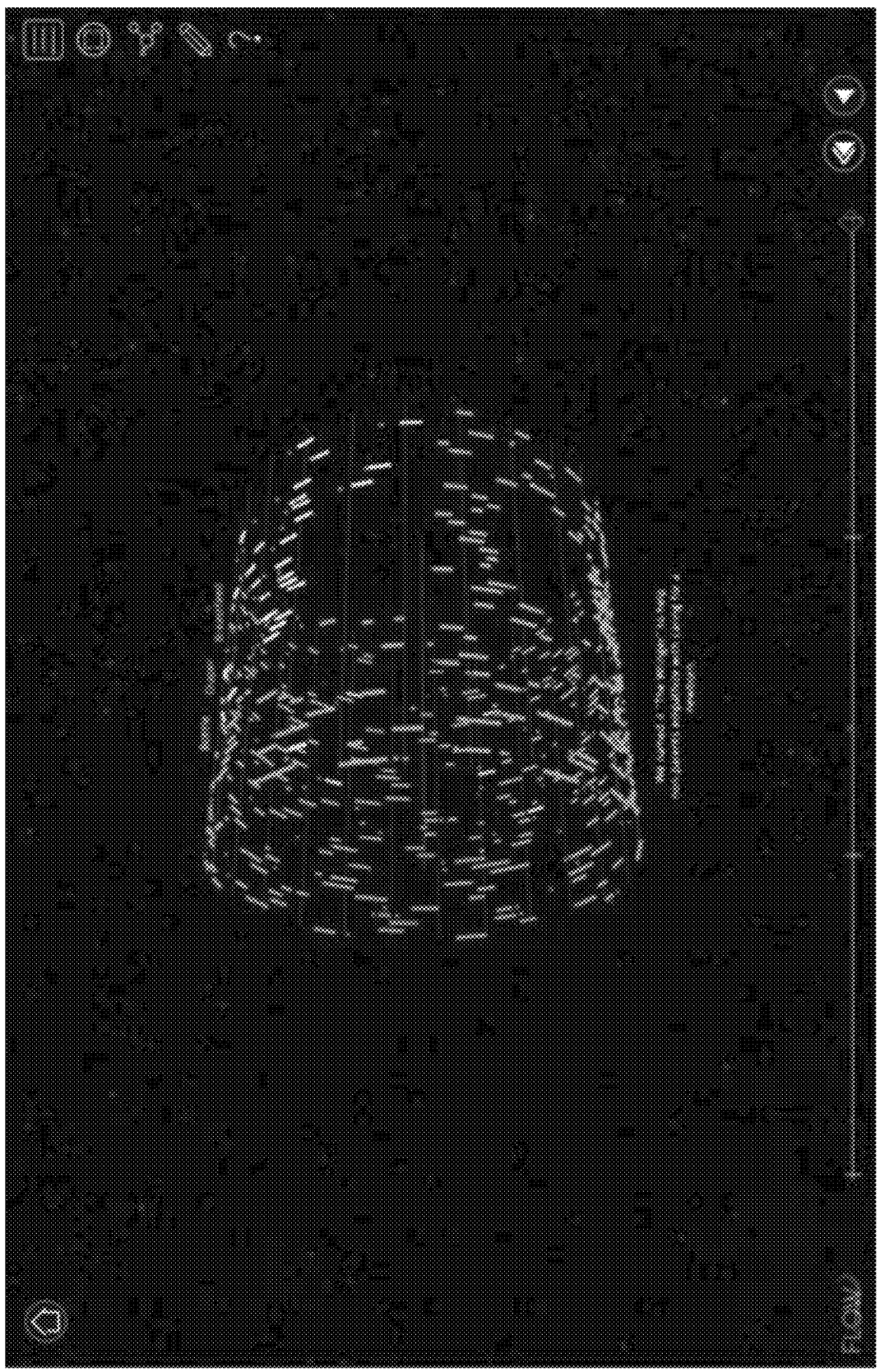
Figure 17A:
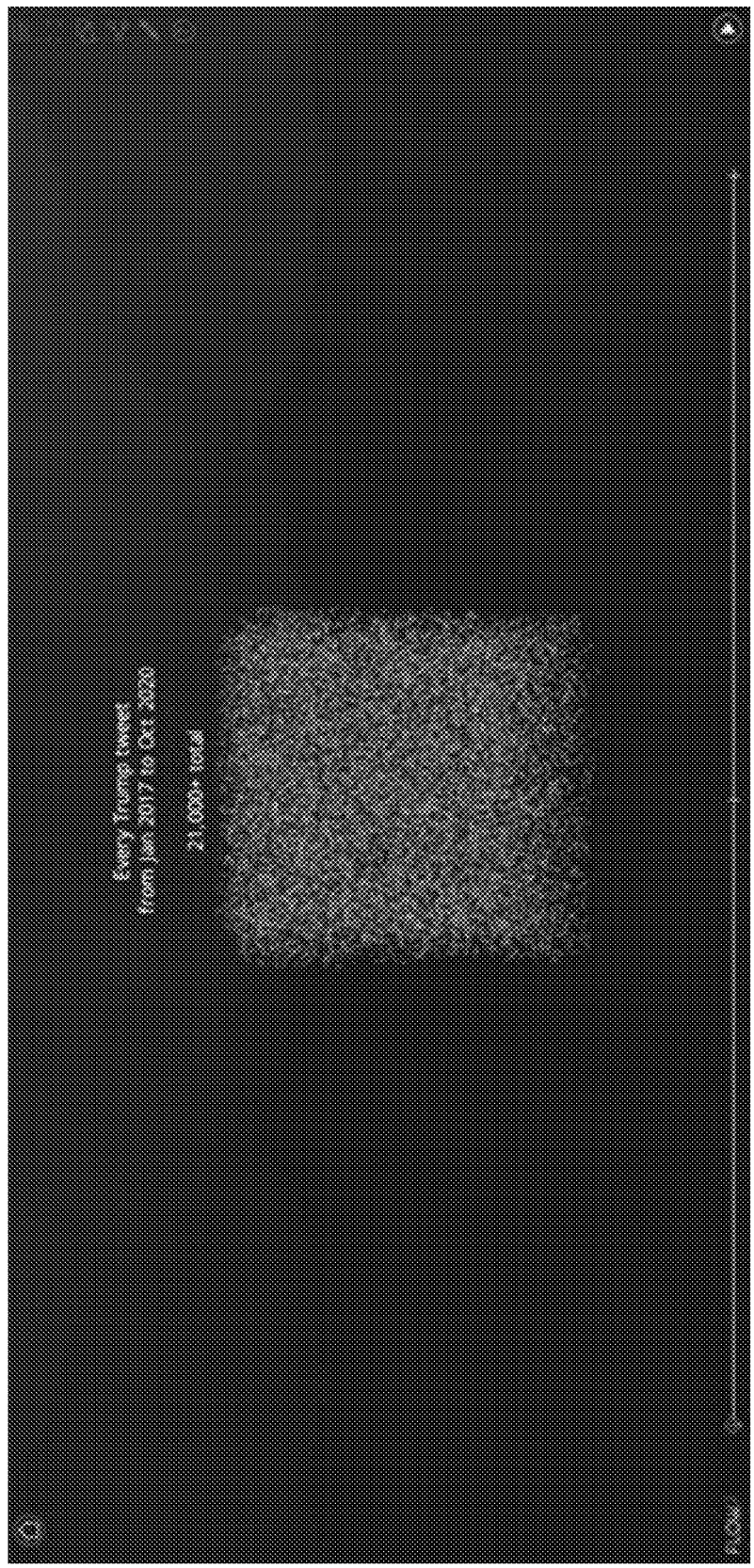
FIGS. 17A-17D depict a 3D time and time of day bar chart using three illustrative screenshots.
Figure 17B:
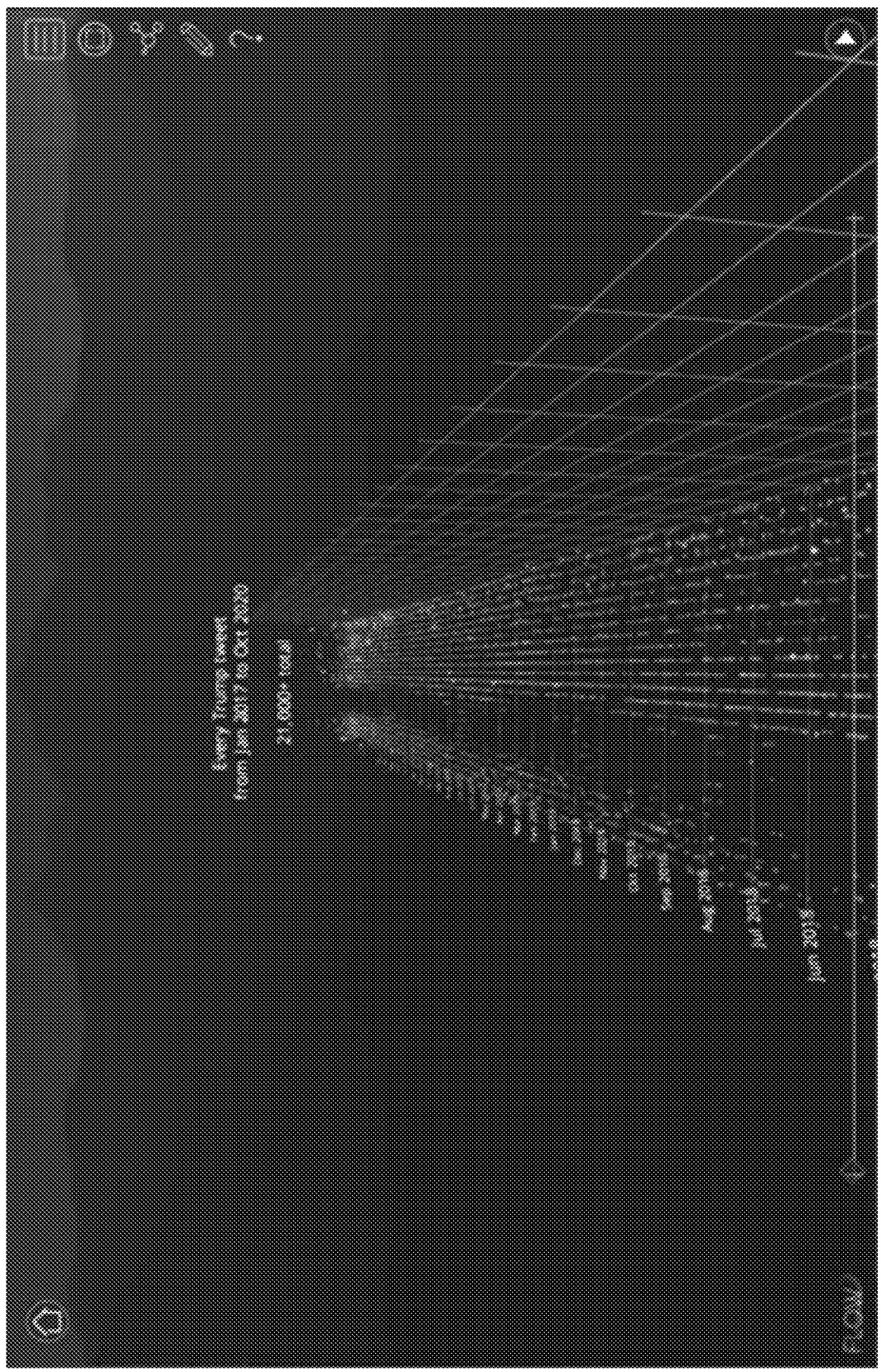
Figure 17C:
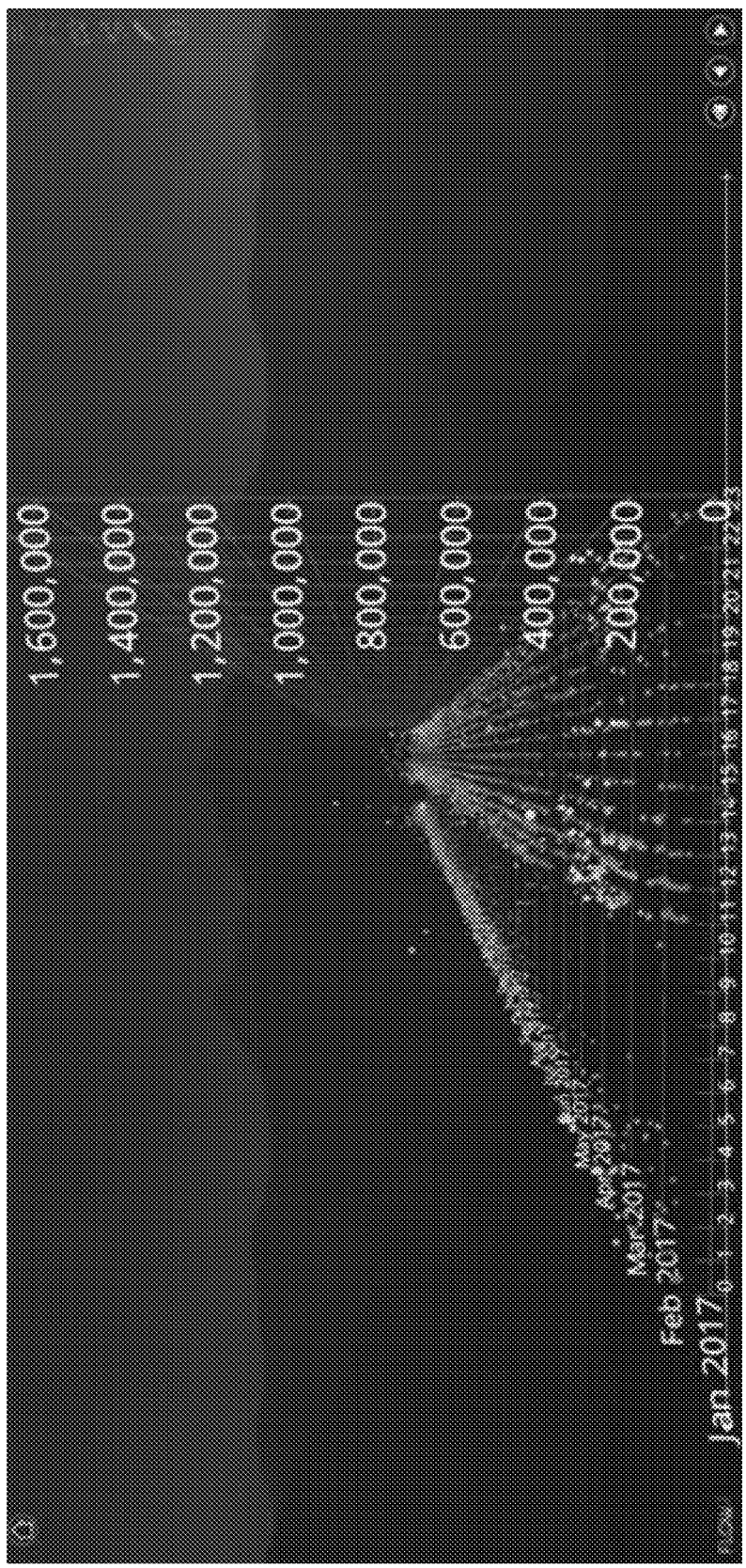
Figure 17D:
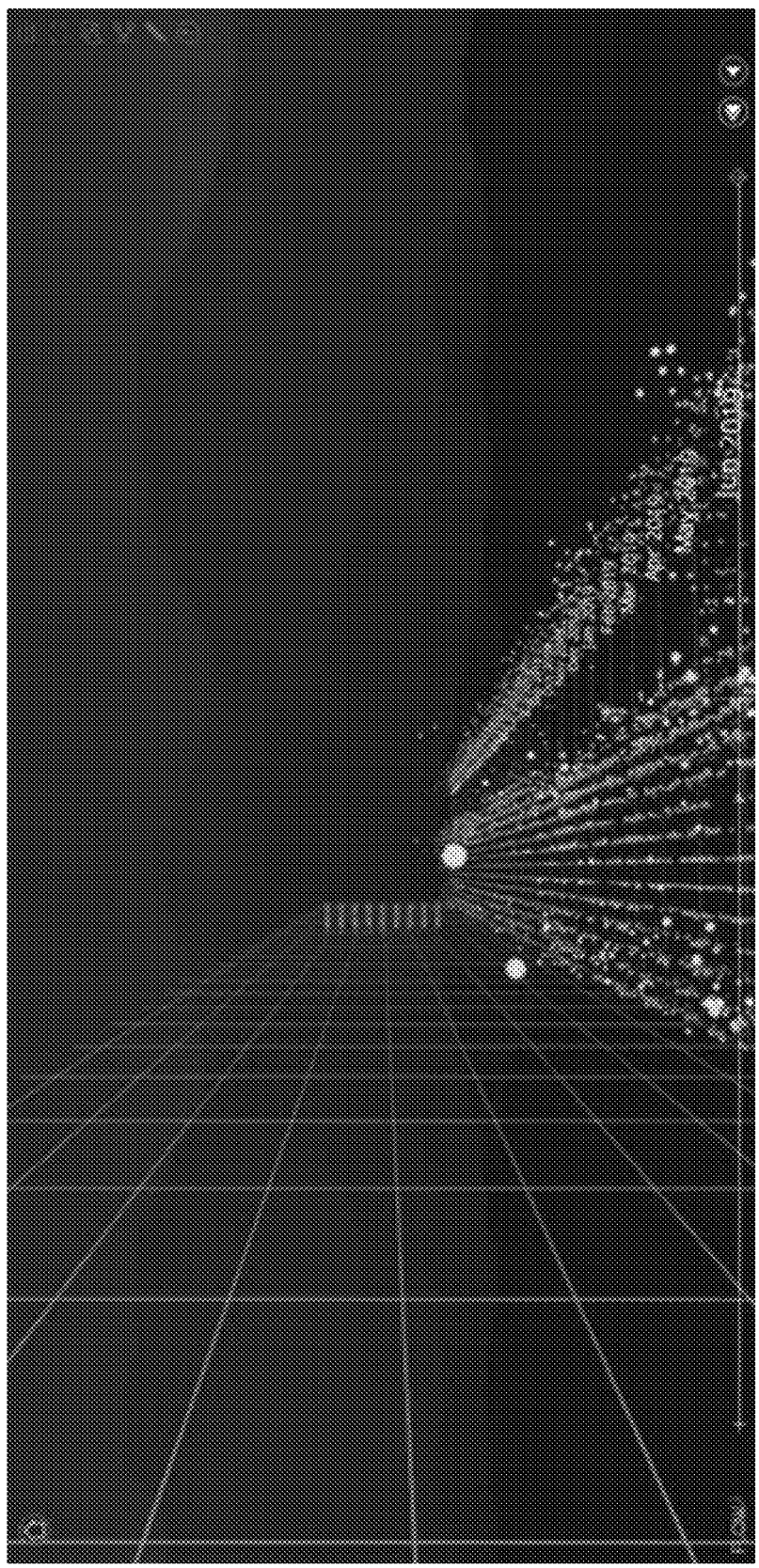

FIG. 13 depicts a diagram 1300 of an example of a 3DDV multiuser access system. The diagram 1300 includes a 3DDV media datastore 1302, a 3DDV media playback device 1304-1 to 1304-$n$ (collectively, 3DDV media playback devices 1304), a multiuser access engine 1306, a room datastore 1308, a 3DDV media presentation device 1310, and a 3DDV presentation control engine 1312. The multiuser access engine 1306 is coupled to the 3DDV media datastore 1302, the 3DDV media playback devices 1304, and the room datastore 1308; the 3DDV media presentation device 1310 is coupled to the room datastore 1308 and the 3DDV presentation control engine 1312.

In the example of FIG. 13, the 3DDV media datastore 1302 is intended to represent 3DDV media that is ready for playback. 3DDV media can be further modified to incorporate multiuser features, as is discussed next.

In the example of FIG. 13, the 3DDV media playback devices 1304 are intended to represent devices that can play back 3DDV media in the 3DDV media datastore 1302.

In the example of FIG. 13, the multiuser access engine 1306 is intended to represent specifically-purposed hardware that gives the 3DDV media playback devices 1304 access to 3DDV media in the 3DDV media datastore 1302 in a multiuser context. In a specific implementation, 3DDV media can be self-contained for use in a non-multiuser context or a multiuser context. Depending upon implementation- or configuration-specific factors, playback of 3DDV media in a multiuser context (or at all) can require login (e.g., entry of an extant username and valid password). When 3DDV media is opened in a multiuser context (even if it is opened first by a single audience member prior to any other audience members joining), the 3DDV media can be characterized as playing in a "room."

In a specific implementation, the multiuser access engine 1306 is configured to manage a value of a counter (e.g., karma) associated with popularity of a 3DDV media and/or a 3DDV media author. For example, the multiuser access engine 1306 is configured to increase the value of the counter in response to an upvote for a 3DDV media and/or a 3DDV media author, and decrease the value of the counter in response to an downvote against a 3DDV media and/or a 3DDV media author. In another example, the multiuser access engine 1306 is configured to increase the value of the counter in response to either an upvote or downvote for a 3DDV media and/or a 3DDV media author. Depending upon implementation- or configuration-specific factors, the multiuser access engine 1306 may restrict and/or prevent creation of a new 3DDV media with respect to a 3DDV media author associated with the counter. In another example, the multiuser access engine 1306 may be configured to manage a value of a counter corresponding to view popularity of a 3DDV media. For example, the multiuser access engine 1306 may be configured to cumulatively increase the value of the counter based on user access to the corresponding 3DDV media for viewing, and manage privilege of a 3DDV media author associated with the 3DDV media.

In a specific implementation, the multiuser access engine 1306 is configured to manage attributes to a 3DDV media, one or more 3DDV objects included in the 3DDV media, and one or more pieces of raw data, symbols and media data to track provenance of datasets resulted in the 3DDV media. In a specific implementation, in tracking provenance of datasets, a blockchain technique may be employed. For example, datasets may each include some attribute date associated with an author and/or datasource thereof, and, for generation of a new dataset, a dataset of a previous generation or any applicable function of the dataset of the previous generation may be used to encrypt the new dataset. By referring back to a dataset (e.g., 3DDV media) to the initial generation of datasets, it is possible to obtain the attribute to each dataset involved in a 3DDV media, which can further lead to more reliable and truthful 3DDV media.

In a specific implementation, the multiuser access engine 1306 is configured to provide and manage a credit for a dataset involved in a 3DDV media. For example, the multiuser access engine 1306 may reward authors and/or datasources of datasets involved in a 3DDV media to facilitate creation of 3DDV media. Depending upon implementation- or configuration-specific factors, the credit may be based on real currency, virtual currency (e.g., cryptocurrency), and/or local credit dedicated for a system for presenting 3DDV media. For rewarding, the multiuser access engine 1306 may be also configured to provide and manage payment from viewers accessing 3DDV media.

In a specific implementation, the multiuser access engine 1306 is configured to manage inappropriate contents included in 3DDV media, by employing a blockchain technique. For example, once an inappropriate content (e.g., child porn) is found in a 3DDV media, the multiuser access engine 1306 may prohibit access to one or more 3DDV media that includes one or more datasets that can refer back to the inappropriate content through the blockchain of cryptography. In managing the blockchain, the multiuser access engine 1306 may manage blockchain addresses of datasets in a database. To track provenance of datasets involved in a 3DDV media, text data may be too cumbersome. In such a case, plasma or a similar technology may be employed to group multiple chains of datasets and batch text data with respect to the grouped multiple chains of datasets. Instead of or in addition to the blockchain technique, IOTA built based on Tangle may be employed.

In the example of FIG. 13, the room datastore 1308 is intended to represent state and other data associated with a room in which 3DDV media is playing. State can include 3DDV media state, room state, audience member state, and presenter state. Depending upon implementation- or configuration-specific factors, audience members and presenters might have very similar state (with potentially the only difference being a flag indicating a first audience member is the current presenter).

In the example of FIG. 13, the 3DDV media presentation device 1310 is intended to represent a device used by a presenter, master, or superuser who is distinguishable from other audience members due to access to additional controls. In a specific implementation, multiuser does not necessitate the existence of a presenter, master, or superuser, making the 3DDV media presentation device 1310 optional. Depending upon implementation- or configuration-specific factors, the 3DDV media presentation device 1310 may be similar to the 3DDV media device playback devices 1304. Indeed, if presentation control can be passed from a first audience member to a second audience member either with changes to the room or over time, the 3DDV media presentation device 1310 may be indistinguishable from the 3DDV media device playback devices 1304 (potentially ignoring differences related to the 3DDV media presentation device 1310 having access to the 3DDV presentation control engine 1312 for illustrative purposes). Although the 3DDV media presentation device 1310 is depicted as being coupled to the multiuser access engine 1306, in a specific implementation, a presenter may or may not need to access 3DDV media via the multiuser access engine 1306 the same as, or similar to, other audience members.

In the example of FIG. 13, the 3DDV presentation control engine 1312 is intended to represent specifically-purposed hardware that provides multiuser control over 3DDV media to a human or artificial presenter, master, or superuser, or human or artificial agents thereof. For illustrative purposes, the 3DDV presentation control engine 1312 is separate from the 3DDV media presentation device 1310, but the 3DDV presentation control engine 1312 could be implemented in whole or in part on the 3DDV media presentation device 1310.

In the diagram 1300, the 3DDV presentation control engine 1312 includes an objective audience perspective engine 1314, a subjective avatar placement engine 1316, a relative area of interest tracking engine 1318, and a mixed reality transition engine 1320. In the example of FIG. 13, the objective audience perspective engine 1314 is intended to represent specifically-purposed hardware that causes a subset of audience members for a 3DDV media presentation associated with the room datastore 1308 to have co-located virtual camera home coordinates. The subset may or may not include all of the audience members. Depending upon implementation- or configuration-specific factors, the co-located virtual camera home coordination can be further augmented with gaze guides for the audience members to be made aware of a suggested orientation. (Orientation can also be adjusted with a snap-to-preferred-orientation command.)

In the example of FIG. 13, the subjective avatar placement engine 1316 is intended to represent specifically-purposed hardware that causes audience member FOVs to include avatars of audience members who are not co-located (despite objective audience perspective) from the perspective of other audience members. The subjective avatar placement engine 1316 maintains the subjective placement by performing a translation when an audience member associated with an avatar changes position, the subjective placement within the 3DDV media presentation retains the same offset relative to the scene for other audience members. The subjective avatar placement engine 1316 can also change relative placements, if desired, such as when new audience members join and "push other avatars out of the way." In a specific implementation, each audience member has an offset from home that remains consistent unless reassigned, which can entail teleporting an avatar or shifting the avatar in a more subtle fashion, such as by making an avatar walk to its new offset location.

In the example of FIG. 13, the relative area of interest tracking engine 1318 is intended to represent specifically-purposed hardware that tracks where audience members are directing their attention. Tracking can include coordinate tracking (e.g., tracking where an audience member moves within a scene), FOV tracking (e.g., tracking what is rendered for an audience member), eye tracking (e.g., tracking what an audience member is looking at within an FOV using eye tracking technology), or event tracking (e.g., tracking where an audience member places a cursor within an FOV). For rendering avatars, FOV tracking can be associated with the orientation of a head or analogous avatar portion and event tracking can be associated with pointing using a limb or analogous avatar portion. In a specific implementation, the relative area of interest tracking engine 1318 can control scene tree branching by providing an area of interest tracking data to the 3DDV media presentation device 1310, which selects a conditional branch based upon area of interest.

In the example of FIG. 13, the mixed reality transition engine 1320 is intended to represent specifically-purposed hardware that transitions between 3DDV and real world. Applicable techniques include blurring some or all of a real or virtual FOV to focus attention on other content, pushing some or all of a real or virtual FOV back to make room for other content, converting some or all of a real or virtual FOV into line drawings to make other content stand out. Depending upon implementation- or configuration-specific factors, real world can be a reference to unaugmented reality (e.g., the mixed reality transition signals audience members to remove their headsets) or AR (e.g., the 3DDV presentation is replaced with an AR presentation). Advantageously, the mixed reality transition engine 1320 makes the most of immersion (a VR and 3DDV strength) and collaboration (an AR strength).

FIGS. 14-19 depict novel data visualizations made possible from use of 3DDV techniques described in this paper. FIGS. 14A-14E depict a geospatial, time-series, thematic map with a threshold using six illustrative screenshots. A thematic map is a type of map that portrays the geographic pattern of a particular subject matter (theme) in a geographic area. In the example of FIGS. 14A-14E, the thematic map is a choropleth map in which a set of pre-defined areas is patterned in proportion to a statistical variable that represents an aggregate summary of a geographic characteristic within each area. Advantageously, due to the use of 3DDV techniques, a first portion of the pre-defined areas can be a subset of a second portion of the pre-defined areas (e.g., county as a subset of state), with a given view depending upon the visualization preferences of a participant at a given time. Advantageously, in addition to 3DDV animation, combining the dimension coming off of the map for time and utilizing a threshold to have noticeable blank space making the visualization more readable and highlighting only the hot spots and outliers are accomplished.

FIGS. 15A-15E depict attractive polyhedron vertex clustering using five illustrative screenshots. The vertices of a polyhedron (a dodecahedron in the example of FIGS. 15A-15E) are characterized as "attractive" because they attract nodes that have matching traits. The shape of the polyhedron enables clustering of nodes based upon common traits using geometry. The attraction can be referred to as "gravity." It may be noted that the polyhedron could be "hidden" in the sense the nodes appear to be clustered around, e.g., a sphere, but attractive vertices are used regardless of the apparent shape of the overarching structure. In a specific implementation of the example of FIGS. 15A-15E, the nodes (podcast episodes) are selectable, allowing you to hover over the node to get information about the podcast or click on the node to playback the podcast.

FIGS. 16A-16D depict a cylinder time series using four illustrative screenshots. The edge of a circle to represent a 24 hour time clock, and each ring in combination makes a cylinder that covers a time span, in this case 7 weeks. Other examples of how this could be used include worker productivity (late time, early departure time, overtime, breaktime (potentially coded for mandated, authorized, and/or unauthorized breaks)), time a child spends online (e.g., broken down by type of content consumed), activity (e.g., sedentary, active, and exertion), climate-related studies (e.g., monthly high temperature where month is around the circumference of the cylinder and year axis extends through the center of the cylinder; color would represent the magnitude of the temperature or another attribute like rainfall or humidity). The cylinder could also be characterized as a "spiral" under applicable circumstances.

FIGS. 17A-17D depict a 3D time and time of day bar chart using three illustrative screenshots. Plotting both the time of day on one axis and date on another, one can see trends as they change based upon the time of day, in addition to overall timeseries changes. This while still utilizing the last axis to measure the magnitude of some value, in this example TWITTER® 'likes'. In a specific implementation of the example of FIGS. 17A-17D, information about a given tweet can be provided by hovering over an applicable node and selecting the node takes you to twitter if the tweet is still available.

Figure 18A:
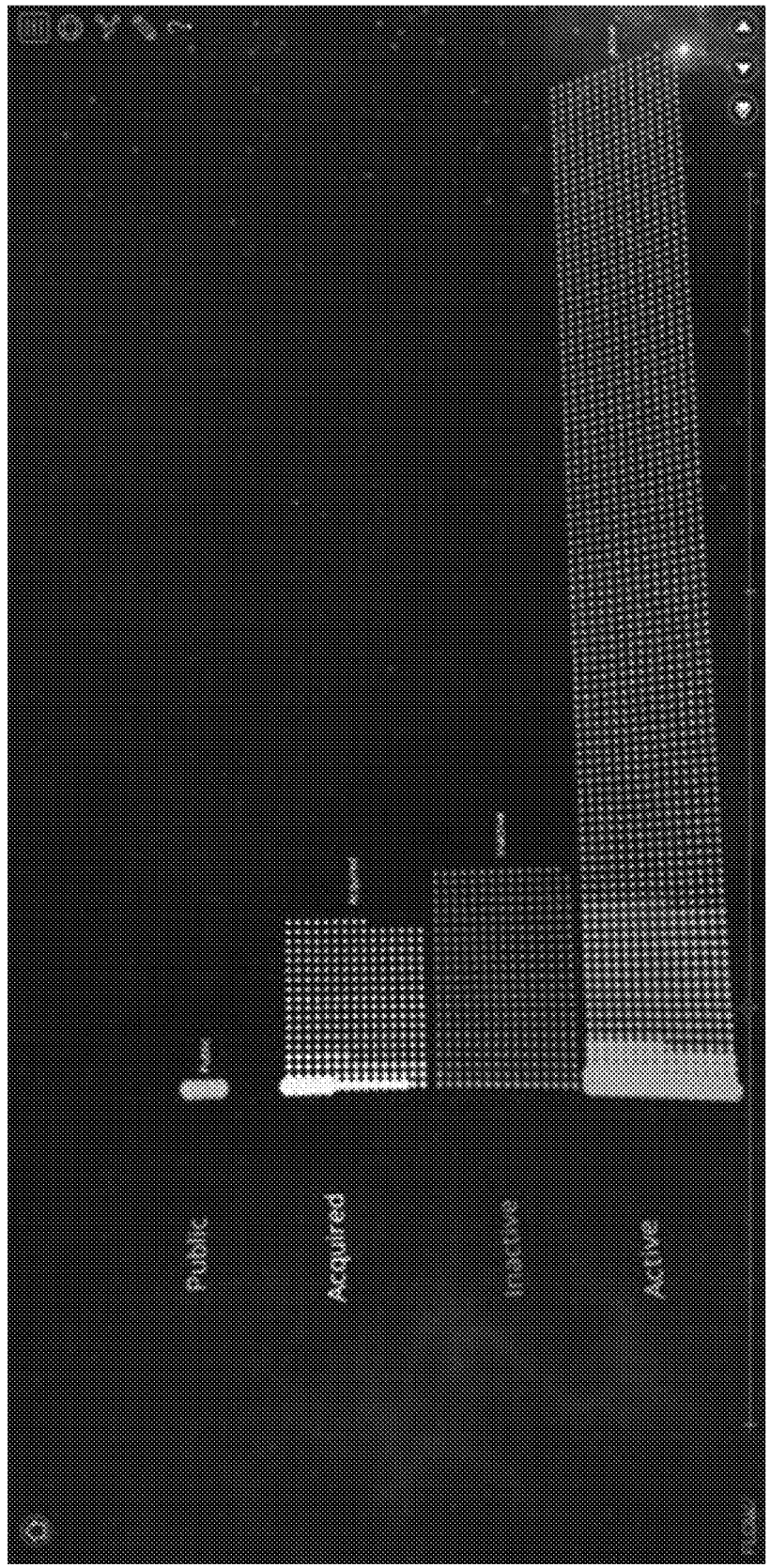
FIGS. 18A-18B depict a histogram arch using an illustrative screenshot.
Figure 18B:
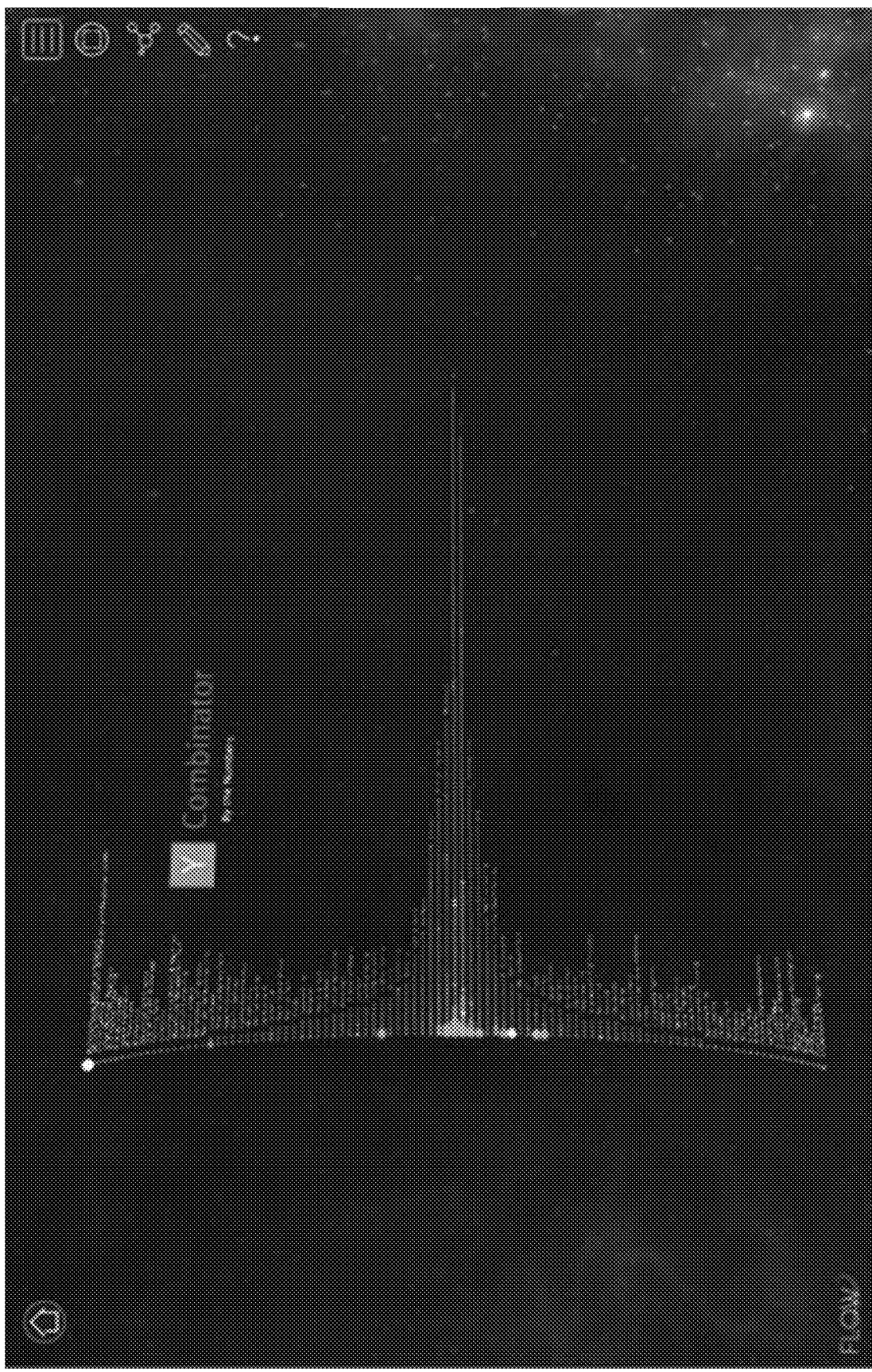

FIGS. 18A-18B depict a histogram arch using an illustrative screenshot (the first screenshot is to provide context for the second, but is not a histogram arch). A histogram is an approximate representation of the distribution of numerical data. To construct a histogram, the first step is to divide the entire range of values into a series of intervals and count how many values fall into each interval. The bins (intervals) are usually specified as consecutive, non-overlapping adjacent intervals of a variable.

A histogram with an arch aids content being consumed in a 3D environment. The data visualization is the same distance away from the viewer in 3D, whereby a 2D image in a 3D scene dots further way would appear smaller. In the example of FIGS. 18A-18B, the size of a dot represents company valuation. Virtually wrapping the histogram arch around a participant provides a new manner in which the participant can consume the data (e.g., by turning their head to the left or to the right to view other portions of the chart).

Figure 19A:
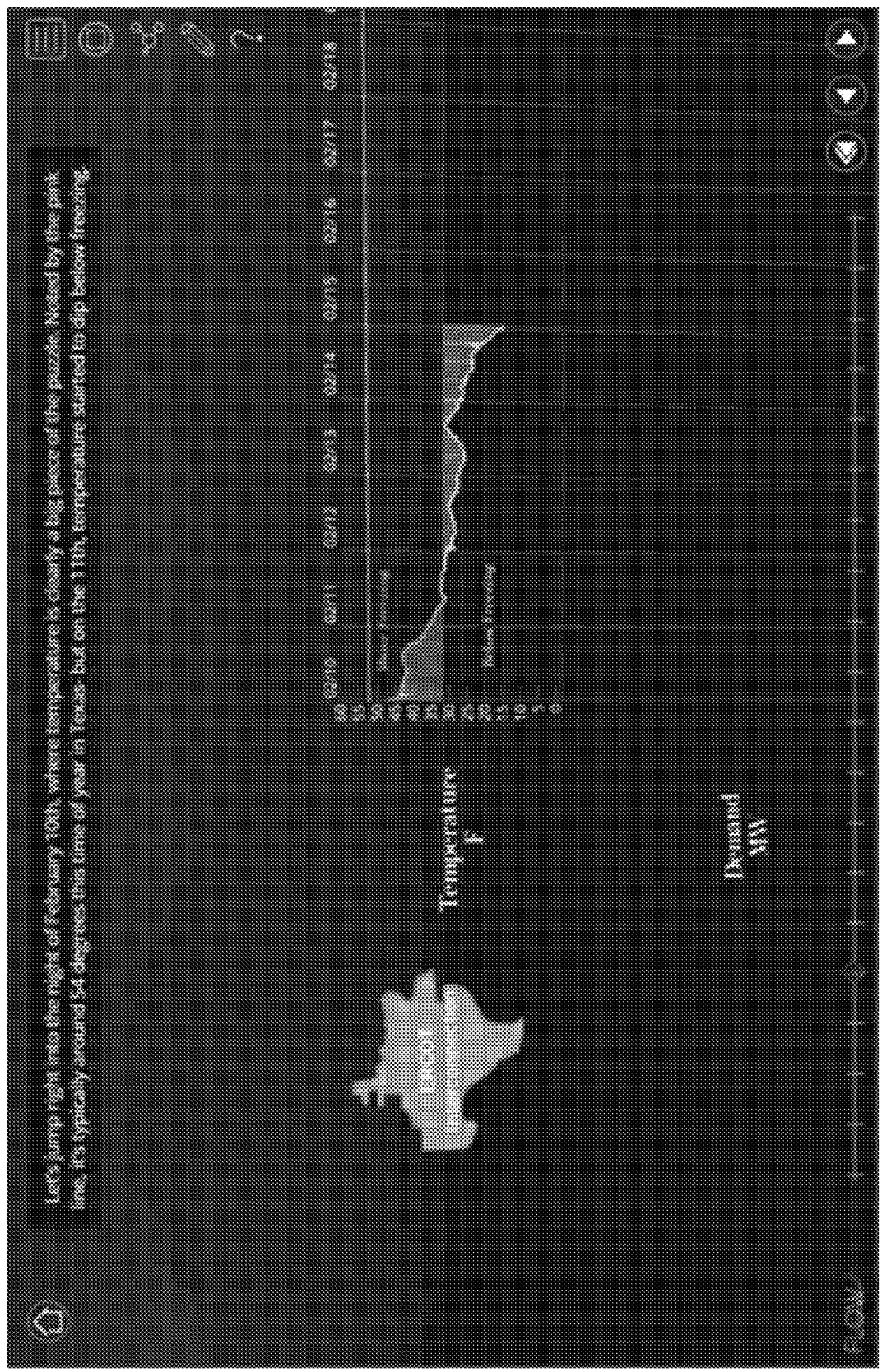
FIGS. 19A-19P depict a multidimensional stacked time-series using several illustrative screenshots.
Figure 19B:
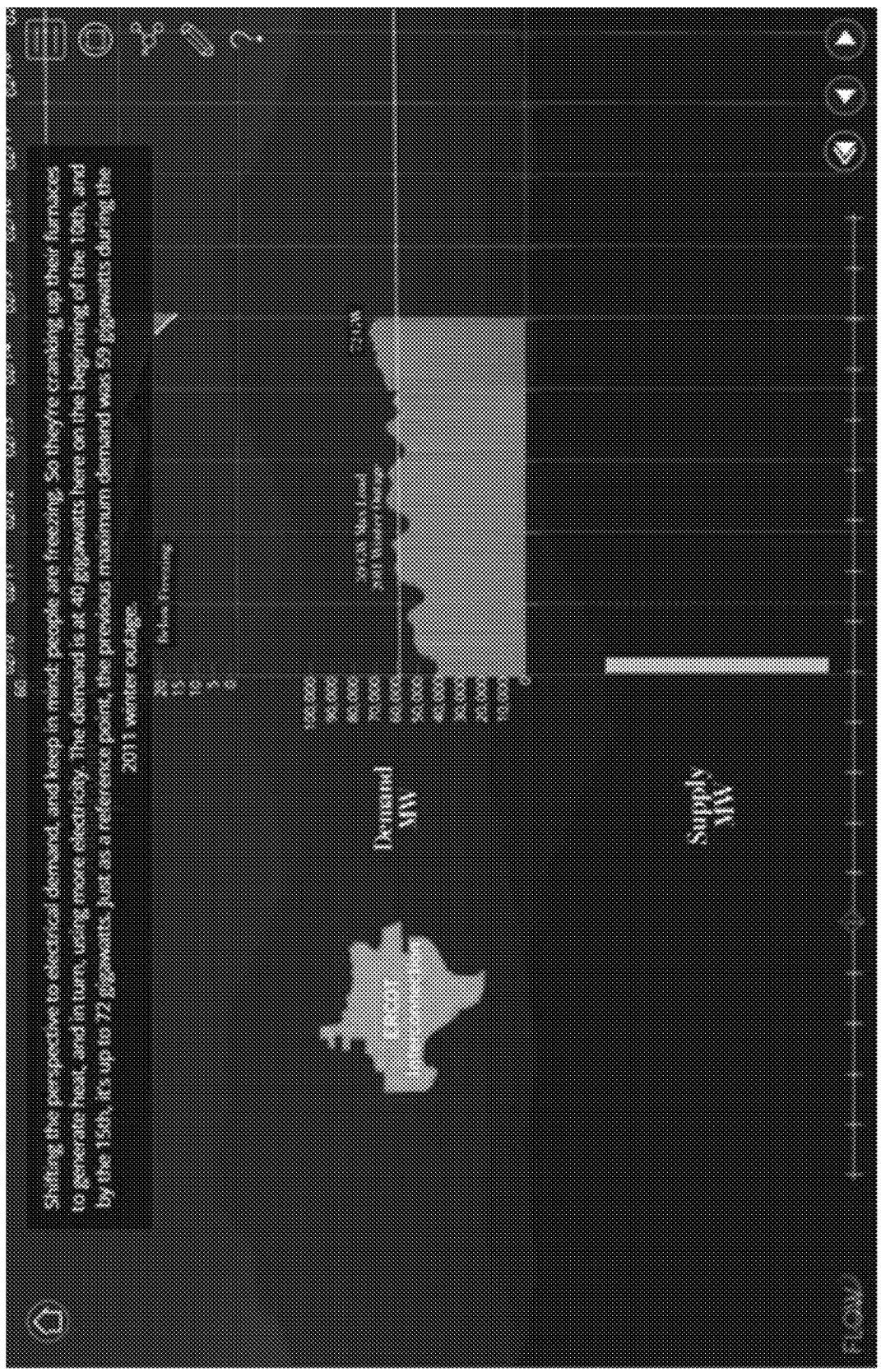
Figure 19C:
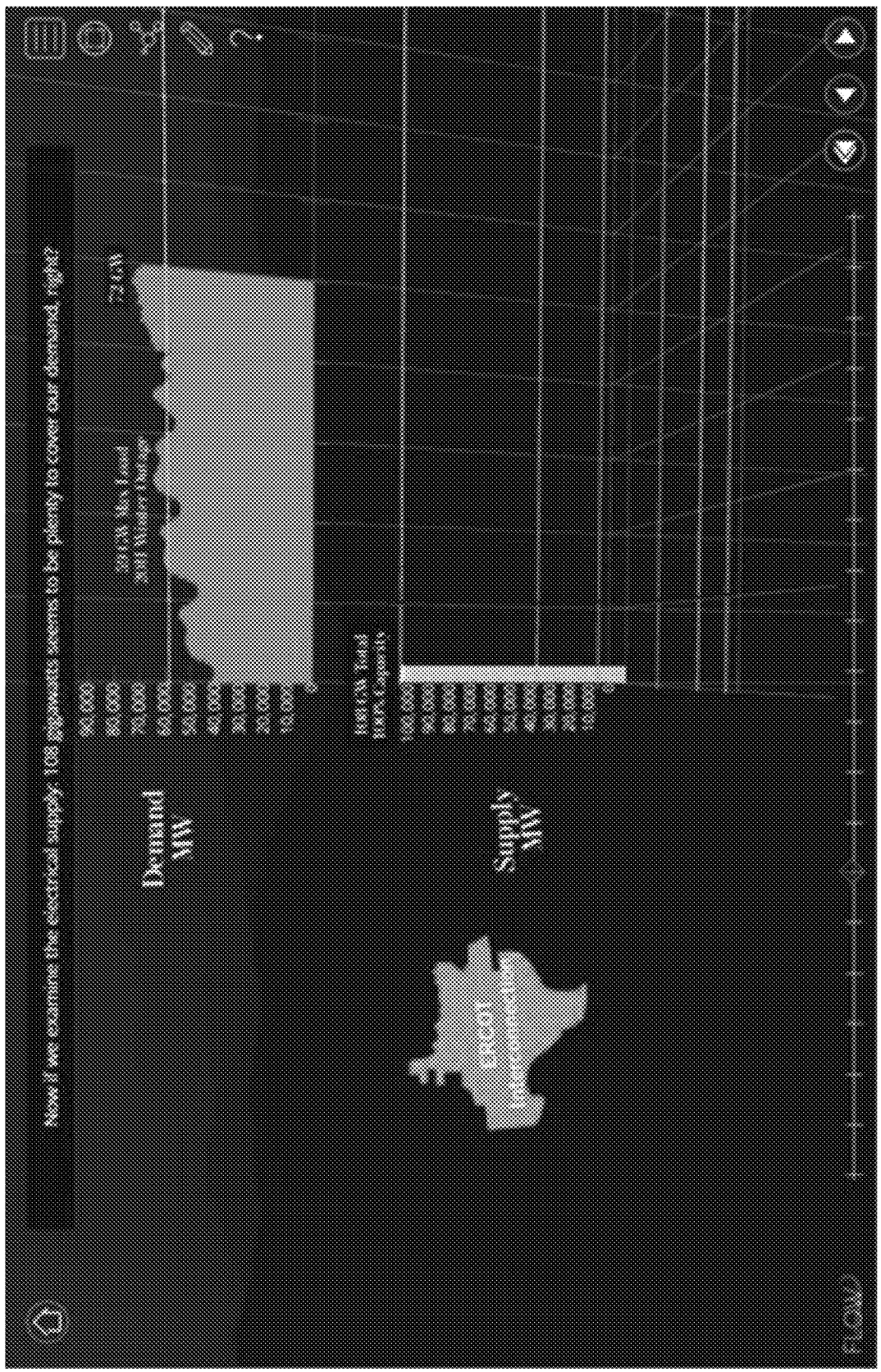
Figure 19D:
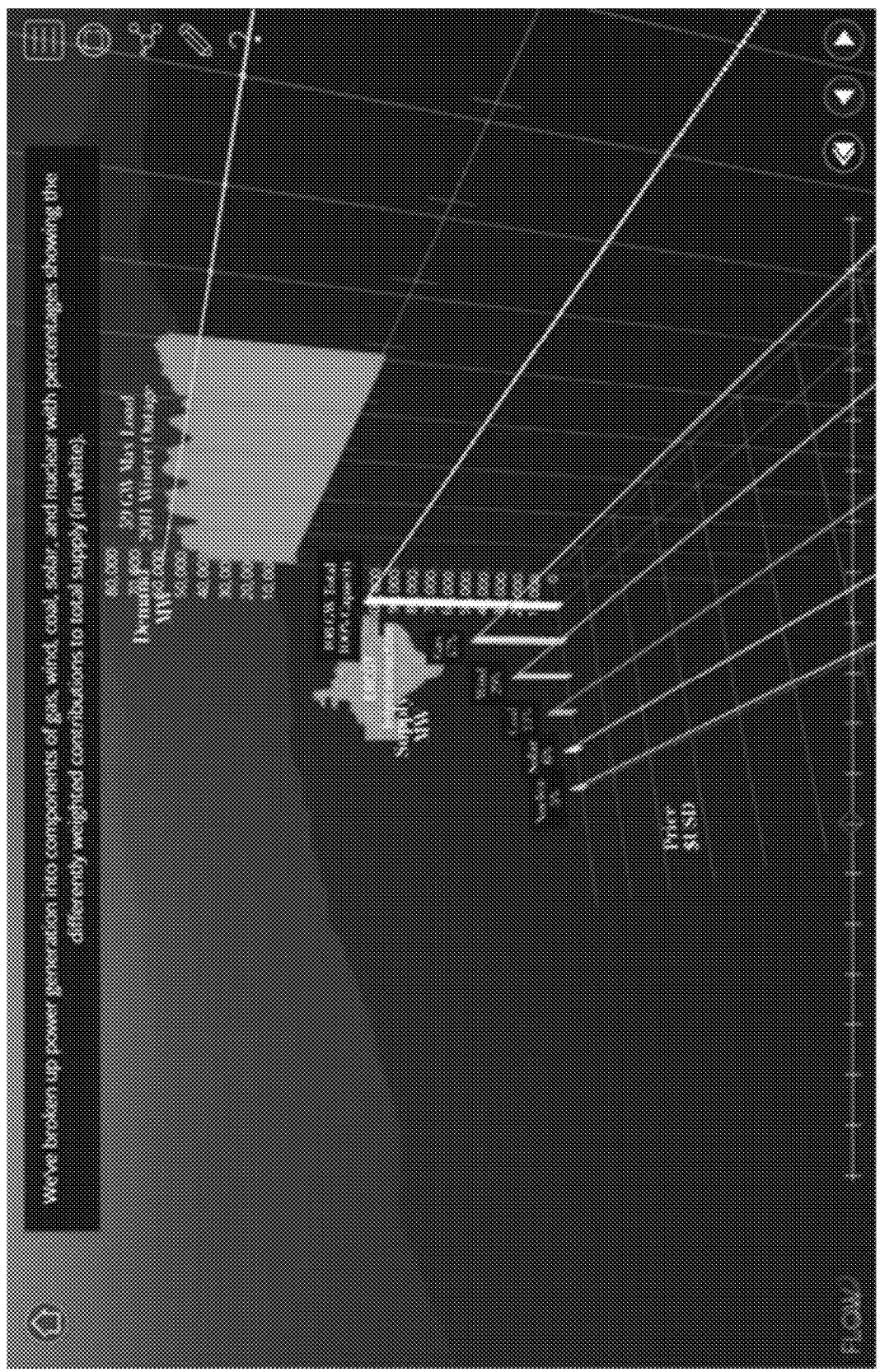
Figure 19E:
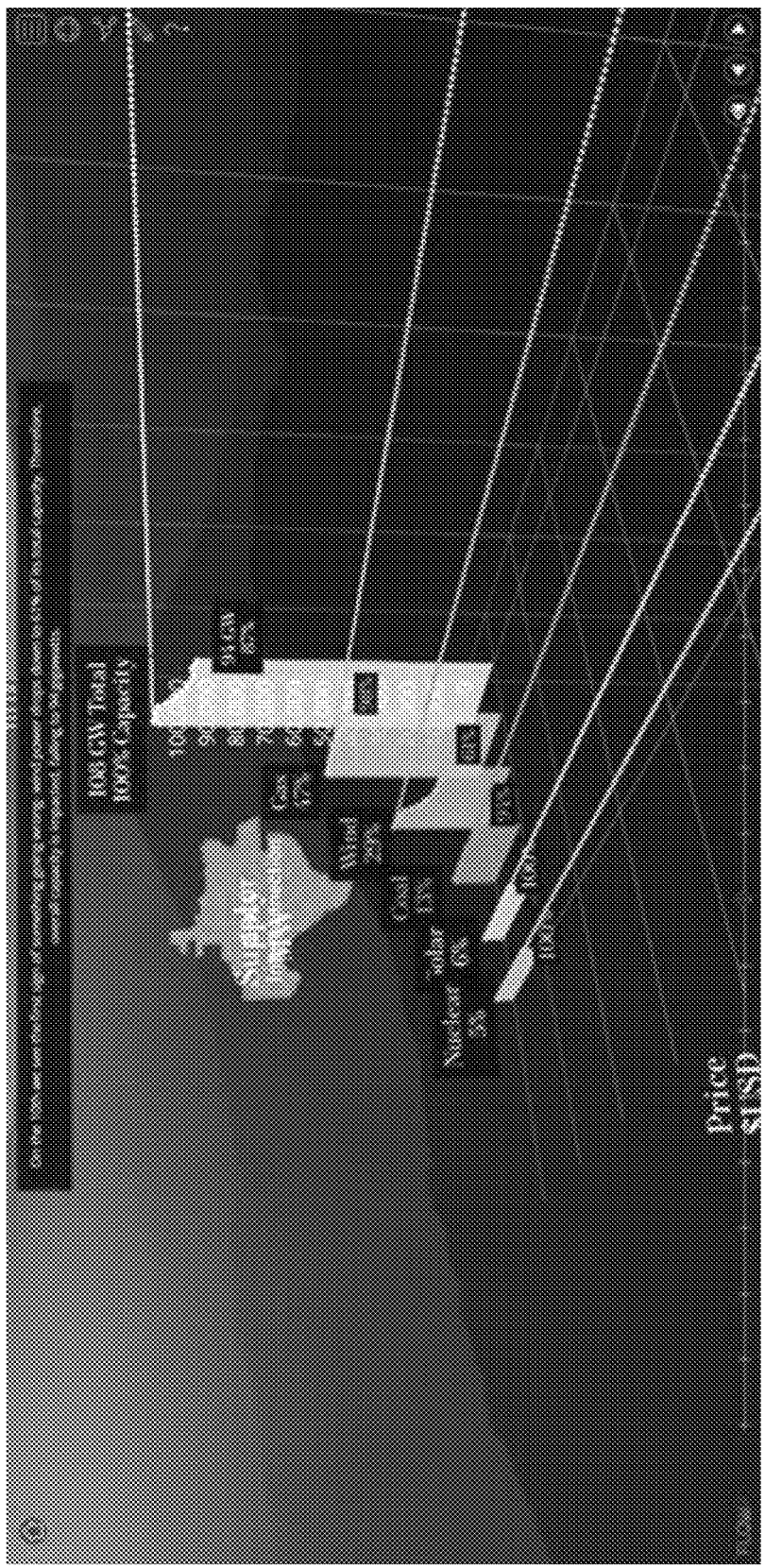
Figure 19F:
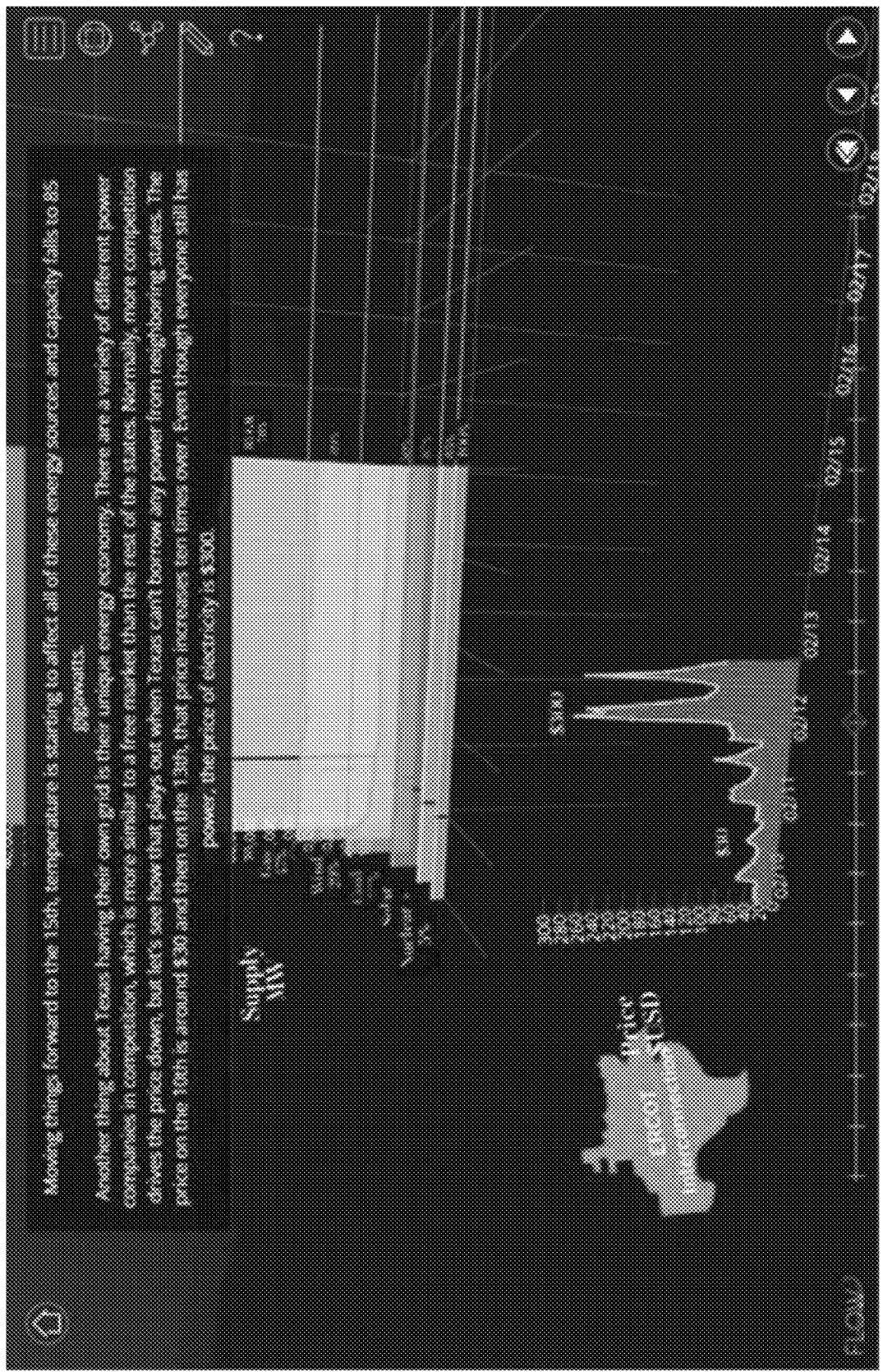
Figure 19G:
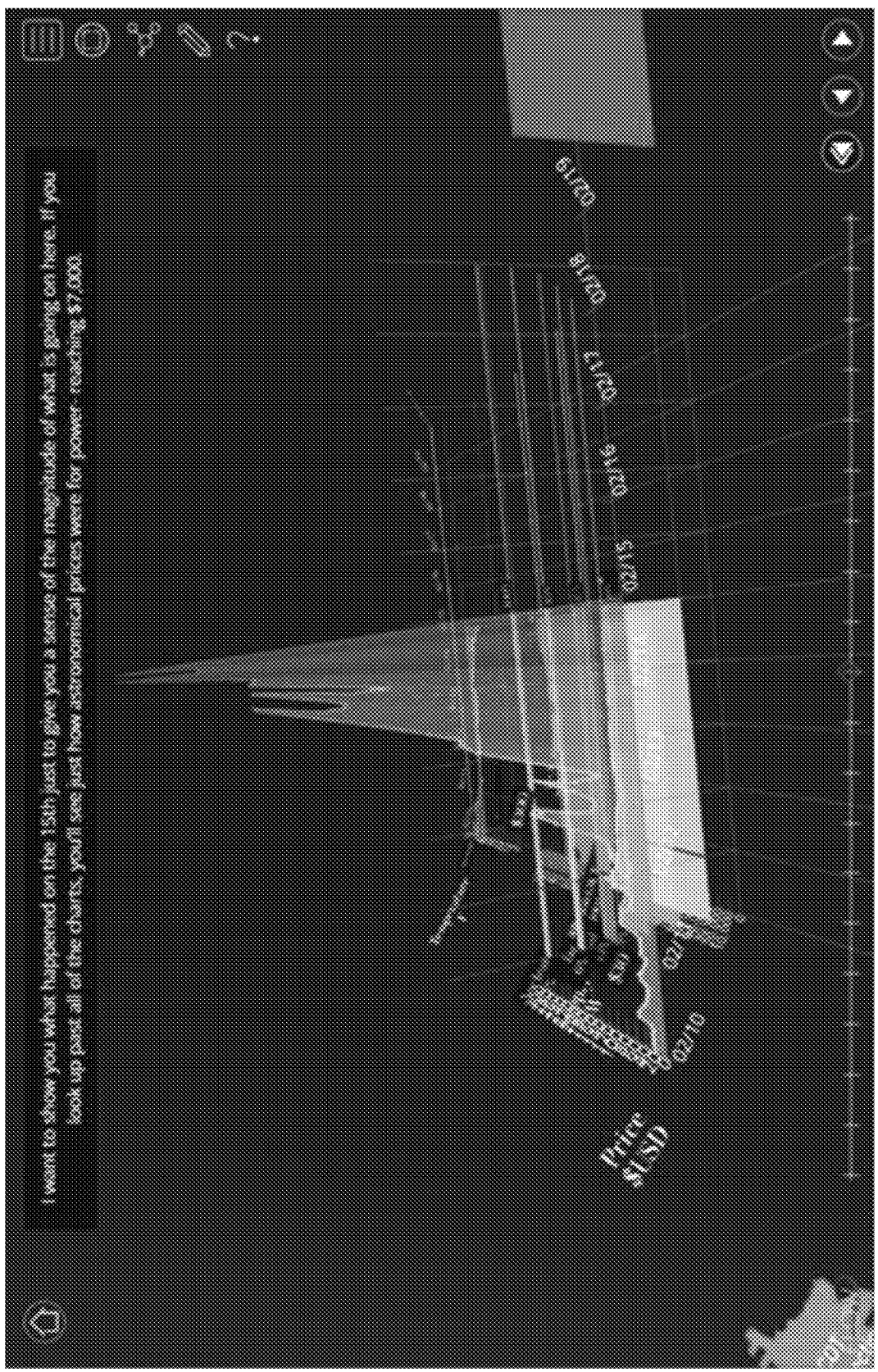
Figure 19H:
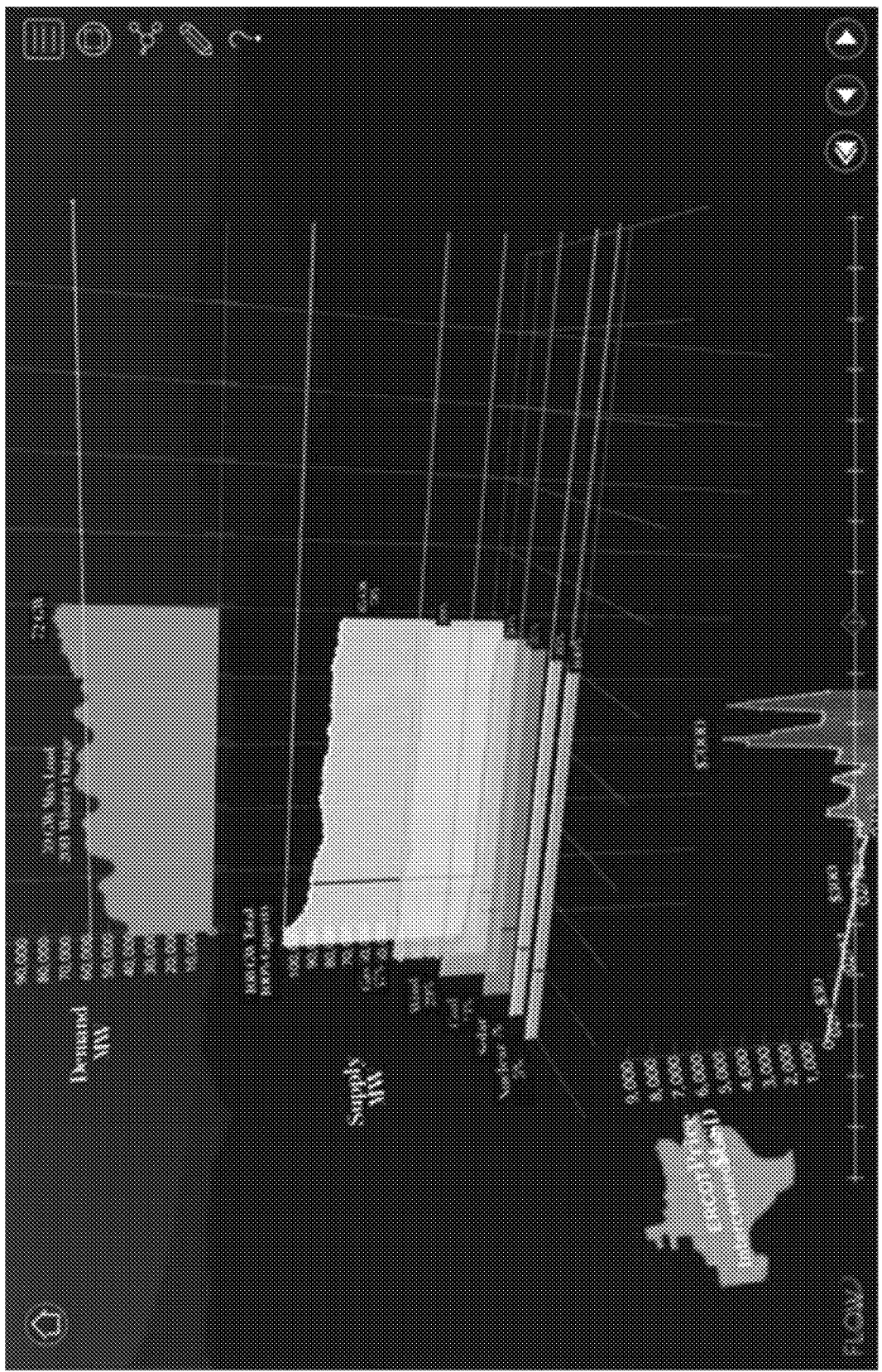
Figure 19I:
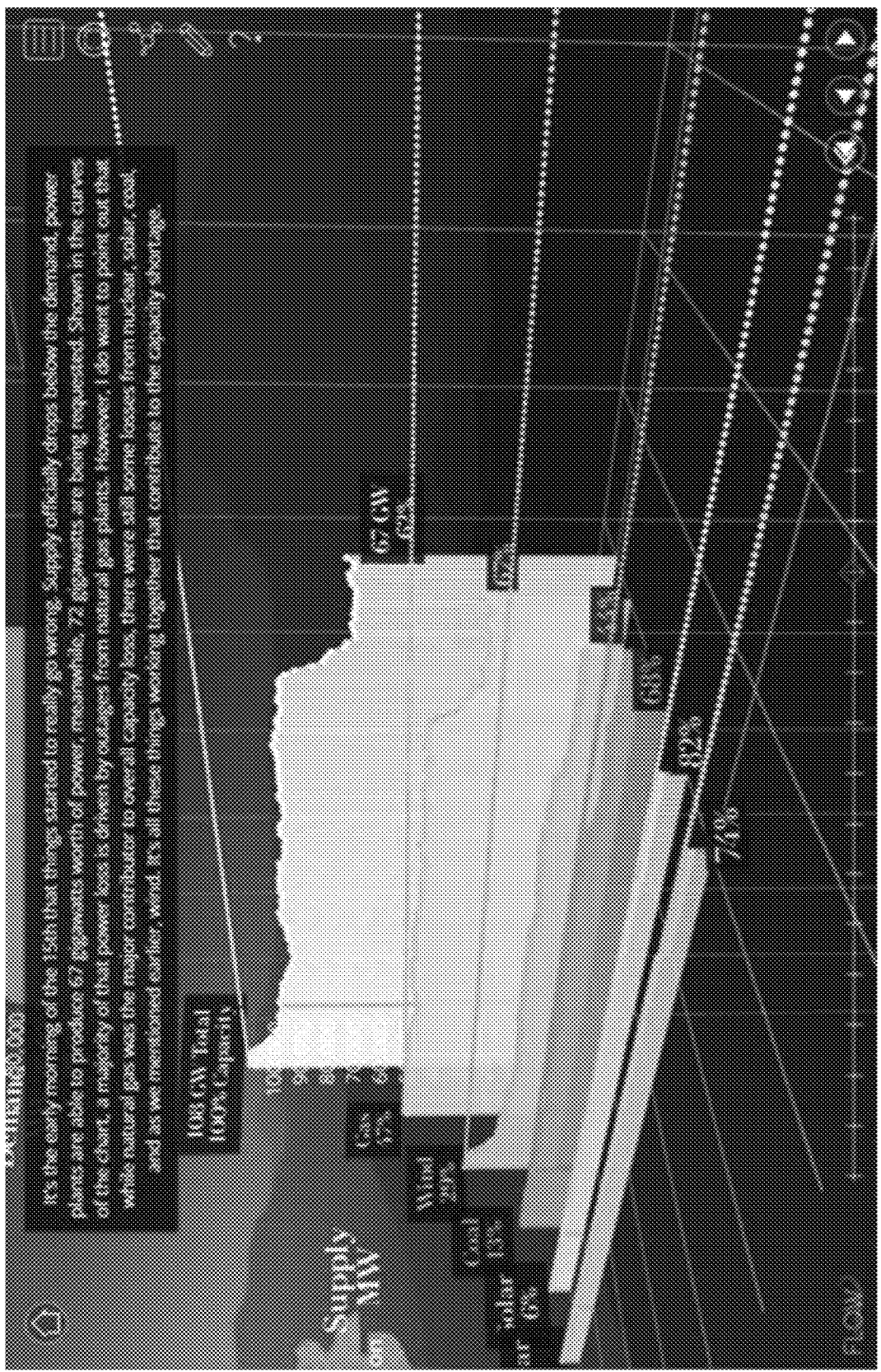
Figure 19J:
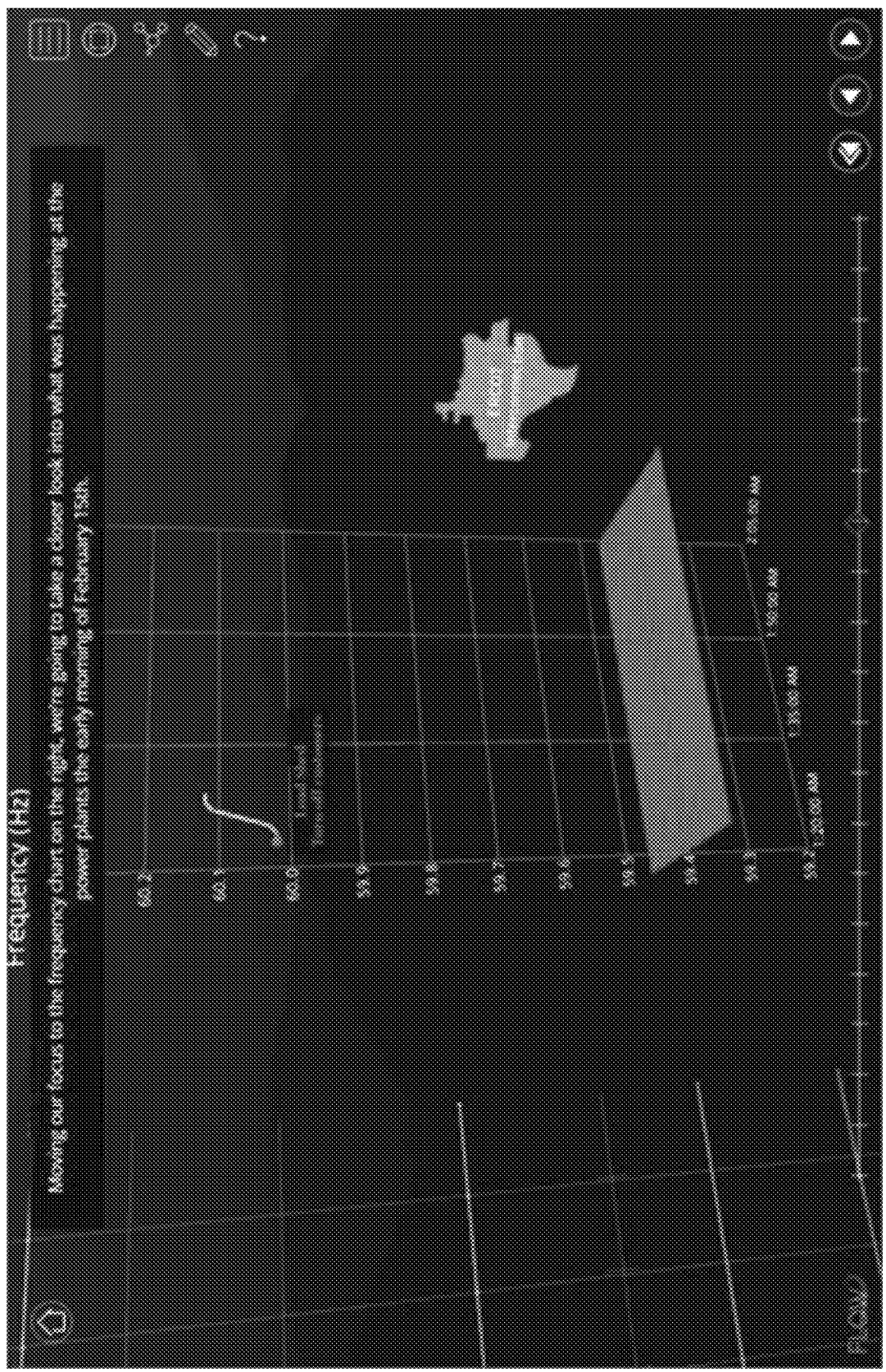
Figure 19K:
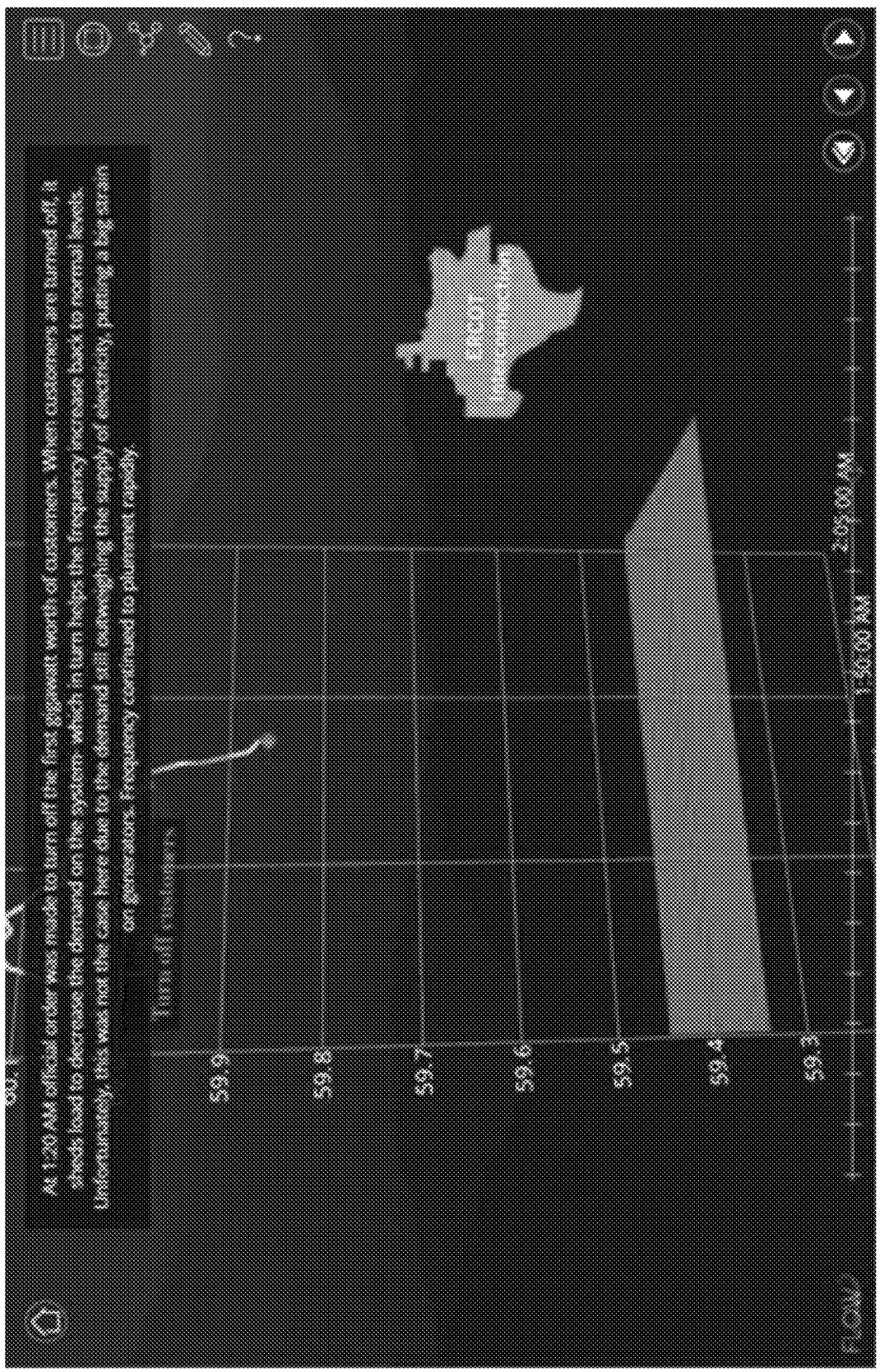
Figure 19L:
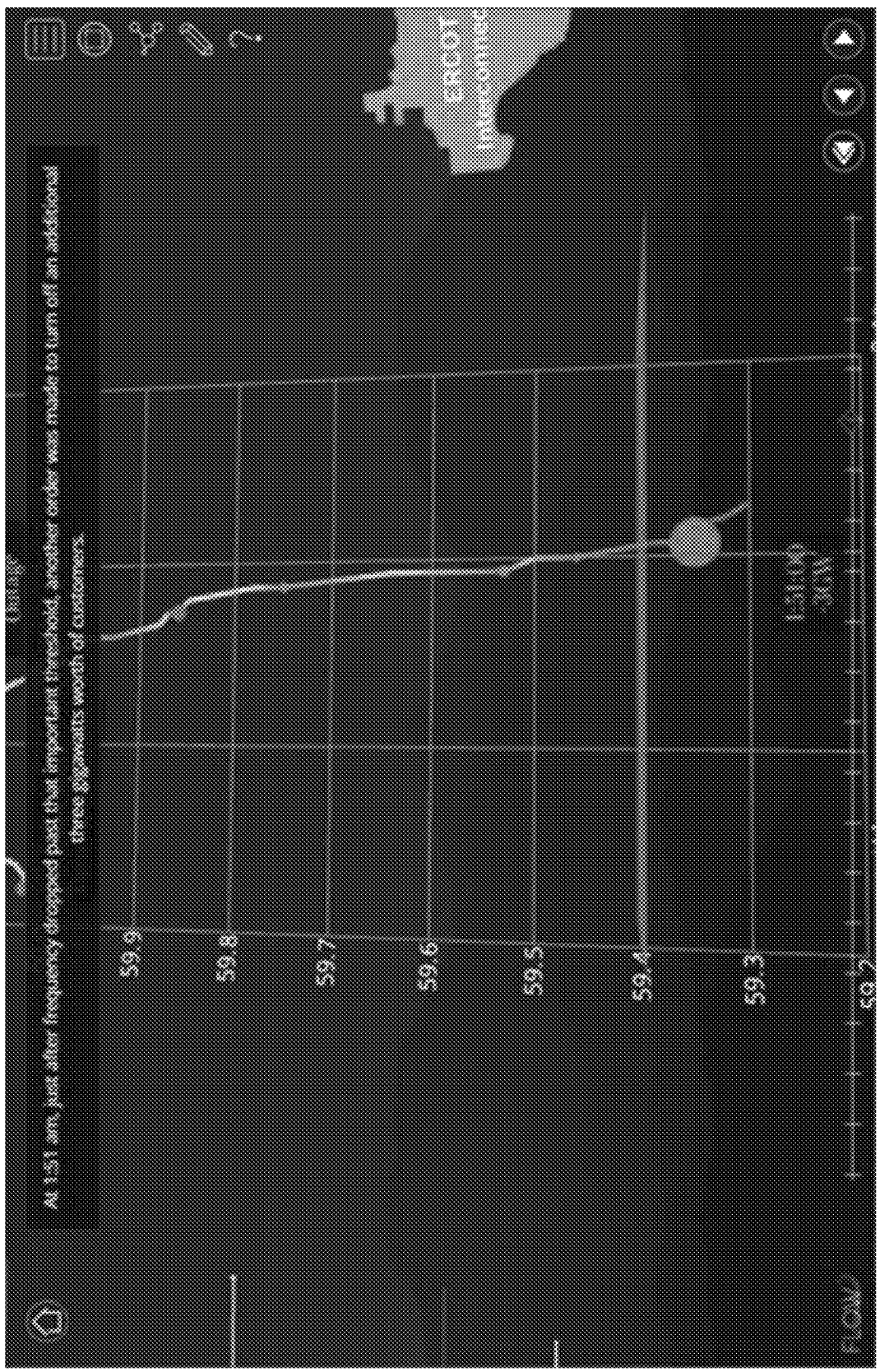
Figure 19M:
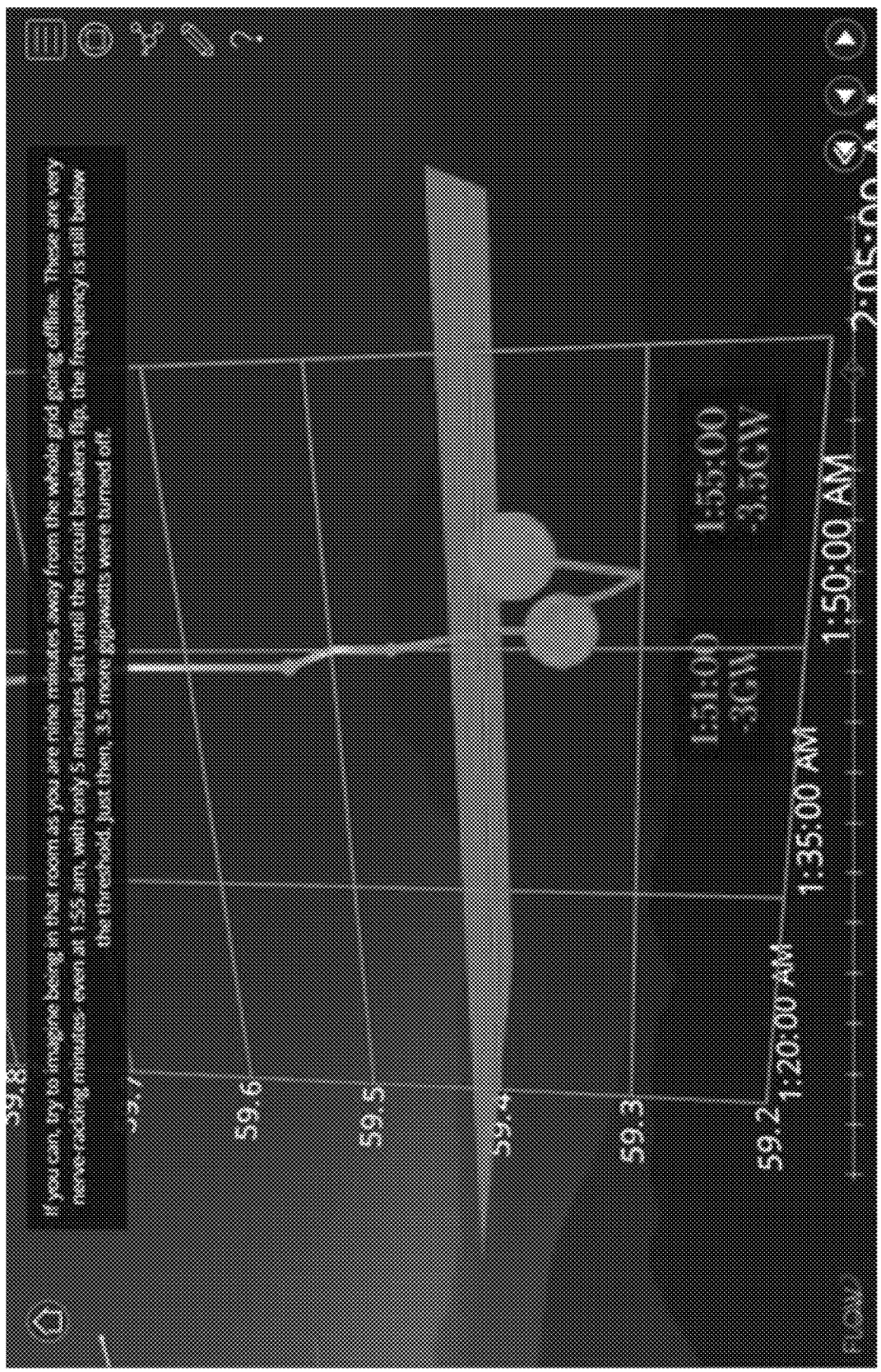
Figure 19N:
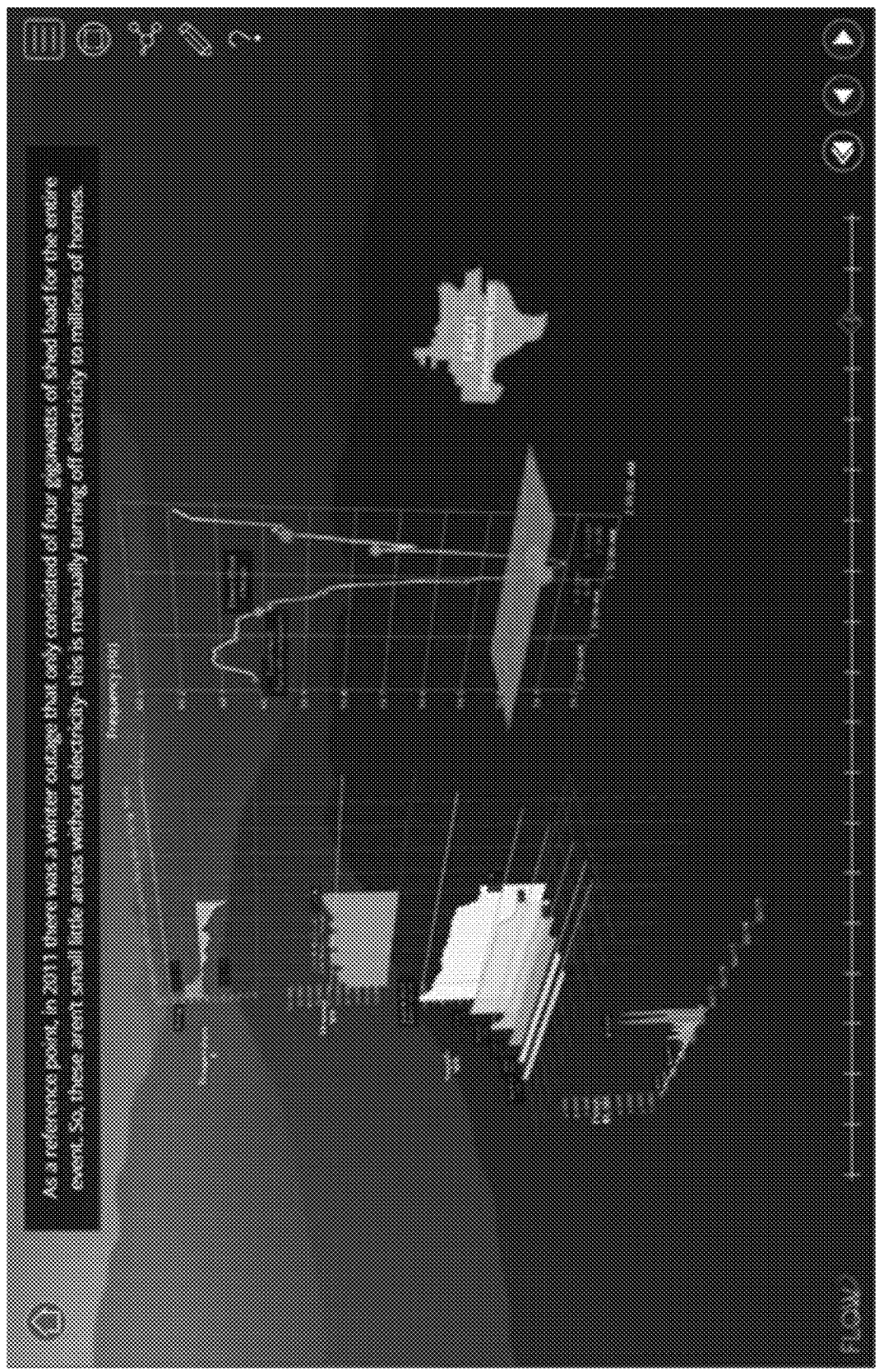
Figure 19O:
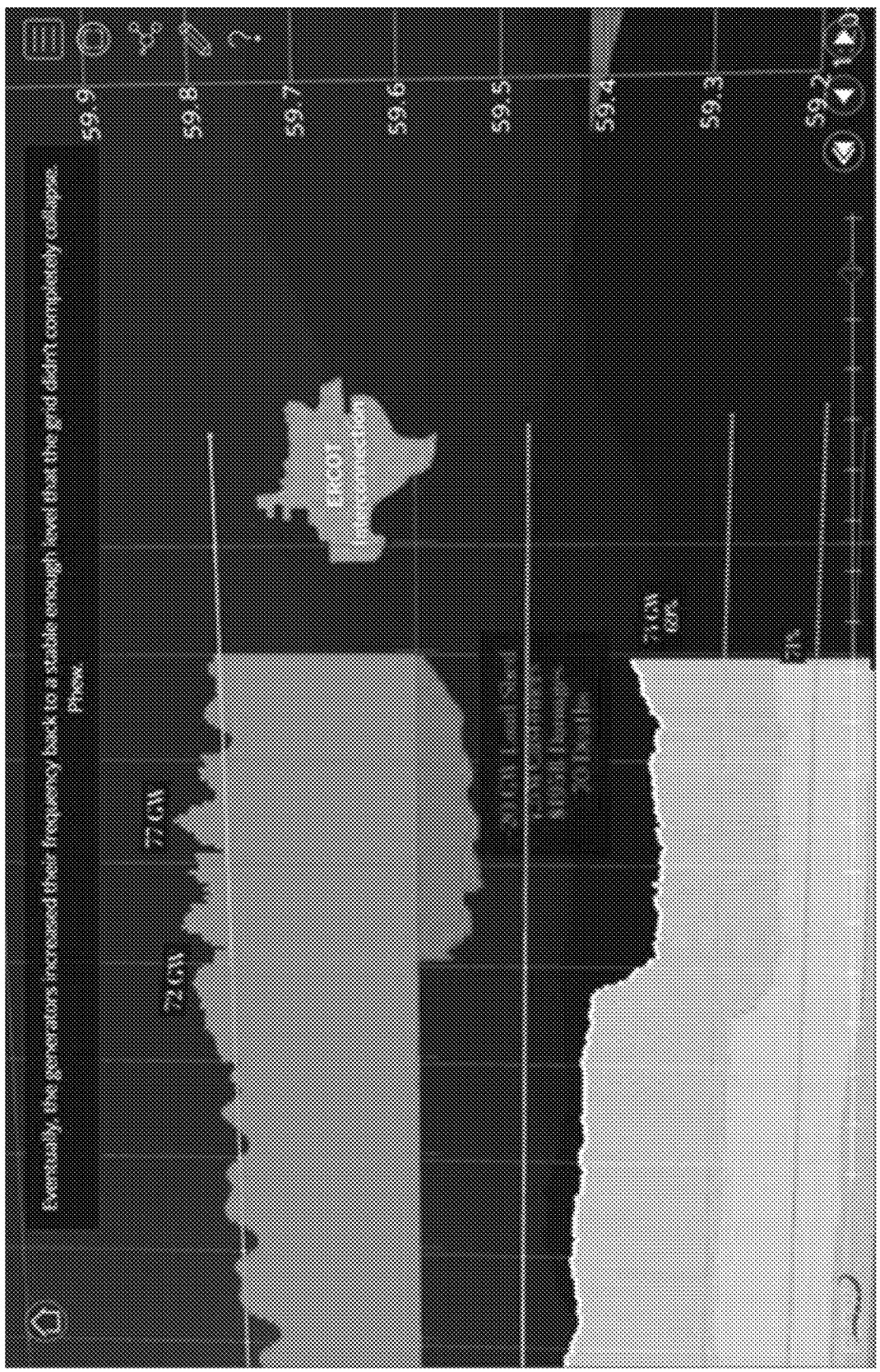
Figure 19P:
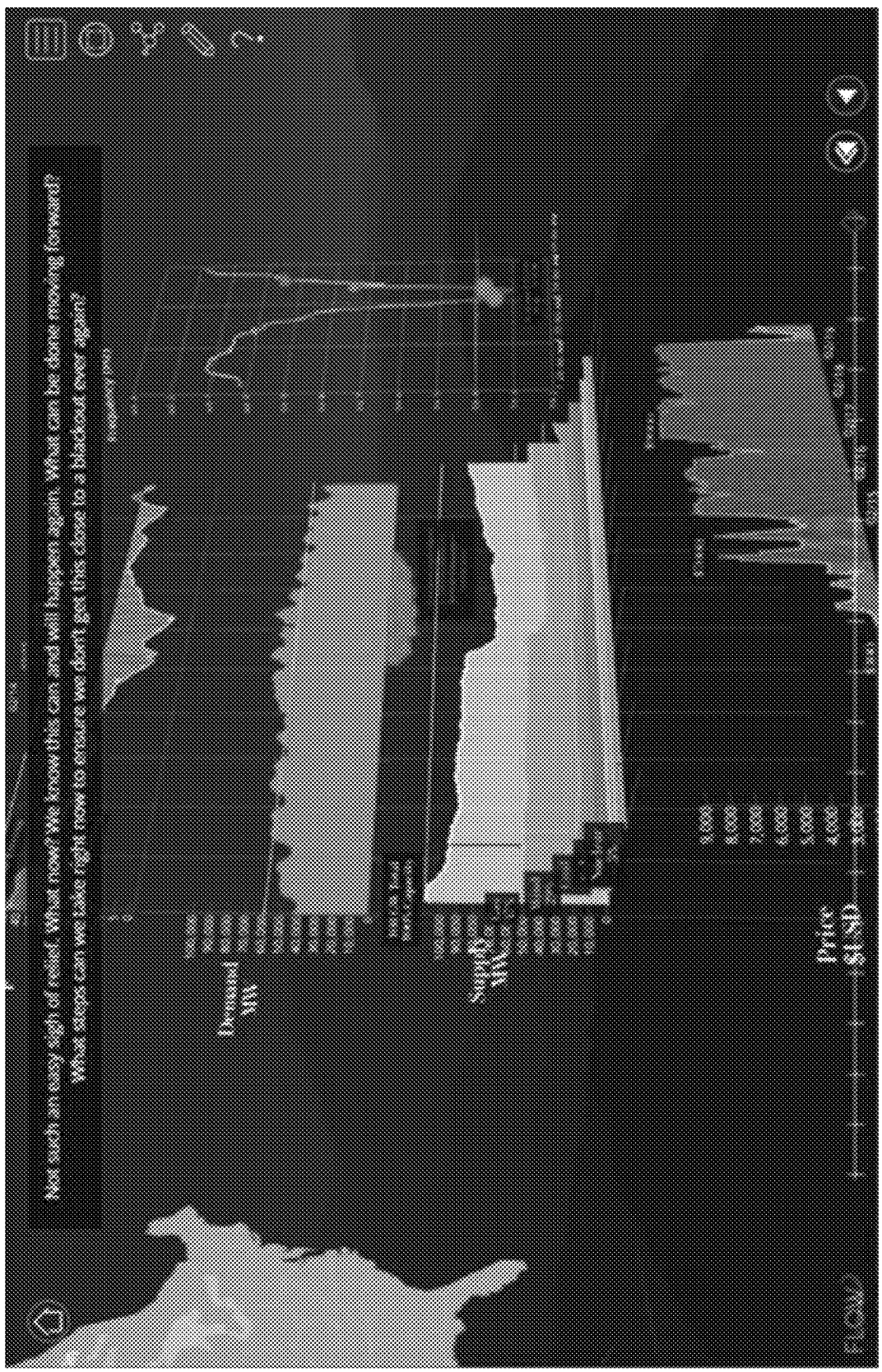

FIGS. 19A-19P depict a multidimensional time-series using several illustrative screenshots. A supply graph illustrates a broken down 3D area chart whereby each contributing element is shown on a separate line perpendicular to the depth axis. 3D separation allows for comparison between the values of different categories of information (e.g., gas, wind, solar), while also seeing the overall component sum. Advantageously, by zooming into these charts, synchronized on a single dimension (in this case, time), in a 3D environment, the brain retains a spatial orientation and "fills in" the charts that are outside the FOV. This enables your brain to build a single mental model from multiple charts.

In addition, the combination of multiple dimensions all changing over time produces an additional effect. In the example, there are four charts, temperature, demand, supply, and price, aligned by time. Viewed separately, results in seeing the charts as a single mental model, but viewing them all at once, results in visual crowding.

Figure 20:
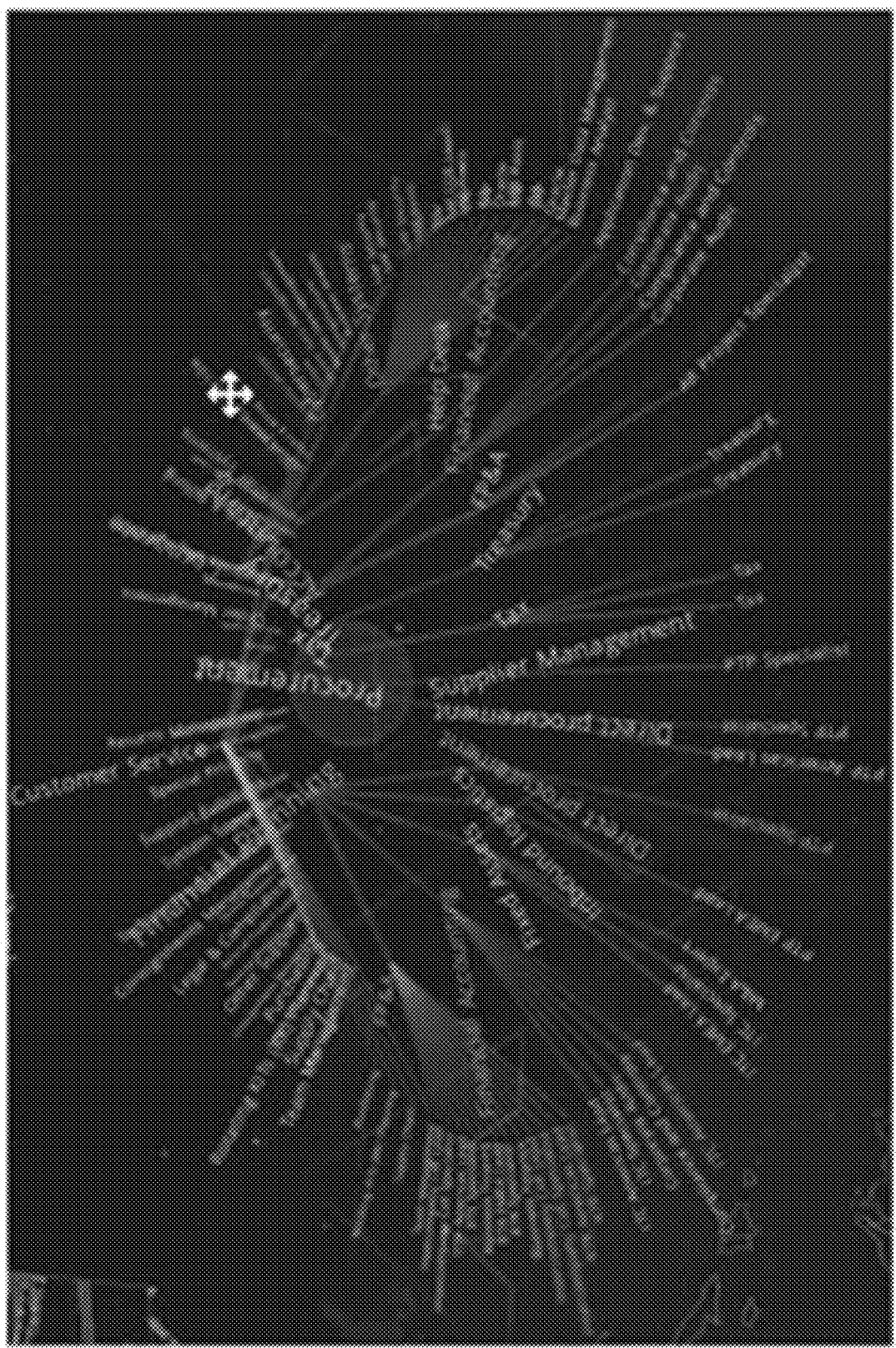
FIG. 20 depicts an example of a conical hierarchical 3DDV.

FIG. 20 depicts an example of a conical hierarchical 3DDV. Each node color represents important information. Each node can be highlighted or isolated, showing only itself and child nodes. Each node can be removed or included in the hierarchy.

Bar charts can be augmented using 3DDV techniques that allow for drill-down by selecting bars (or portions thereof) and transitioning to another chart type in a presentation. Unit, isotype, and waffle charts can be augmented by modifying dot shape. Bubble comparisons and nested bubbles can be augmented by using spheres instead of circles.

Participants can drill into a massive dataset, exploring in 3D, having a desired level of detail at their fingertips. Presenters can provide more data than they would normally want to provide (because it can clutter a view) and allow those participants who have the motivation and interest to drill down on their own. This can increase satisfaction both by giving power to those who want to choose a level of detail with which they are comfortable and increasing trust in the presentation by providing a bibliography (potentially with links to the reference material directly) and relevant background materials.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method comprising:
   converting real world data into one or more three dimensional data visualization and storytelling (3DDV) objects;
   enhancing a 3DDV object of the one or more 3DDV objects to include at least one of processed data visualization and multiuser controls;
   positioning the enhanced 3DDV object in a virtual space-time;
   making available, as 3DDV media, a scene tree including the virtual space-time in which the enhanced 3DDV object is positioned;
   wherein data visualization includes presenting data in a visual or multimedia format, comprising including in the visual or multimedia format a geospatial time-series thematic map;
   combining a dimension coming off of the geospatial time-series thematic map for time, utilizing a threshold to have a blank space making the data visualization more readable, and highlighting one or more hot spots and outliers of the geospatial time-series thematic map.

2. The method of claim 1, comprising cleaning raw real world data, resulting in the real world data, wherein converting real world data into one or more 3DDV objects results in processed data visualization that is incorporated into the 3DDV object.

3. The method of claim 1, wherein data visualization includes presenting data in a visual, audio, or multimedia format.

4. The method of claim 1, wherein data visualization further includes presenting data in a visual or multimedia format, comprising including in the visual or multimedia format another data visualization selected from a group consisting of a symbol sculpture, a cylinder time series, a histogram arch, a conical hierarchical chart, and a combination of these.

5. The method of claim 1, wherein the 3DDV object is a 3DDV symbol object.

6. The method of claim 1, wherein enhancing the 3DDV object includes expanding data items outside of a frame as part of data specialization.

7. The method of claim 1, wherein enhancing the 3DDV object includes including customization features selected from a group consisting of animation, audio, interactivity, playback, and a combination of these.

8. The method of claim 7, wherein the 3DDV media is provided as a collection of files stored in a location selected from a group consisting of a local file directory on a 3DDV media playback device, a LAN server, a remote server, cloud storage, and a combination of these.

9. The method of claim 7, wherein the 3DDV media is provided from a repository associated with a party selected from a group consisting of an author; a presenter; an audience member; an entity associated with an author, presenter, or audience member; a third party; and a combination of these.

10. The method of claim 1, comprising positioning other 3DDV objects of the one or more 3DDV objects within the virtual space-time to create, with the 3DDV object, a 3DDV media, wherein optical field of view (FOV) for an audience member is controlled or suggested by a layout of the 3DDV media.

11. The method of claim 1, comprising facilitating multiuser with object audience perspective, subjective avatar placement, and relative area-of-interest tracking.

12. The method of claim 1, wherein the scene tree includes an avatar story.

13. The method of claim 1, wherein the 3DDV media, in use, facilitates multiuser data storytelling with three dimensional data visualizations.

14. The method of claim 1, comprising providing an authoring environment to create a flow document model.

15. The method of claim 1, comprising displaying a data story of the 3DDV media in augmented reality.

16. The method of claim 1, comprising providing fly controls configured to enable a specific audience member to have content come to the specific audience member to reduce motion sickness.

17. The method of claim 1, wherein avatars in the 3DDV media, when in use, are hidden based on position in order to prevent occlusion of the enhanced 3DDV object.

18. The method of claim 1, comprising facilitating micropayments for one of a group consisting of creating one of the one or more 3DDV objects, consuming one of the one or more 3DDV objects, rewards to support dataset visualization creation associated with the 3DDV media, and a combination of these, wherein the one of the one or more 3DDV objects can be the 3DDV object.

19. A computer program product comprising instructions which, when the program is executed by a computer, cause the computer to carry out:
   converting real world data into one or more three dimensional data visualization and storytelling (3DDV) objects;
   enhancing a 3DDV object of the one or more 3DDV objects to include at least one of processed data visualization and multiuser controls;
   positioning the enhanced 3DDV object in a virtual space-time;
   making available, as 3DDV media, a scene tree including the virtual space-time in which the enhanced 3DDV object is positioned;

wherein data visualization includes presenting data in a visual or multimedia format, comprising including in the visual or multimedia format a geospatial time-series thematic map;

combining a dimension coming off of the geospatial time-series thematic map for time, utilizing a threshold to have a blank space making the data visualization more readable, and highlighting one or more hot spots and outliers of the geospatial time-series thematic map.

20. A system comprising:

one or more processors; and memory storing instructions that, when executed by the one or more processors, cause the system to perform:
 converting real world data into one or more three dimensional data visualization and storytelling (3DDV) objects;
 enhancing a 3DDV object of the one or more 3DDV objects to include at least one of processed data visualization and multiuser controls;
 positioning the enhanced 3DDV object in a virtual space-time;
 making available, as 3DDV media, a scene tree including the virtual space-time in which the enhanced 3DDV object is positioned;
 wherein data visualization includes presenting data in a visual or multimedia format, comprising including in the visual or multimedia format a geospatial time-series thematic map;
 combining a dimension coming off of the geospatial time-series thematic map for time, utilizing a threshold to have a blank space making the data visualization more readable, and highlighting one or more hot spots and outliers of the geospatial time-series thematic map.

* * * * *